US008356084B2

(12) United States Patent
Yamamoto

(10) Patent No.: US 8,356,084 B2
(45) Date of Patent: Jan. 15, 2013

(54) INFORMATION PROCESSING APPARATUS AND IMAGE PROCESSING APPARATUS

(75) Inventor: Masahito Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 863 days.

(21) Appl. No.: 12/406,788

(22) Filed: Mar. 18, 2009

(65) Prior Publication Data
US 2009/0237728 A1 Sep. 24, 2009

(30) Foreign Application Priority Data

Mar. 19, 2008 (JP) ................................ 2008-072220

(51) Int. Cl.
G06F 15/16 (2006.01)
G06F 15/177 (2006.01)
G06F 15/173 (2006.01)
(52) U.S. Cl. ........ 709/219; 709/217; 709/220; 709/222; 709/223; 709/224; 709/240
(58) Field of Classification Search .................. 709/223, 709/224, 240, 217, 219, 220, 222
See application file for complete search history.

(56) References Cited

U.S. PATENT DOCUMENTS

| 5,845,078 | A  | * | 12/1998 | Tezuka et al. ................. 709/222 |
| 7,365,872 | B2 | * | 4/2008 | Lawrence et al. ............. 358/1.15 |
| 7,590,762 | B2 | * | 9/2009 | Cunningham et al. ........ 709/250 |
| 7,603,442 | B2 | * | 10/2009 | Sen ................................ 709/220 |
| 7,688,466 | B2 | * | 3/2010 | Manchester ................... 358/1.15 |
| 7,711,800 | B2 | * | 5/2010 | Gavrilescu et al. ........... 709/219 |
| 8,019,829 | B2 | * | 9/2011 | Cocotis et al. ................. 709/217 |
| 8,160,062 | B2 | * | 4/2012 | Qian et al. ..................... 370/389 |
| 2002/0087663 | A1 | * | 7/2002 | Chou et al. ..................... 709/219 |
| 2003/0231328 | A1 | * | 12/2003 | Chapin et al. ................. 358/1.13 |
| 2004/0036912 | A1 | * | 2/2004 | Liou et al. ..................... 358/1.16 |
| 2005/0174599 | A1 |   | 8/2005 | Ferlitsch |
| 2005/0280858 | A1 |   | 12/2005 | Kim |
| 2007/0022180 | A1 | * | 1/2007 | Cocotis et al. ................ 709/217 |
| 2007/0055751 | A1 | * | 3/2007 | Sundararaman et al. ..... 709/220 |
| 2007/0130296 | A1 | * | 6/2007 | Kim ............................. 709/220 |
| 2007/0290038 | A1 | * | 12/2007 | Woodcock et al. ........... 235/383 |
| 2008/0013109 | A1 | * | 1/2008 | Chen et al. .................... 358/1.1 |
| 2008/0046806 | A1 |   | 2/2008 | Reddy et al. |
| 2009/0216912 | A1 | * | 8/2009 | Lee et al. .......................... 710/3 |

FOREIGN PATENT DOCUMENTS

| JP | 09-247338 A | 9/1997 |
| JP | 2006-042309 A | 2/2006 |
| JP | 2006-127503 A | 5/2006 |
| KR | 10-0565072 B | 3/2006 |
| WO | 2006/082086 A2 | 8/2006 |

OTHER PUBLICATIONS

Tristan Richardson et al, "Virtual Network Computing", IEEE Internet Computing, vol. 2, No. 1, Jan./Feb. 1998, pp. 33-38.
Japanese Office Action dated May 7, 2012 for JP 2008-072220.

* cited by examiner

Primary Examiner — Hieu Hoang
(74) Attorney, Agent, or Firm — Carter, DeLuca, Farrell & Schmidt LLP

(57) ABSTRACT

An information processing apparatus communicable with an image processing apparatus. The information processing apparatus including a transmission unit configured to transmit a job that requests execution of image processing, a switching unit configured to automatically switch a transmission destination of the job to the image processing apparatus during a communication with the image processing apparatus, and a unit configured to revert the transmission destination of the job, after completion of the communication with the image processing apparatus, to a setting before the transmission destination of the job was switched by the switching unit.

8 Claims, 31 Drawing Sheets

F I G. 4
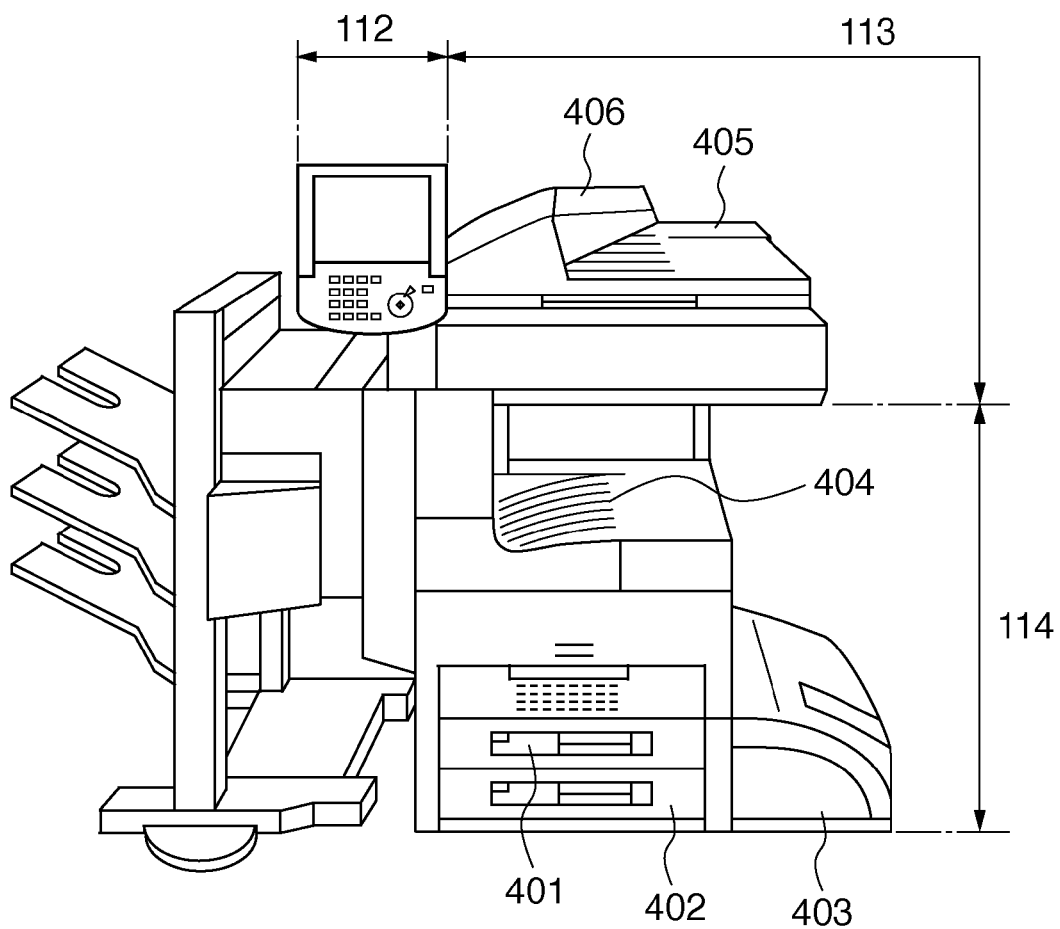

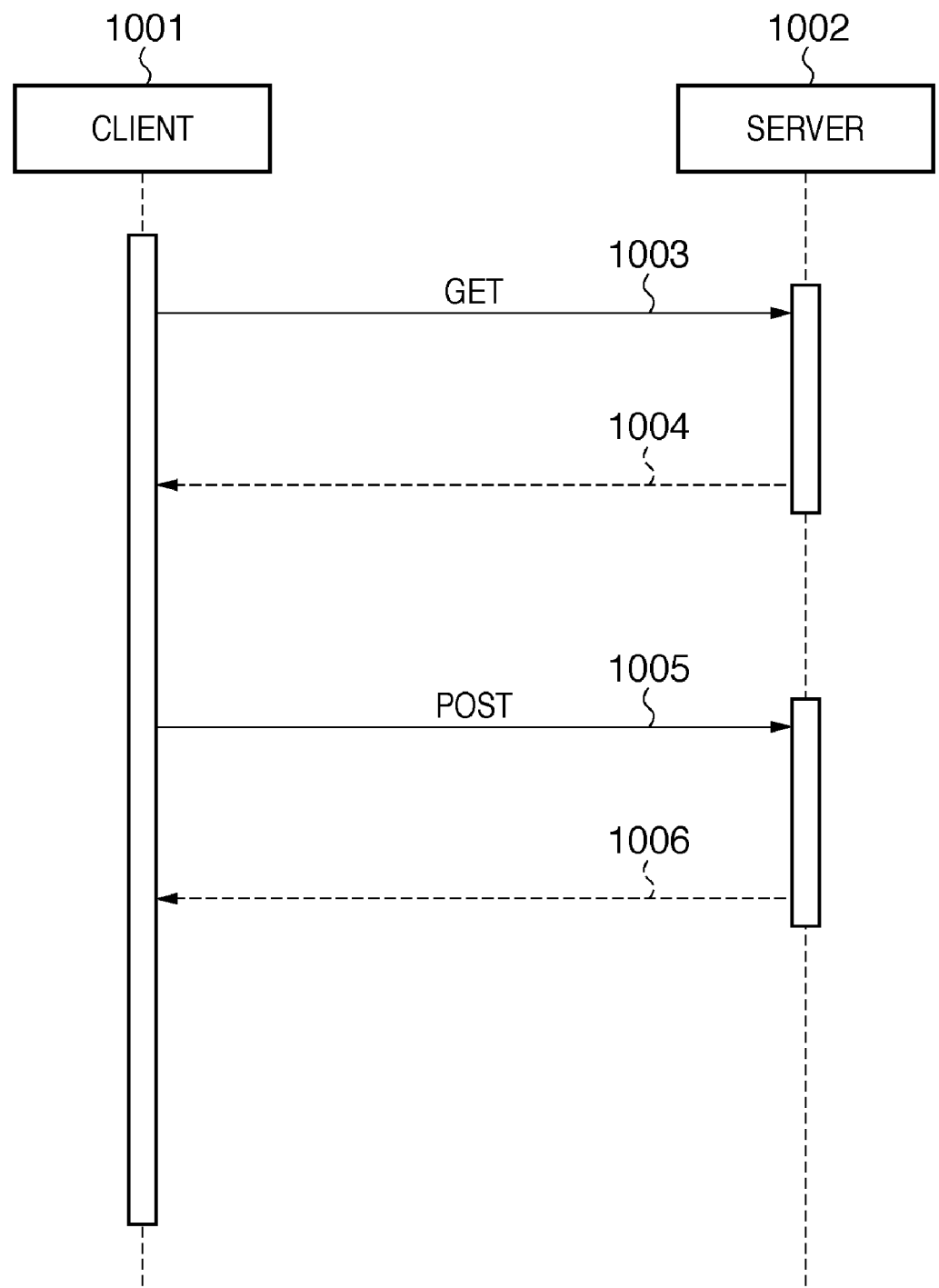

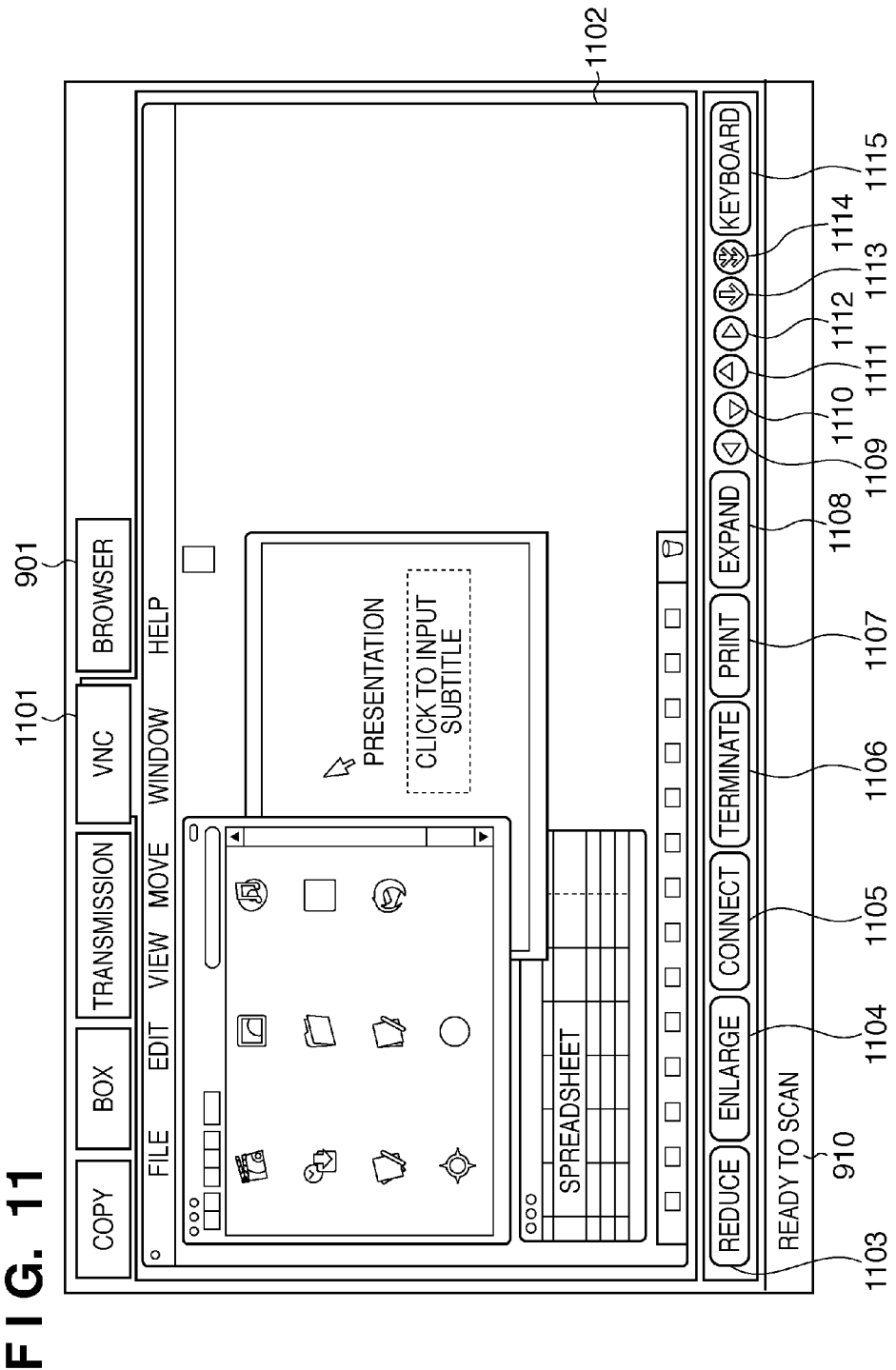

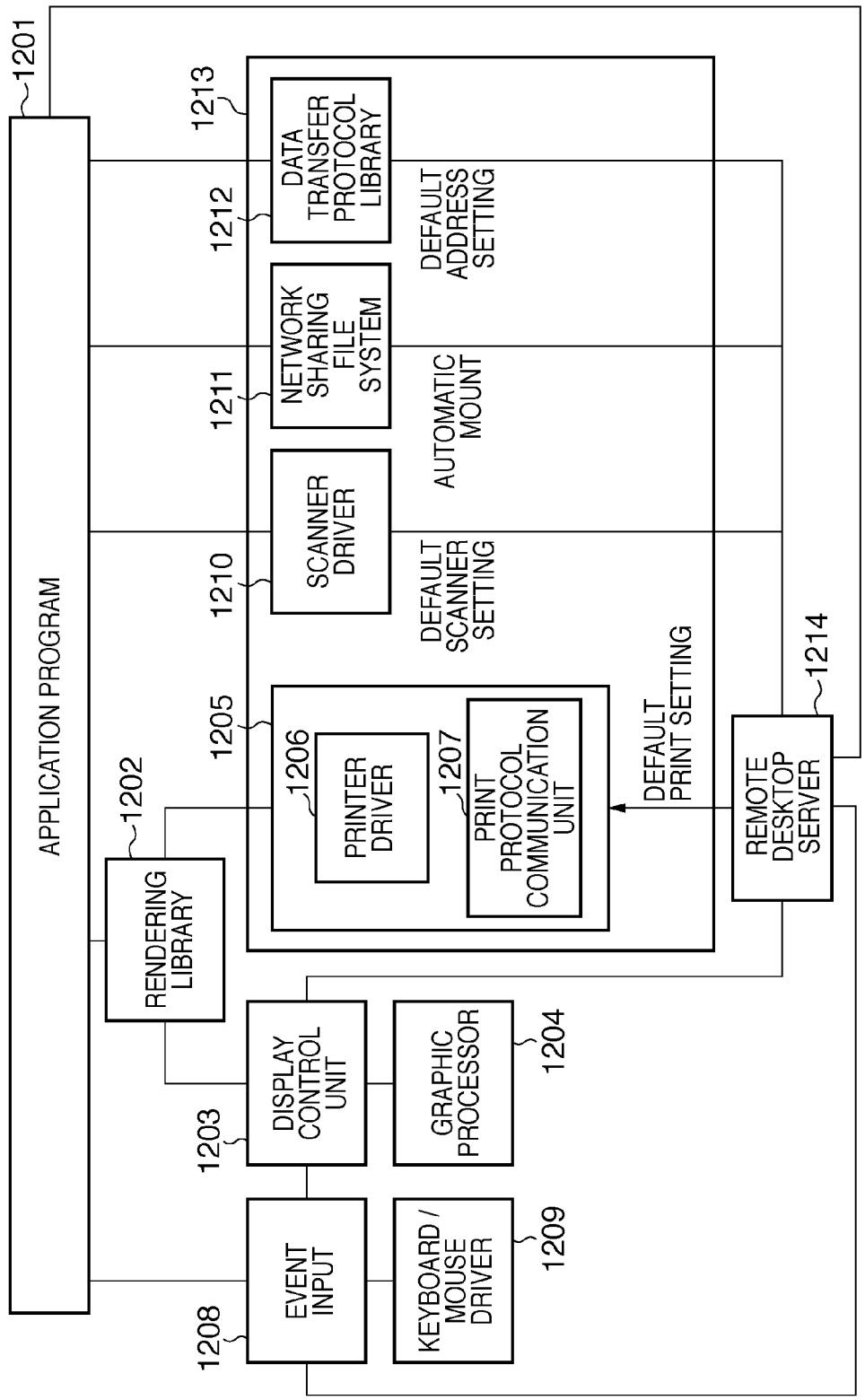

FIG. 13A

REMOTE DESKTOP SERVER SETTING

CONNECTION SOURCE CLIENT SETTING

| SELECT | HOST NAME OR ADDRESS | PRINTER COOPERATION | SCANNER COOPERATION | FILE SHARING | TRANSMISSION DESTINATION COOPERATION |
|---|---|---|---|---|---|
| ○ | DEFAULT (CONNECTION SOURCE WITHOUT ANY SPECIFIC SETTING) | NA | NA | NA | NA |
| ● | irc3200.rd.canon.co.jp | AUTOMATIC SWITCHING | AUTOMATIC SWITCHING | NA | NA |
| ○ | workplace-gateway.rd.canon.co.jp | AUTOMATIC SWITCHING | AUTOMATIC SWITCHING | AUTOMATIC MOUNT | NA |
| ○ | 192.168.0.200 | AUTOMATIC SWITCHING | NA | NA | AUTOMATIC SWITCHING |

[EDIT]  [ADD NEW]  [OK]

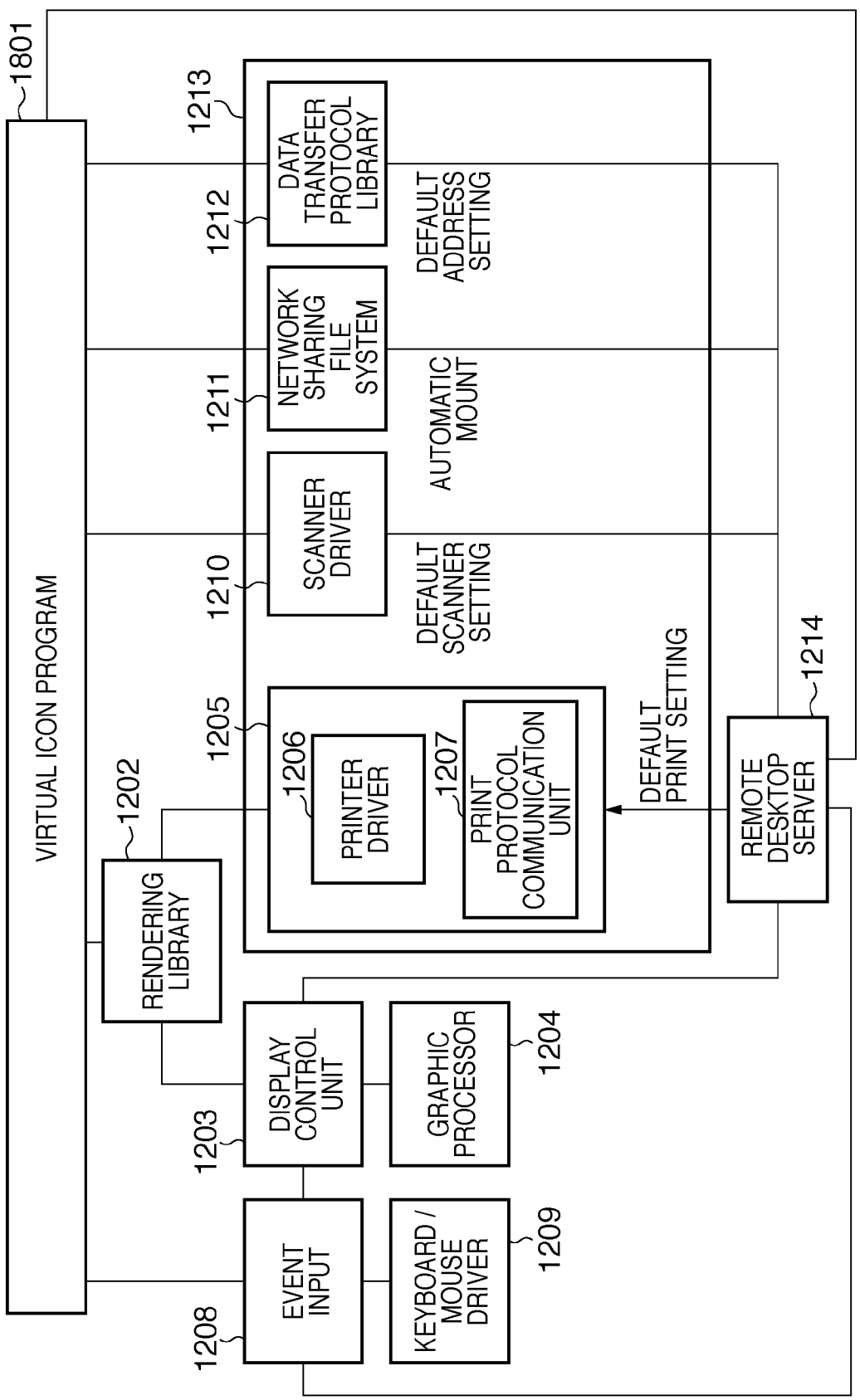

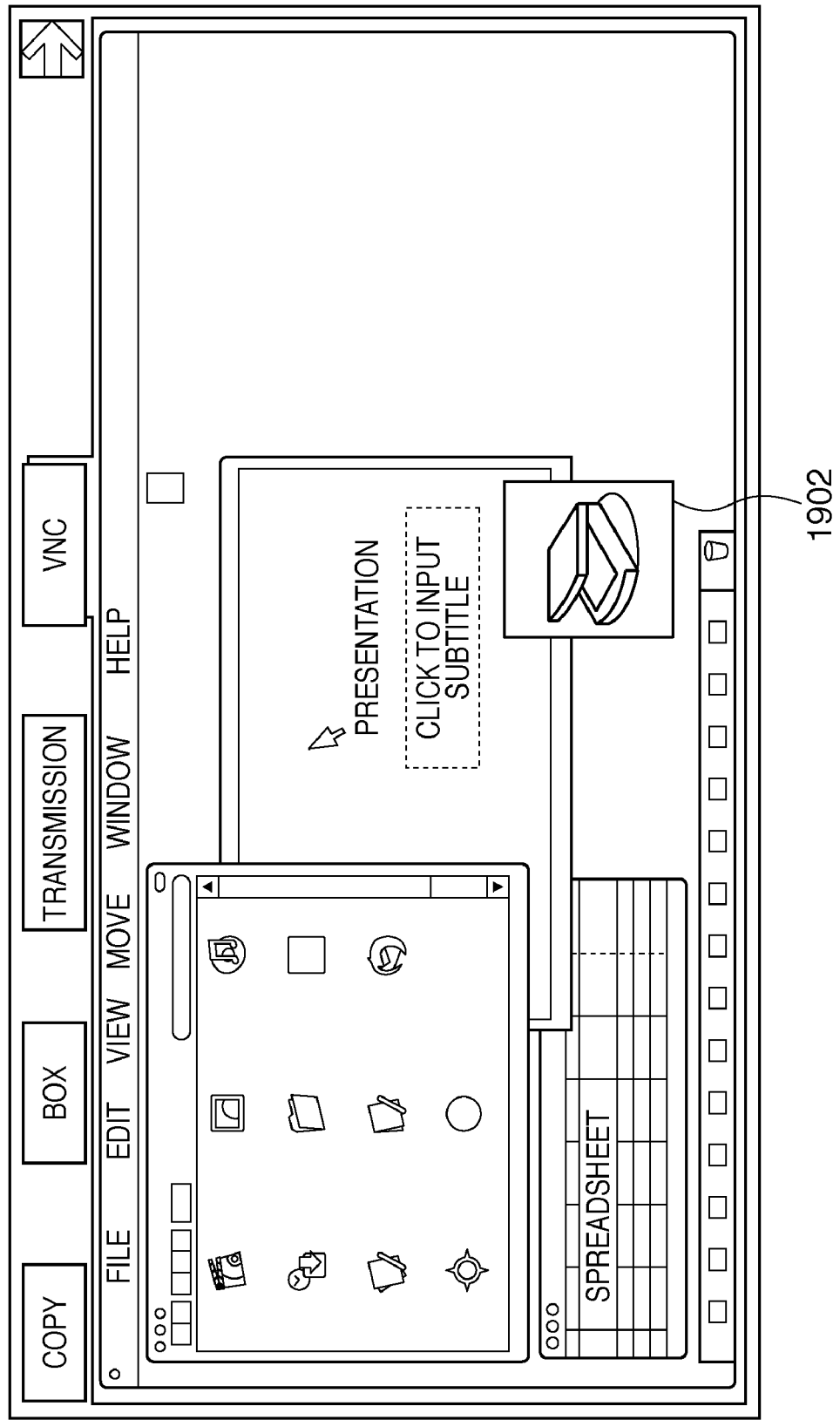

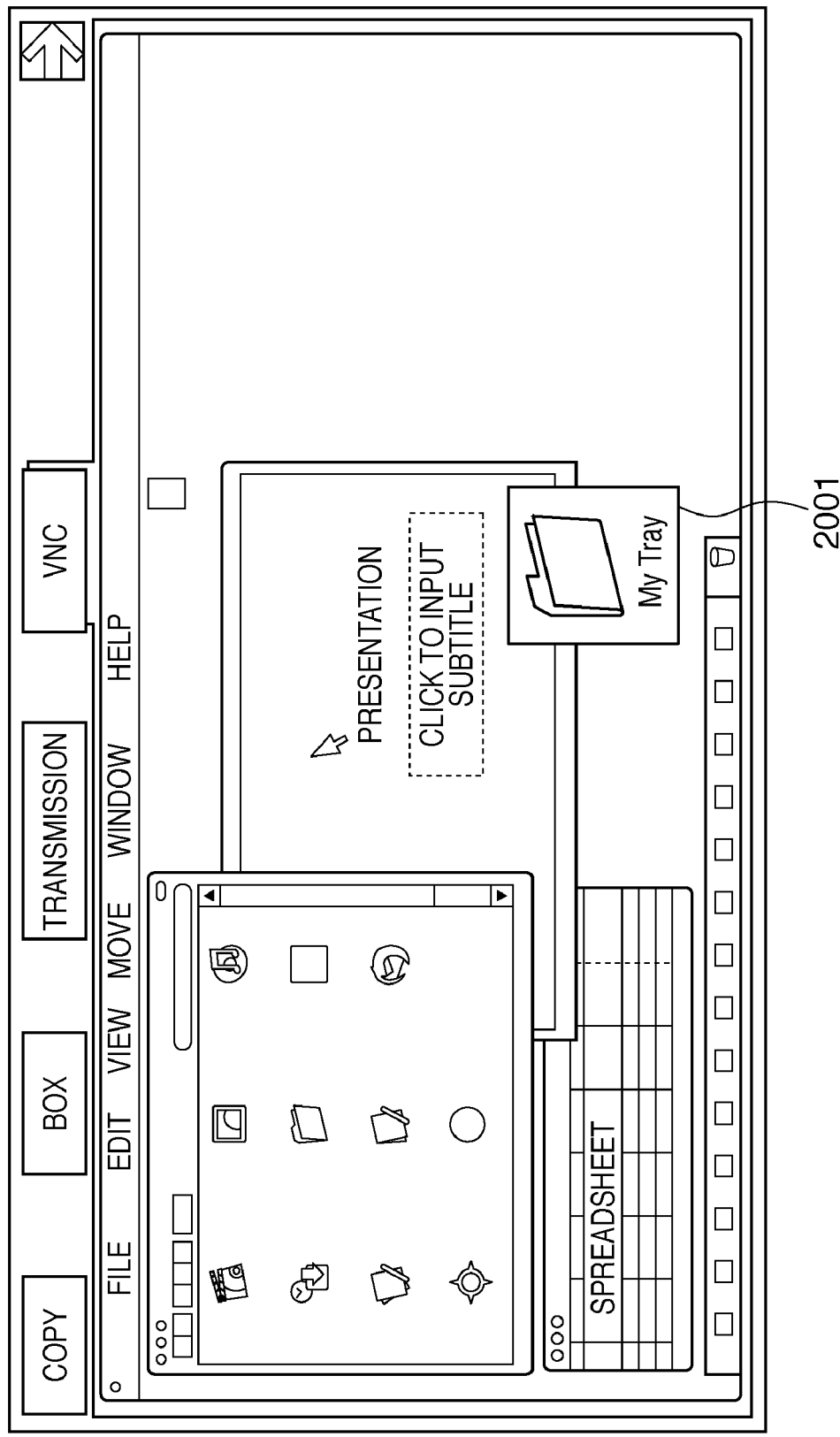

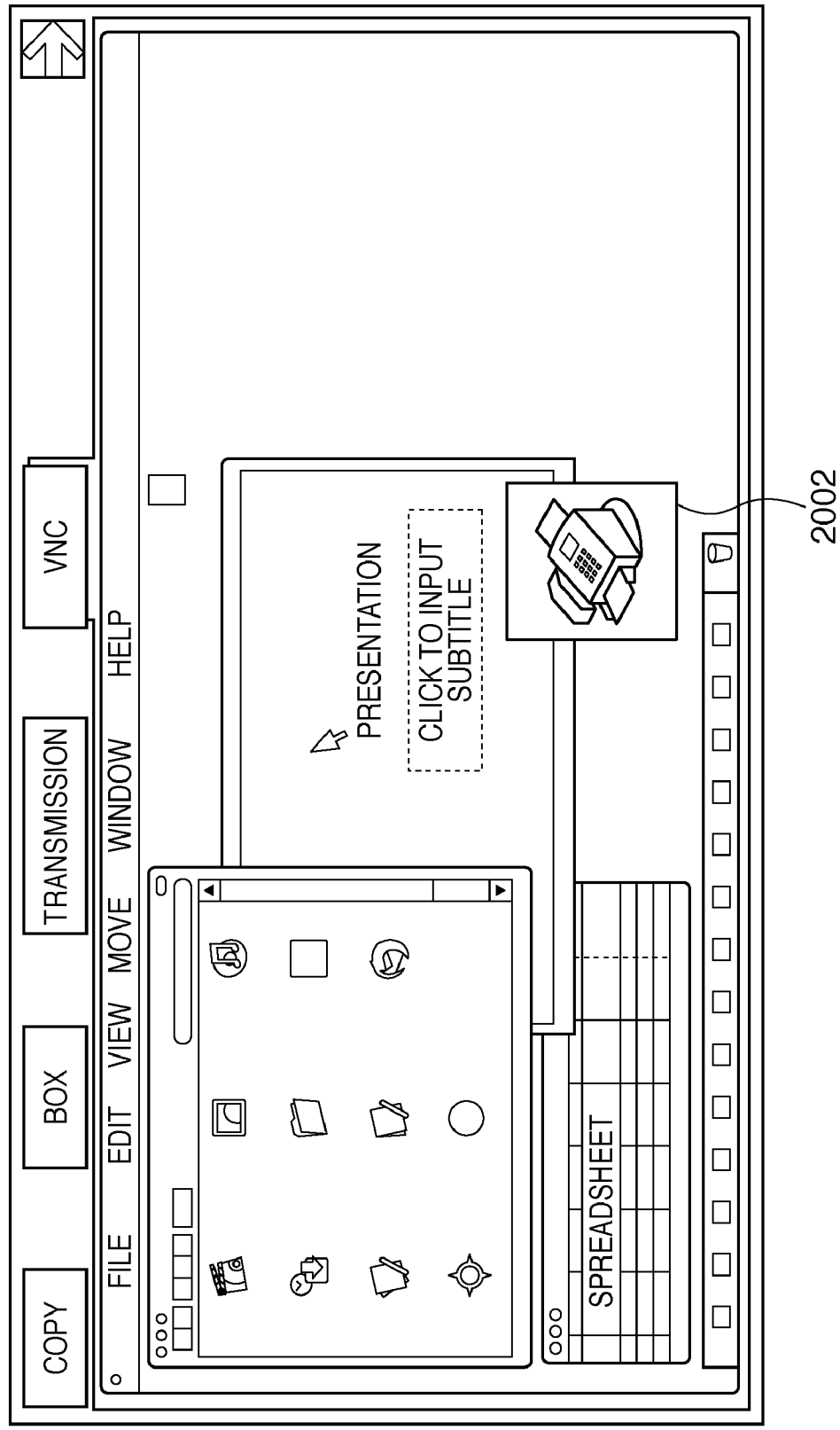

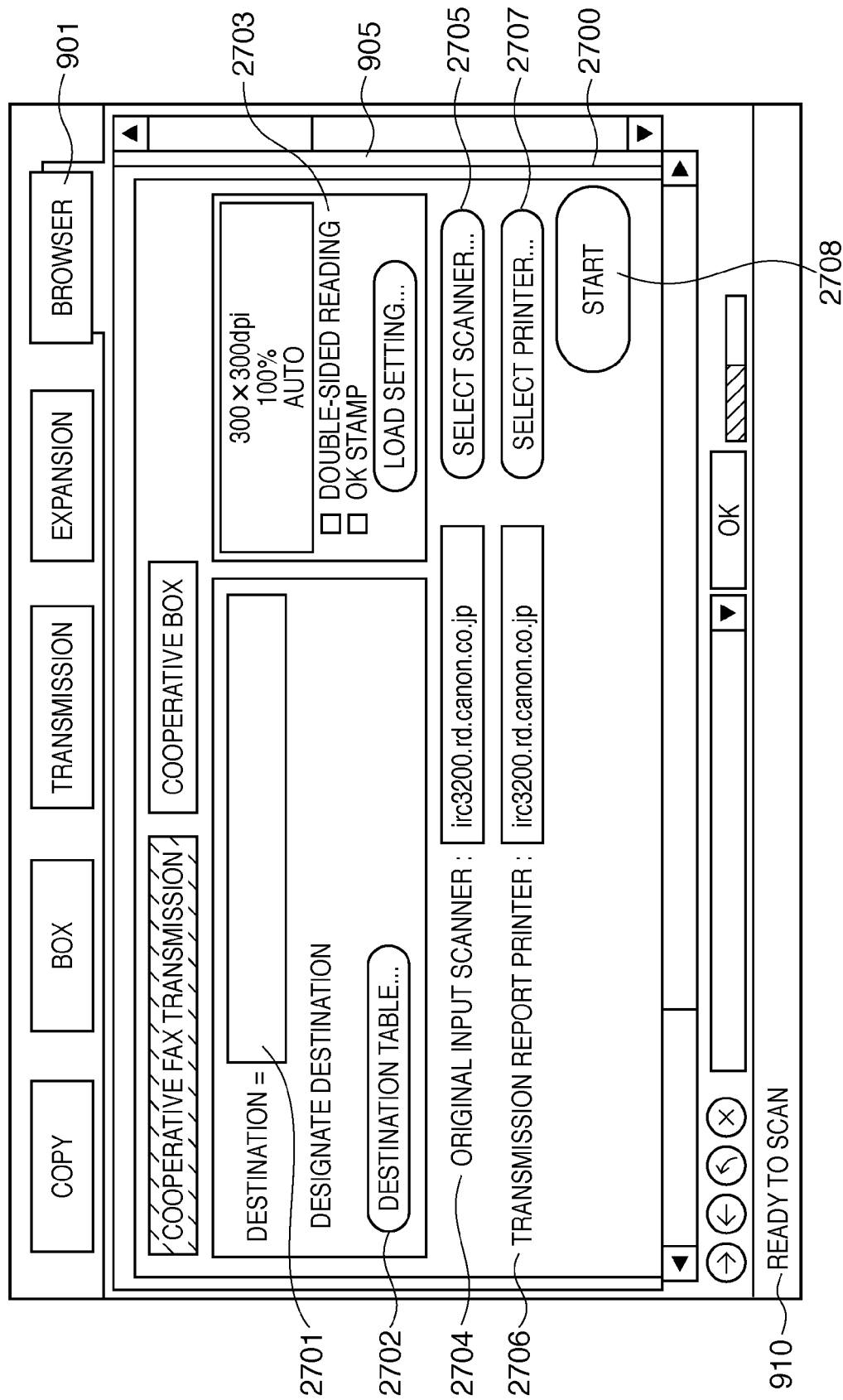

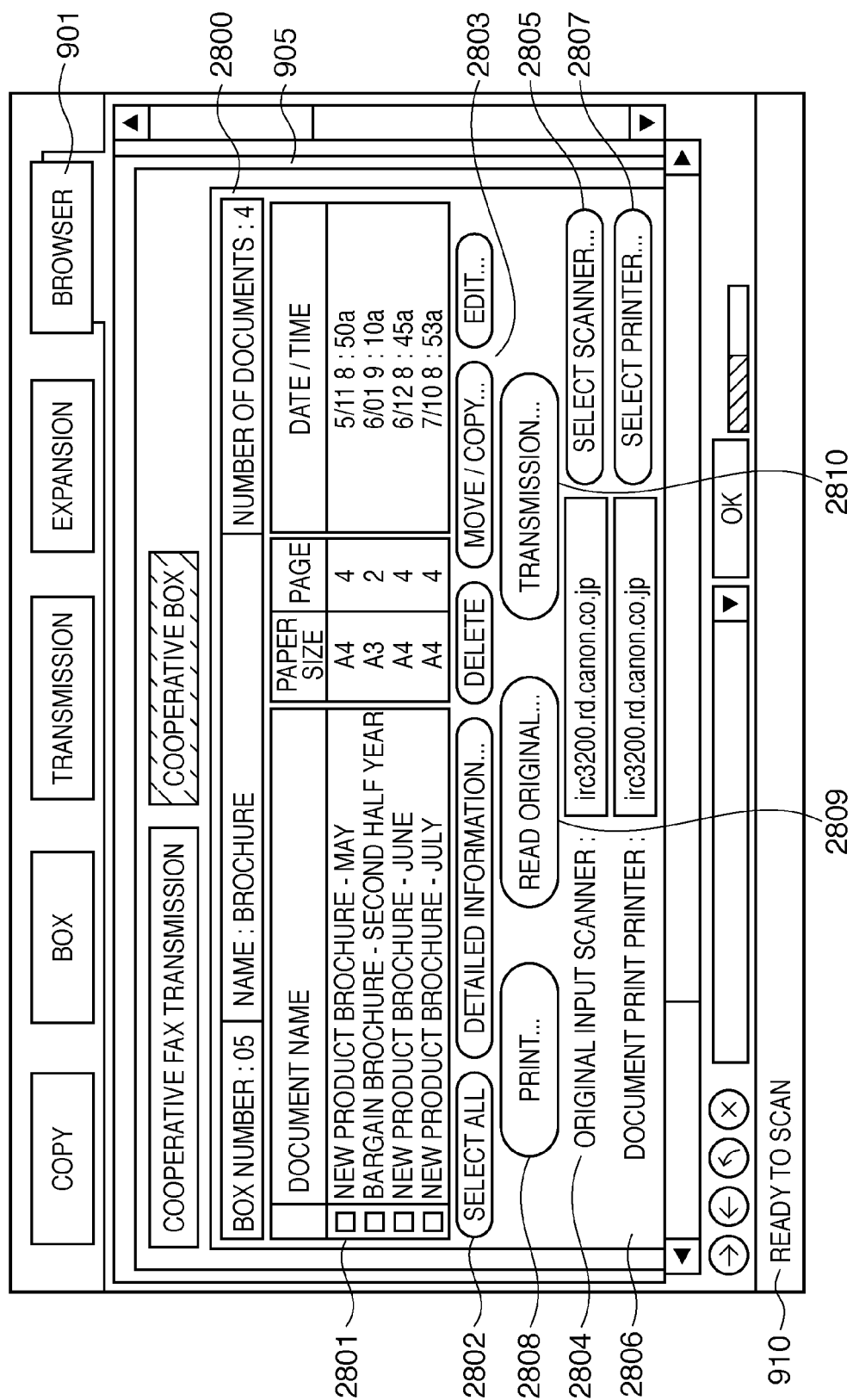

INFORMATION PROCESSING APPARATUS AND IMAGE PROCESSING APPARATUS

BACKGROUND OF THE INVENTION

1. Field of the Invention

The present invention relates to a technique using an information processing apparatus and an image processing apparatus that communicate with each other.

2. Description of the Related Art

A technique that allows an image processing apparatus such as a printer or multi-functional peripheral (MFP) to operate an information processing apparatus such as a client computer by a remote desktop is known. Software of a remote desktop client is executed on the image processing apparatus. Alternatively, software of a remote desktop server is executed on the information processing apparatus. By establishing a connection from the remote desktop client on the image processing apparatus to the remote desktop server on the information processing apparatus, the user may operate the information processing apparatus using an operation unit of the image processing apparatus.

Japanese Patent Laid-Open No. 9-247338 discloses a system in which an image processing apparatus displays an operation instruction screen equivalent to that of an information processing apparatus, and this information processing apparatus is remotely operated from the image processing apparatus using a pointing device of the image processing apparatus.

Japanese Patent Laid-Open No. 2006-42309 discloses an arrangement in which an agent program that runs on an information processing apparatus issues a remote operation request to an image processing apparatus while a user leaves the information processing apparatus and uses the image processing apparatus.

In the related art described in Japanese Patent Laid-Open No. 9-247338, when an image processing job is to be outputted from the information processing apparatus to the image processing apparatus, the user has to find and select the appropriate image processing apparatus from many possible options. As the combination of image processing apparatuses and information processing apparatuses increases, the user may have more difficulty finding and selecting the appropriate image processing apparatus.

In the related art disclosed in Japanese Patent Laid-Open No. 2006-42309, the remote operation may start at the initiative of the information processing apparatus, the information processing apparatus may not be remotely operated at the initiative of the image processing apparatus.

SUMMARY OF THE INVENTION

According to the present invention, an information processing apparatus having an image processing job is operated using an image processing apparatus as an operation terminal, to execute the image processing job in the information processing apparatus.

According to one aspect of the present invention, there is provided an information processing apparatus communicable with an image processing apparatus including a transmission unit configured to transmit a job that requests execution of image processing, a switching unit configured to automatically switch a transmission destination of the job to the image processing apparatus during a communication with the image processing apparatus, and a unit configured to revert the transmission destination of the job, after completion of the communication with the image processing apparatus, to a setting before the transmission destination of the job was switched.

According to another aspect of the present invention, there is provided an image processing apparatus communicable with an external apparatus including an operation unit configured to accept an operation from a user, a reception unit configured to receive a job from the external apparatus, and a control unit configured to control the external apparatus in accordance with the operation accepted by the operation unit to transmit the job to the image processing apparatus.

Further features of the present invention will be apparent from the following description of exemplary embodiments with reference to the attached drawings.

BRIEF DESCRIPTION OF THE DRAWINGS

FIG. 4 is a perspective view showing the outer appearance of the image processing apparatus 110;

FIG. 10 is a sequence chart showing HTTP requests using an HTTP protocol by a client and responses from a server;

FIG. 11 is a view showing the configuration of a screen displayed when a VNC viewer function is selected on the LCD display unit 501 shown in FIG. 5;

FIG. 12 is a block diagram showing the software structure of an apparatus serving as a remote operation target according to a first embodiment;

FIG. 13A shows an example of an environment setting user interface of a remote desktop server which runs on the apparatus serving as the remote operation target;

FIG. 18 is a block diagram showing the software structure of an apparatus serving as a remote operation target according to a second embodiment;

FIG. 19B is a view showing a screen example in which the operation screen of the desktop computer that accepts a virtual icon application including a scanner icon is remotely operated using the remote desktop client of the image processing apparatus;

FIG. 20A is a view showing a screen example in which the operation screen of the desktop computer that accepts a virtual icon application including a My Tray icon is remotely operated using the remote desktop client of the image processing apparatus;

FIG. 20B is a view showing a screen example in which the operation screen of the desktop computer that accepts a virtual icon application including a FAX transmission icon is remotely operated using the remote desktop client of the image processing apparatus;

FIG. 27 is a view showing a screen example when the user establishes a connection to a cooperative FAX transmission function implemented as a Web application on the image processing apparatus 120 by an embedded Web browser function, and remotely operates the cooperative FAX transmission function at the operation panel on the image processing apparatus 110; and FIG. 28 is a view showing a screen example when the user establishes a connection to a cooperative box function implemented as a Web application on the image processing apparatus 120 by an embedded Web browser function, and remotely operates the cooperative box function at the operation panel on the image processing apparatus 110.

DESCRIPTION OF THE EMBODIMENTS

Figure 1:
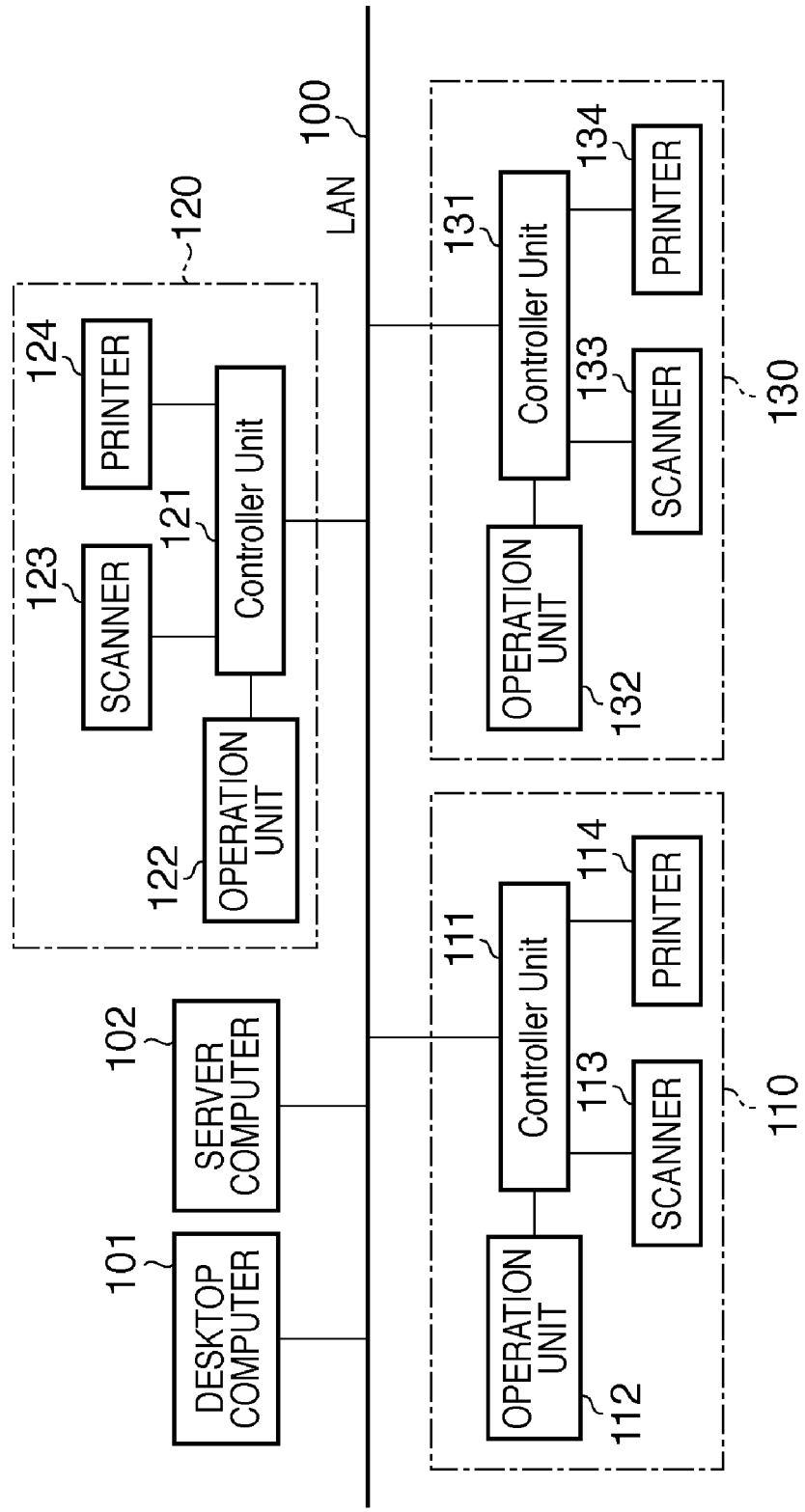
FIG. 1 is a block diagram showing the overall arrangement of an image processing system according to one embodiment of the present invention.

Various embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

[Presupposition Technique]

A presupposition technique in accordance with an aspect of the present invention will now be described. In a distributed cooperative information environment, computers exist everywhere in daily life and society, and autonomously cooperate to provide services and to support life. The concept of ubiquitous computing is related to the distributed cooperative system environment. To realize such a computing environment, a distributed cooperative system in which information processing apparatuses cooperate with each other and the cooperation between the information processing apparatus and an image processing apparatus as an embedded system is important. A distributed cooperative system based on the cooperation of image processing apparatuses as embedded systems may be of significant importance.

Provision of services by the distributed cooperative system environment is implemented by software which runs on any of a plurality of information processing apparatuses and image processing apparatuses connected to a network in practice. Software programs on a plurality of apparatuses may often provide an identical service. A program group which runs while being distributed on a plurality of apparatuses may often provide a service. Services provided in the distributed cooperative system environment and an apparatus group which provides operation terminal functions required to operate them may use different platforms, including, different hardware arrangements and different operating systems. The service content and the operation sequence are normally nondivisible in advanced levels. An algorithm for implementing the operation sequence unique to a service is also localized on the apparatus side that provides the service, thus increasing the degree of freedom in combinations. A method of preparing dedicated software that makes communications according to a protocol specialized to a specific service in each individual apparatus requires high development cost to support various platforms. A system flexible to localize an algorithm is desired. Such a system implements the operation sequence unique to a service on the apparatus side which provides that service, since changes required for expansion and improvement of the service need only be applied to the apparatus which provides the service. Software on an operation terminal side apparatus establishes a connection to a service provider side apparatus in accordance with a primitive protocol which is independent from an operation unique to a specific service.

(Diversified Combinations of Plural Apparatuses Included in Distributed Cooperative System)

Recently, a plurality of information processing apparatuses and a plurality of image processing apparatuses are often connected to local area networks. According to a user's instruction or a predetermined algorithm, these apparatuses are selectively combined to configure a distributed system. As a result, there are complicated combinations of information and image processing apparatuses which communicate with each other. Furthermore, an image processing apparatus called a multi-functional peripheral (MFP) provides a plurality of functions corresponding to a plurality of image processing apparatuses alone. Since these functions can be combined to provide services, the number of combinations increases.

(Combination of Apparatus Which Provide Service and Apparatus Which Use Service)

Configurations in which an information processing apparatus uses an image processing apparatus are known. In one example, an information processing apparatus prints digital data on a paper medium using an image processing apparatus. In another example, an information apparatus scans a paper medium using an image processing apparatus to obtain digital data. In still another example, an information processing apparatus supplies digital data to an image processing apparatus and controls it to transmit that data via FAX or according to various other protocols. In still another example, an information processing apparatus stores data in a storage (box function) in an image processing apparatus or retrieves data from the storage in the image processing apparatus. In still another example, software runs on an information processing apparatus to use and combine a plurality of services provided by a plurality of image processing apparatuses. Furthermore, in still another example, software runs on an information processing apparatus to use and combine a service provided by another information processing apparatus and that provided by the image processing apparatus.

Distributed cooperative systems in which information and image processing apparatuses cooperate with each other and include a configuration in which an image processing apparatus uses an information processing apparatus are known. For example, a push-scan operation in which digital data of an image obtained when an image processing apparatus scans a paper medium is transmitted to an information processing apparatus.

In another example, a series of processes executed by an image processing apparatus are delegated to an information processing apparatus upon requiring large quantities of information processing resources. For example, document data to be handled by the image processing apparatus are stored in the information processing apparatus. Also, log information including copy image data of an image processing job is stored in an information processing apparatus for the purpose of a search or inspection. In these examples, an information processing apparatus executes optical character recognition (OCR) processing, vectorization, and image feature amount calculation processing of raster image data as part of index creation for a search. As another example of processing that an image processing apparatus delegates to an information processing apparatus, a multi-user compatible image processing apparatus executes user authentication required to specify a user, and license information management of access control for each user using an external information processing apparatus.

By delegating a series of processes to be executed to implement the functions of an image processing apparatus to another image processing apparatus, processing which cannot be realized by a single image processing can be realized, and load distribution can be achieved. More specifically, a "remote copy" function and "tandem copy" function in which an MFP cooperates with one or more MFPs and image data scanned by one MFP is printed by another MFP are commercially available.

(Ubiquity of Operations in Distributed Cooperative System)

Implementation of a ubiquitous distributed system environment may allow operation from anywhere to provide services. In order to achieve ubiquitous operations, a few approaches are known. One approach allows the user to operate various services provided by the distributed cooperative system environment from mobile terminals such as a PDA, cell phone, laptop computer, or a wearable computer. Another approach allows the user to operate not only functions provided by an apparatus itself but also various other services provided by the distributed cooperative system environment using display means and operation input means of various apparatuses, which exist in the user's environment, as operation terminals. The latter approach allows the user to operate a desired one of various services provided by the environment using an operation unit of a nearby apparatus regardless of the user's location. In order to ubiquitously provide operation means, it may be necessary to remotely operate an arbitrary service of various services provided by the distributed cooperative system environment using an arbitrary apparatus, such as an operation terminal.

(Diversified Combinations of Apparatus Which Provides Service and Apparatus Which Operates Service)

To remotely operate a desired apparatus using an arbitrary apparatus as an operation terminal, it is effective to connect these apparatuses via a communication protocol which is cross-platform compatible, and consequently allows a high degree of freedom in combinations.

Examples of cross-platform communication protocols, which can be used to implement a distributed system in which an apparatus for providing a service and an apparatus for operating the service are separated, and which allow a high degree of freedom in combinations, include known remote desktop and Web application techniques.

The remote desktop technique is a technique which transfers display output data and operation input data of a screen used to operate a certain computer using a network protocol, and allows another computer to remotely operate a GUI of that computer via a network. The screen display data has a relatively primitive and universal data expression, such as a pixel map and rendering instructions, and the operation input data is also primitive and universal data which is generated by a keyboard, pointing device, or the like. For this reason, this technique has a high degree of independence from platforms, and is suited to combine various operation terminals and operation targets. An example of this technique is a lightweight remote desktop system known as Virtual Network Computing (VNC), which is platform-independent and simple and based on a display protocol called RFB. (see Tristan Richardson, Quentin Stafford-Fraser, Kenneth R. Wood and Andy Hopper, "Virtual Network Computing" (IEEE Internet Computing, Volume 2, Number 1, January/February 1998, pp. 33-38).

The Web application technique is a distributed application which uses a markup language, such as HTML, to describe a user interface, and configures a presentation layer of an application program on a remote Web browser.

There are various approaches for remotely operating various apparatuses from various other apparatuses. These approaches include: operating an information processing apparatus from another information processing apparatus; operating an image processing apparatus from an information processing apparatus; operating an information processing apparatus from an image processing apparatus; operating an image processing apparatus from another image processing apparatus.

(Operation of Information Processing Apparatus from Another Information Processing Apparatus)

In order to operate, from an information processing apparatus, another information processing apparatus using the remote desktop technique, software of a remote desktop client runs on the operation terminal side, and software of a remote desktop server runs on an information processing apparatus on the operation target side. The remote desktop server usually transfers a display equivalent to a desktop screen displayed on a bitmap display device of the information processing apparatus to the remote desktop client. The remote desktop server may transfer a display corresponding to a GUI of specific application software to the remote desktop client.

When an information processing apparatus operates another information processing apparatus using the Web application technique, software of a Web browser runs on the information processing apparatus on the operation terminal side, and software of a Web server runs on that on the operation target side.

(Operation of Image Processing Apparatus from Information Processing Apparatus)

When the user operates an image processing apparatus from an information processing apparatus using the remote desktop technique, software of a remote desktop client runs on the information processing apparatus, and software of an embedded remote desktop server runs on the image processing apparatus. A remote desktop server function is embedded in an MFP, and a remote desktop client on a computer can remotely operate an operation unit of the MFP. The remote desktop server transfers a display equivalent to an operation screen displayed on a display device of an operation unit of the image processing apparatus to the remote desktop client.

Upon connecting an image processing apparatus used as an operation terminal and an apparatus that provides services via a cross-platform communication protocol, a degree of freedom in combinations increases. As a result, the number of options of image processing apparatuses, which appear in communication to serve as input, output, and storage functions increases. For example, during an operation of a remote operation target from an image processing apparatus, when the user wants to issue a print instruction from the remote operation target apparatus to the image processing apparatus in front of the user, the user has to discover and select the image processing apparatus in front of the user from many possible options. This may be difficult when an apparatus serves as an output destination apparatus of a print instruction or the like, but also when it serves as an input source, upload destination, download source, and the like in cooperation in the distributed cooperative system. That is, when the number of possible combinations of operation terminals and operation target apparatuses is large, and the number of options of image processing apparatuses which have a part in cooperation upon implementation of services of the distributed cooperative system is large, it is difficult for a user to select an input apparatus, output apparatus, storage apparatus, and the like.

When the user operates an image processing apparatus from an information processing apparatus using the Web application technique, software of a Web browser runs on the information processing apparatus, and software of an embedded Web server runs on the image processing apparatus. A Web application which is built on the embedded Web server on an MFP and accesses various functions of a controller of the MFP from a Web browser may be embedded. For example, the user can use various functions of the MFP from the Web browser on the computer using a Web application which is embedded in the MFP and is called a "remote UI". The user can also manage the settings of the apparatuses and functions, can monitor and change the statuses of the apparatuses and functions, and can display, export, and import data stored in the apparatus.

(Operation of Information Processing Apparatus from Image Processing Apparatus)

When the user operates an information processing apparatus from an image processing apparatus using the remote desktop technique, software of an embedded remote desktop client runs on the image processing apparatus. The embedded remote desktop client on the image processing apparatus establishes a connection to a remote desktop server on the information processing server, and allows the user to operate the information processing apparatus using an operation unit of the image processing apparatus.

When the user operates an information processing apparatus from an image processing apparatus using the Web application technique, software of an embedded Web browser runs on the image processing apparatus. The embedded Web browser on the image processing apparatus establishes a connection to a Web server on the information processing apparatus, and allows the user to operate a Web application on the information processing apparatus using an operation unit of the image processing apparatus. For example, the embedded Web browser is embedded in an MFP, and the user accesses the Web server using an LCD screen and touch panel of the operation unit. On the Web server which runs on the information processing apparatus side, various Web applications can be built.

The user may access a Web application that implements a workflow including an operation that handles an image document using an image processing apparatus from an embedded Web browser of that image processing apparatus. In this case, the processing step that uses image processing functions unique to the image processing apparatus can be embedded in a session of the Web application based on a Hypertext Transfer Protocol (HTTP). The session of the Web application is a series of processes executed by repetitions of an HTTP request from the Web browser to the Web server and an HTTP response from the Web server to the Web browser.

For example, the user accesses, from the embedded Web browser of the MFP, a Web application which implements a workflow system that is based on a document management system, and inputs, processes, and stores forms. In this case, in the step of inputting a form document into the system, image data read by scanning a paper medium of a form by a scanner of the MFP on which the user operates the Web browser can be uploaded to the Web server via the HTTP.

Since the series of processes that form the workflow can be controlled by the Web application on the information processing apparatus side, it is easy to flexibly meet requirements of various workflows. This is because software on the information processing apparatus generally has relatively abundant available computer resources (a CPU, storage device, and the like) and high flexibility and expandability compared to firmware on the image processing apparatus. With such a combination, the distributed cooperative system may effectively use the characteristics of respective apparatuses, and can easily cope with various solutions.

If services are implemented by an apparatus on the operation target side, when an apparatus on the operation terminal side plays a certain cooperation role, a simple operation is required for the user to select a nearby apparatus each time. The apparatus on the operation terminal side serves as an input apparatus, which scans a paper document to read image data, and uploads the image data to the operation target side apparatus.

This is effective when a protocol used in remote operation control between the operation terminal and operation target and that used in inter-apparatus cooperation in the distributed system are limited to an identical HTTP, and a communication for cooperation is completed within a remote operation session. The number of combinations of possible cooperation increases when an optimal apparatus cooperation protocol of the distributed cooperative system can is freely used, and it is normally easy to implement high-efficient cooperation. For example, in order to issue a print instruction to an output apparatus, the user may want to use an LPR or Internet Printing Protocol (IPP) which is generally used for printing. Also, to store or retrieve data to or from a storage device, the user may want to use a protocol such as a network file system (NFS) or file transfer protocol (FTP). As in these examples, since there are various kinds of optimal protocols according to the nature of cooperation of the distributed system, optimal protocols are to be selected. Also, a technique which can freely configure a session for a remote operation, and a session for inter-apparatus cooperation in the distributed cooperative system as independent sessions may be required. This is because another apparatus which is not the operation terminal side apparatus may often play an arbitrary role in cooperation in those between apparatuses required to implement services of the distributed cooperative system.

(Operation of an Image Processing Apparatus from Another Image Processing Apparatus)

When the user operates, from an image processing apparatus, another image processing apparatus, a dedicated client application and a dedicated server application may be arranged on the image processing apparatuses on the operation terminal side and operation target side, and unique information on the operation target side may be stored on the operation terminal side.

(Context Awareness that Enhances Efficiency of Operation Ubiquitous System)

When the user operates an application program on an information processing apparatus while the user leaves the information processing apparatus and uses an image processing apparatus, an agent program which runs on the information processing apparatus issues a remote operation request to the image processing apparatus.

In a distributed cooperative system included in an image processing system, it is important to allow the user to operate a service provided by the distributed cooperative system from the image processing apparatus in accordance with the user's operation sequence (workflow). This is because the user and paper sheets are not part of the network system. The user moves around a physical space such as an office, stands in front of an image processing apparatus at an arbitrary time, inputs data obtained by scanning a paper document into a digital space of the system environment, and picks up paper sheets on which digital data output from the digital space of the system environment are printed. the user and paper sheets interact with the distributed system environment via the image processing apparatus. Therefore, the image processing apparatus can often be an optimal place where the user operates a service provided by the distributed operative system in accordance with the user's operation sequence (workflow).

When the ubiquity of operation is achieved and, the image processing apparatus allows the user to operate a service provided by the distributed cooperative system, to make good use of the situation, the user stands in front of the image processing apparatus at a certain time, and operates a remote information processing apparatus.

Based on the above presuppositions, a first exemplary embodiment of the present invention will now be discussed.

(System Arrangement)

FIG. 1 is a block diagram showing the overall arrangement of an image processing system according to the first embodiment of the present invention.

Referring to FIG. 1, the image processing system includes image processing apparatuses 110, 120, and 130, a desktop computer 101, and a server computer 102, which can communicate with each other via a network. The network includes, for example, a LAN (Local Area Network) 100.

The image processing apparatus 110 is an MFP which includes a scanner 113 as an image input device, a printer 114 as an image output device, a controller unit 111, and an operation unit 112 as a user interface. However, in the present invention, the image processing apparatus is not limited to an MFP, and any other apparatuses may be used that can process images. For example, a standalone printer, standalone scanner, standalone FAX apparatus, and the like may be used.

The scanner 113, printer 114, and operation unit 112 are connected to the controller unit 111, and are controlled by instructions from the controller unit 111. The controller unit 111 is connected to the LAN 100.

The image processing apparatuses 120 and 130 have the same arrangement as the image processing apparatus 110. The image processing apparatus 120 includes a scanner 123, printer 124, and operation unit 122, which are connected to a controller unit 121. The image processing apparatus 130 includes a scanner 133, printer 134, and operation unit 132, which are connected to a controller unit 131.

The desktop computer 101 is an information processing apparatus which is regularly used by the user, and stores application programs used by the user, user data, and the like. The desktop computer 101 can also execute distributed applications in cooperation with the image processing apparatuses 110, 120, and 130, and the server computer 102 via the LAN 100.

The server computer 102 is an information processing apparatus shared by a plurality of users, can provide services to the desktop computer 101 and image processing apparatuses 110, 120, and 130, and can combine them to cooperate with each other.

Figure 2:
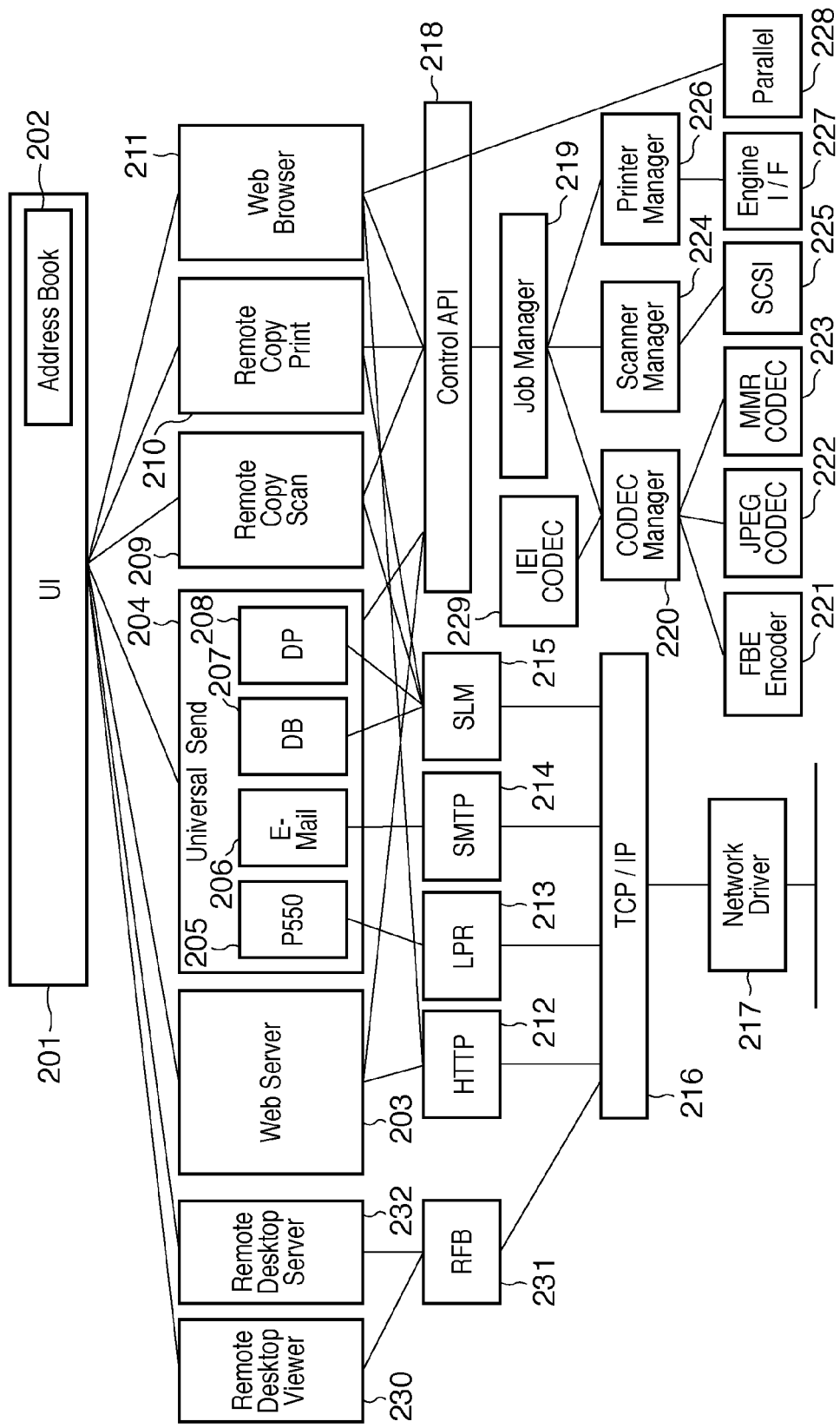
FIG. 2 is a block diagram showing the configuration of software executed by image processing apparatuses 110, 120, and 130.

FIG. 2 is a block diagram showing the configuration of software executed by each of the image processing apparatuses 110, 120, and 130.

A user interface (UI) module 201 is an intermediary between the image processing apparatus and user operations when the operator makes various operations and settings with respect to the image processing apparatus. The UI module 201 transfers input information to various modules in accordance with operator's operations, and requests the modules to execute processing or sets data.

An Address-Book module 202 is a database module which manages data delivery destinations, communication destinations, and the like. Addition, deletion, and acquisition of data are made with respect to data managed by the Address-Book module 202 in accordance with an operation instruction from the UI module 201. From the Address-Book module 202, data delivery or communication destination information is supplied to respective modules in accordance with an operator's operation.

A Web-Server module 203 executes an embedded Web application in response to a request from a Web client (e.g., the desktop computer 101). The embedded Web application includes a Universal-Send module 204 and Remote-Copy-Scan module 209. The embedded Web application accesses the functions, settings, statuses, and the like of the apparatus by communicating with a Remote-Copy-Print module 210, Control-API 218, and the like. The embedded Web application communicates with a Web client via an HTTP module 212, TCP/IP communication module 216, and Network-Driver 217.

The Universal-Send module 204 is a module which controls data delivery. The Universal-Send module 204 delivers data designated by an operator via the UI module 201 to a communication (output) destination. When the operator instructs to generate delivery data using a scanner function of this apparatus, the Universal-Send module 204 activates this apparatus via the Control-API 218 to generate data.

A P550 module 205 is included in the Universal-Send module 204, and is executed when a printer is designated as an output destination. An E-Mail module 206 is included in the Universal-Send module 204, and is executed when an E-mail address is designated as a communication destination. A DB module 207 is included in the Universal-Send module 204, and is executed when a database is designated as an output destination. A DP module 208 is included in the Universal-Send module 204, and is executed when an image processing apparatus similar to this apparatus is designated as an output destination.

A Remote-Copy-Scan module 209 implements a copy function, which is originally implemented by a single apparatus, using a plurality of image processing apparatuses, by reading image information using the scanner function of the image processing apparatus, and outputting the read image information to another image processing apparatus connected via the network.

A Remote-Copy-Print module 210 implements a copy function, which is originally implemented by a single apparatus, using a plurality of image processing apparatuses, by outputting image information obtained by another image processing apparatus connected via the network using the print function of this image processing apparatus.

A Web browser 211 loads information of various Web sites (homepages) and Web applications on the Internet or intranet to display the loaded information on the operation unit 122, and transmits operation input information from the operation unit 122 to the Web sites and Web application. The detailed configuration of the Web browser will be described later.

An HTTP module 212 is used when the image processing apparatus makes a communication based on an HTTP (HyperText Transfer Protocol). The HTTP module 212 provides a communication function to the Web-Server 203 and Web browser 211 using the TCP/IP communication module 216. The HTTP module 212 is compliant to various protocols used on the Internet such as the HTTP, and especially provides a communication function based on a security-compatible protocol.

An LPR module 213 provides a communication function to the P550 module 205 in the Universal-Send module 204 using the TCP/IP communication module 216.

An SMTP module 214 provides a communication function to the E-Mail module 206 in the Universal-Send module 204 using the TCP/IP communication module 216.

An SLM (Salutation-Manager) module 215 provides a communication function to the DB module 207 and DP module 208 in the Universal-Send module 204, the Remote-Copy-Scan module 209, and the Remote-Copy-Print module 210 using the TCP/IP communication module 216.

A TCP/IP communication module 216 provides a network communication function to various modules mentioned above using the Network-Driver 217. A Network-Driver 217 controls modules physically connected to the network.

A Control-API 218 provides, to upstream modules such as the Universal-Send module 204, an interface for downstream modules such as a Job-Manager module 219. With this module, the dependence between the upstream and downstream modules can be reduced, thus enhancing their applicability.

A Job-Manager module 219 interprets various processes instructed from various modules described above via the Control-API 218, and issues instructions to respective modules 220, 224, and 226. The Job-Manager module 219 unifies management of hardware processes executed in the image processing apparatus.

A CODEC-Manager module 220 manages and controls various compression and decompression processes of data of those instructed by the Job-Manager module 219.

An FBE-Encoder module 221 compresses data read by the scan processing executed by the Job-Manager module 219 and a Scan-Manager module 224 using an FBE format.

A JPEG-CODEC module 222 executes JPEG compression of data read by the scan processing executed by the Job-Manager module 219 and Scan-Manager module 224. Or this module executes JPEG decompression processing of print data in print processing executed by a Print-Manager module 226.

An MMR-CODEC module 223 executes MMR compression of data read by the scan processing executed by the Job-Manager module 219 and Scan-Manager module 224. Or this module executes MMR decompression processing of print data in print processing executed by the Print-Manager module 226.

An information embedded image-CODEC (IEI-CODEC) module 229 decodes information embedded in image data read by the scan processing executed by the Job-Manager module 219 and Scan-Manager module 224. The IEI-CODEC module 229 embeds information in print image data in print processing executed by the Print-Manager module 226. Information is embedded in image data using an encoding technique such as a barcode or digital watermarking. Also, this module supports character recognition that recognizes characters in an image of image data by block separation and an OCR technique and converts them into text data as a decoding technique. Furthermore, this module supports conversion from text into image data using a raster image processor, and overlay of the converted image data and original image data as a kind of encoding technique (information embedding technique).

The Scan-Manager module 224 manages and controls scan processing instructed by the Job-Manager module 219.

A SCSI driver 225 is an intermediary between the Scan-Manager module 224 and a scanner unit internally connected to the image processing apparatus.

A Print-Manager module 226 manages and controls print processing instructed by the Job-Manager module 219.

An Engine-I/F module 227 provides an interface between the Print-Manager module 226 and a print unit.

A parallel port driver 228 provides an I/F upon outputting data to an output device (not shown) via a parallel port.

A remote desktop viewer 230 (to be also referred to as a remote desktop client hereinafter) serves as a client application of a remote desktop protocol. That is, the remote desktop viewer acquires operation screen data of a remote apparatus (e.g., a desktop screen of the desktop computer 101) and displays it on the operation unit 122. Also, the remote desktop viewer transmits a user's operation input to the operation unit 122 as operation input data to a remote apparatus.

A remote frame buffer (RFB) protocol processing module 231 executes network communication control according to the remote desktop protocol in the VNC as one of the prevalently used remote desktop systems.

A remote desktop server 232 serves as a server application of the remote desktop protocol. That is, upon establishing a connection from a remote desktop client of a remote apparatus, the remote desktop server 232 transmits operation screen data to be displayed on the operation unit 122 to the client. Also, the remote desktop server 232 generates an operation input event equivalent to that made at the operation unit 122 in accordance with operation input data received from the client.

Figure 3:
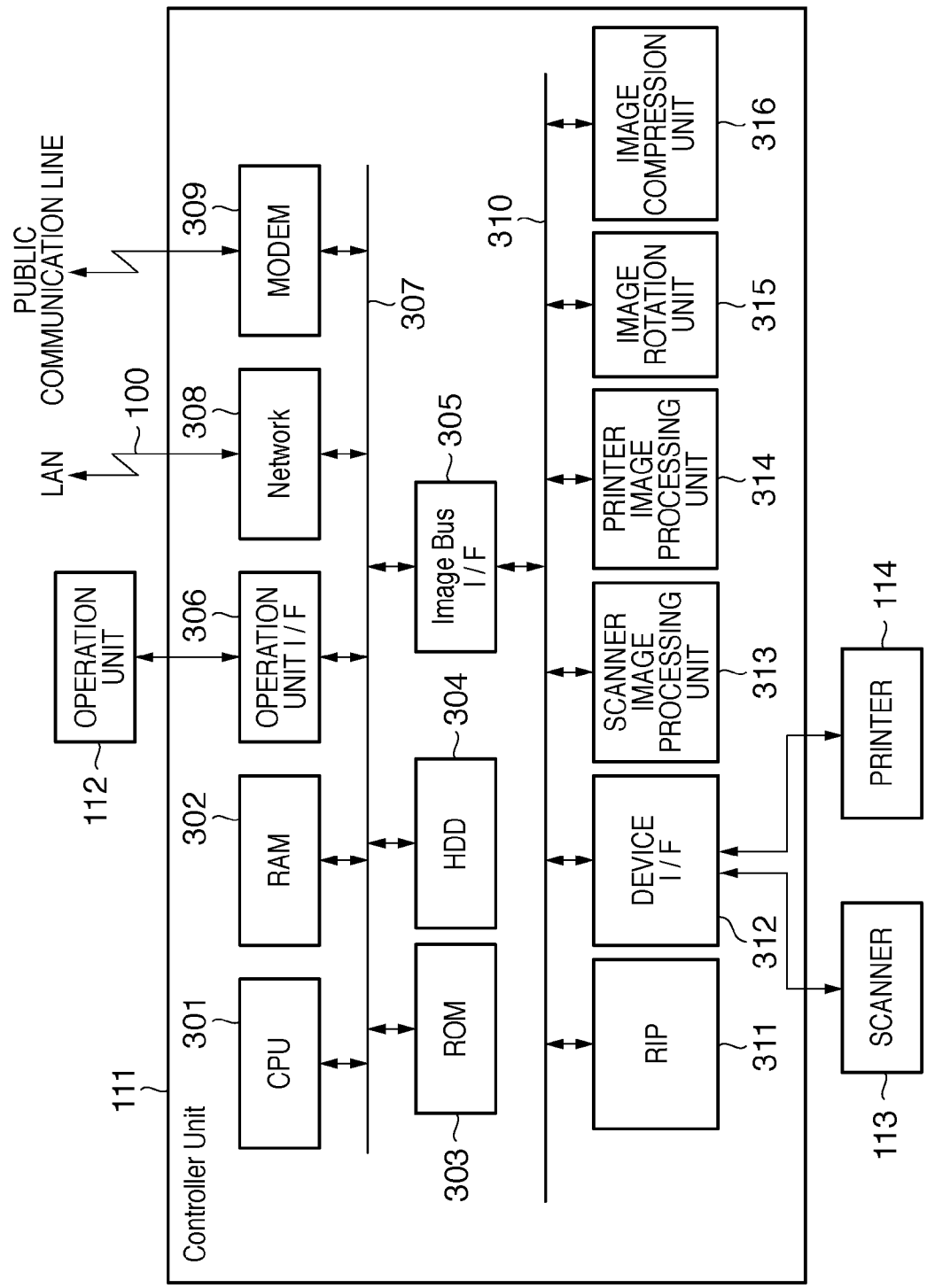
FIG. 3 is a block diagram showing the hardware arrangement of the image processing apparatus 110.

FIG. 3 is a block diagram showing the hardware arrangement of the image processing apparatus 110. The image processing apparatuses 120 and 130 also have the same arrangement.

The controller unit 111 is a controller which is connected to the scanner 113 as the image input device and the printer 114 as the image output device, and is also connected to the LAN 100 and a public communication line (WAN), thus inputting and outputting image information and device information.

A CPU 301 is a controller which controls the overall controller unit 111. A RAM 302 is a system work memory used for the operation of the CPU 301. The RAM 302 is also an image memory which temporarily stores image data. A ROM 303 is a boot ROM, which stores a boot program of the system. An HDD 304 is a hard disk drive, which stores system software and image data.

An operation unit I/F 306 controls an interface with the operation unit (UI) 112, and outputs image data to be displayed on the operation unit 112 to the operation unit 112. Also, the operation unit I/F 306 serves to inform the CPU 301 of information which is input by the user via the operation unit 112.

A network interface (Network) 308 controls connection with the LAN 100, and inputs/outputs information onto the LAN 100. A modem (MODEM) 309 controls the connection with the public communication line, and inputs/outputs information onto the public communication line. These devices are connected to a system bus 307.

An image bus interface (Image Bus I/F) 305 is a bus bridge, which connects the system bus 307 and an image bus 310 that transfers image data at high speed, and converts the data structure. The image bus 310 includes a PCI bus or IEEE1394.

To the image bus 310, the following devices are connected. A raster image processor (RIP) 311 rasterizes PDL code data transmitted from the network into bitmap image data. A device I/F 312 connects the scanner 113 and printer 114 as the image input and output devices to the controller unit 111 to convert a synchronous system and asynchronous system of image data.

A scanner image processing unit 313 corrects, modifies, and edits input image data. A printer image processing unit 314 executes correction, resolution conversion, and the like of print output image data in accordance with the performance of the printer 114. An image rotation unit 315 rotates image data. An image compression unit 316 applies JPEG compression/decompression processing to multi-valued image data, and compression/decompression processing of JBIG, MMR, or MH to binary image data.

FIG. 4 is a perspective view showing the image processing apparatus 110. Note that the following description will be given in association with the image processing apparatus 110. The image processing apparatuses 120 and 130 include the same arrangement and execute the same operations.

The scanner 113 as the image input device illuminates an image on a paper sheet serving as an original, and scans a CCD line sensor (not shown), thereby generating raster image data.

The user sets original sheets on a tray 406 of a document feeder 405, and inputs a scan start instruction at the operation unit 112. Then, the CPU 301 of the controller unit 111 supplies an instruction to the scanner 113, the original sheets set on the tray 406 are fed one by one, and the scanner 113 scans original images.

The printer 114 as the image output device prints raster image data on a paper sheet. The print method includes an electrophotography method that uses a photosensitive drum or belt, and an ink-jet method that directly prints an image on a paper sheet by ejecting ink from a micro-nozzle array, and either of these methods may be used. Note that the print operation is started in response to an instruction from the CPU 301.

The printer 114 has a plurality of paper feed stages to be able to select different paper sizes and different paper orientations, and includes corresponding paper cassettes 401, 402, and 403. A discharge tray 404 receives printed paper sheets.

Figure 5:
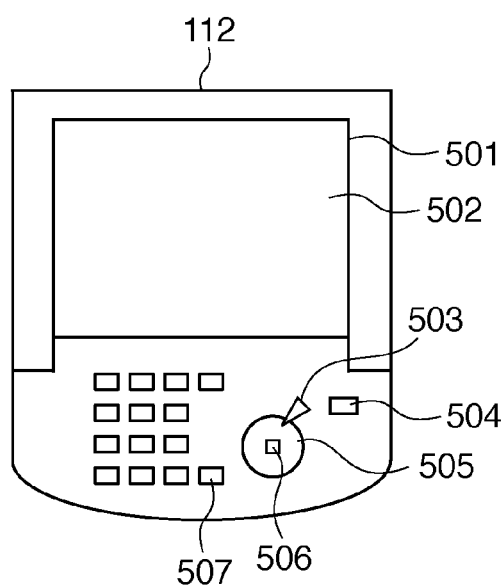
FIG. 5 is a view showing the arrangement of an operation unit 112 of the image processing apparatus 110.

FIG. 5 is a view showing the arrangement of the operation unit 112 of the image processing apparatus 110. Note that the operation units of the image processing apparatuses 120 and 130 may have the same arrangement.

An LCD 501 includes a touch panel 502. The LCD 501 displays an operation screen of the image processing apparatus 110 and software keys. Upon pressing one of the displayed keys, the LCD 501 informs the CPU 301 of the controller unit 111 of position information indicating the pressed position.

A start key 505 is pressed when the user wants to start, for example, an original image scan operation. The central portion of the start key 505 includes a two-color LED indicator 506 which has green and red LEDs, and indicates by its color whether or not the start key 505 is ready to operate. A stop key 503 is pressed when the user wants to stop the active operation of the image processing apparatus 110. An ID key 507 is pressed when the user inputs a user ID. A reset key 504 is operated when the user wants to initialize the settings on the operation unit 112.

Figure 6:
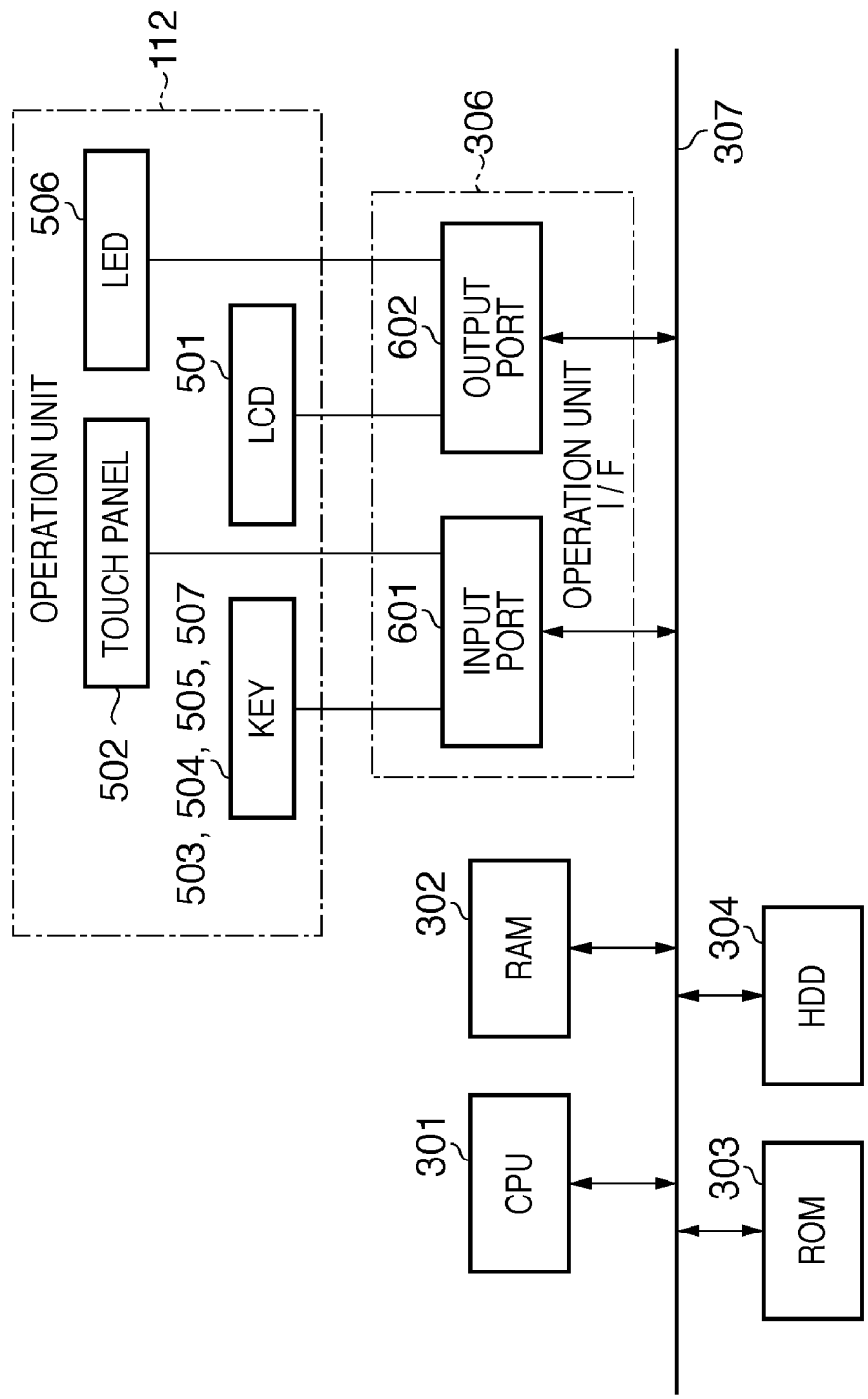
FIG. 6 is a block diagram showing the internal arrangement of the operation unit 112 and an operation unit I/F 306 of the image processing apparatus 110 in correspondence with that of a controller unit 111.

FIG. 6 is a block diagram showing the internal arrangements of the operation unit 112 and the operation unit I/F 306 of the image processing apparatus 110 in correspondence with that of the controller unit 111. Note that while the following description will be given in association with the image processing apparatus 110, it is also applicable to the image processing apparatus 120 or 130.

The operation unit 112 is connected to the system bus 307 via the operation unit I/F 306. The CPU 301, RAM 302, ROM 303, and HDD 304 are connected to the system bus 307. The CPU 301 systematically controls access to various devices connected to the system bus 307 based on control programs and the like stored in the ROM 303 and HDD 304. The CPU 301 loads input information from the scanner 113 connected via the device I/F 312, and outputs an image signal as output information to the printer 114 connected via the device I/F 312. The RAM 302 serves as a main memory, work area, and the like of the CPU 301.

Pieces of user input information from the touch panel 502 and various hardware keys 503, 504, 505, and 507 are passed to the CPU 301 via an input port 601. The CPU 301 generates display screen data based on the contents of the user input information and the control program, and outputs that display screen data to the LCD 501 via an output port 602 that controls a screen output device. Also, the CPU 301 controls the two-color LED indicator 506 as needed.

Figure 7:
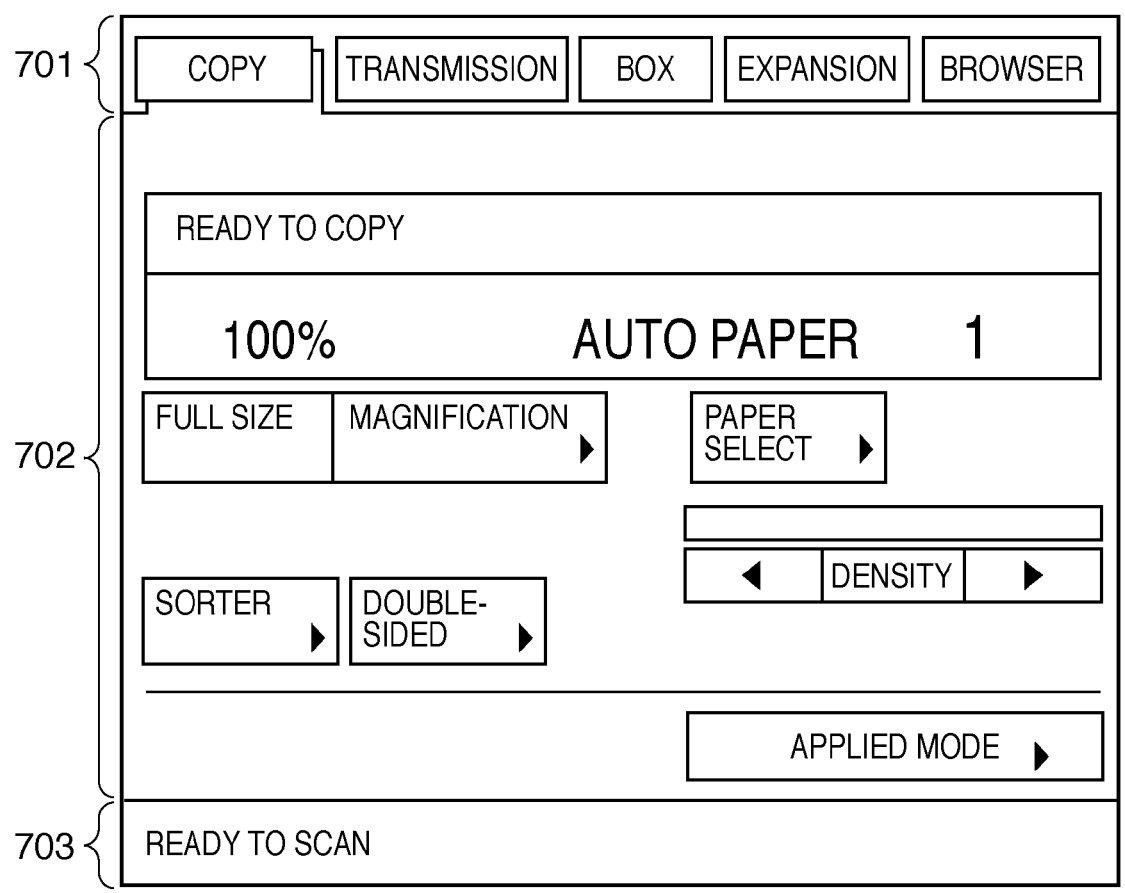
FIG. 7 is a view showing a standard operation screen displayed on the operation unit 112 of the image processing apparatus 110.

FIG. 7 is a view showing an example of a standard operation screen displayed on the operation unit 112 of the image processing apparatus 110.

Buttons juxtaposed on an uppermost part 701 of FIG. 7 are those used to select one of various functions provided by the image processing apparatus 110. A copy function is used to obtain a copy of an original by printing original image data, which is scanned and read by the scanner 113, using the printer 114.

A transmission function is used to transmit original image data read by the scanner 113 and image data stored in the HDD 304 to various output destinations. The output destinations include various output destinations to which data can be transmitted using various protocols via the network interface 308 and those to which data can be transmitted using protocols such as FAX via the modem 309. This function allows transmission of data by selecting a plurality of output destinations from those destinations.

A box function is used to browse, edit, print, and transmit document files such as image data and code data stored in the HDD 304. The HDD 304 stores various document files. For example, such document files include original image data read by the scanner 113, data downloaded via the network interface 308, print data received via the network interface 308, and FAX data received via the modem 309. The box function can be used as an electronic mail box in an office environment. Also, the box function can be used as a secured print function that enhances the confidentiality of a PDL print job by delaying a print output onto paper sheets until the user inputs a password.

An expansion function is used to call various expansion functions such as, for example, locking the scanner 113 for the purpose of use from an external apparatus. A browser function is used to browse Web sites.

A middle part 702 in FIG. 7 displays an operation screen when the copy function is selected. A lowermost part 703 corresponds to a status display area, which displays various messages including the respective functions of the image processing apparatus 110, information of the apparatus itself, and the like to the user irrespective of the function selected on the uppermost part 701.

(Operation of Distributed Application by Web Browser)

Figure 8:
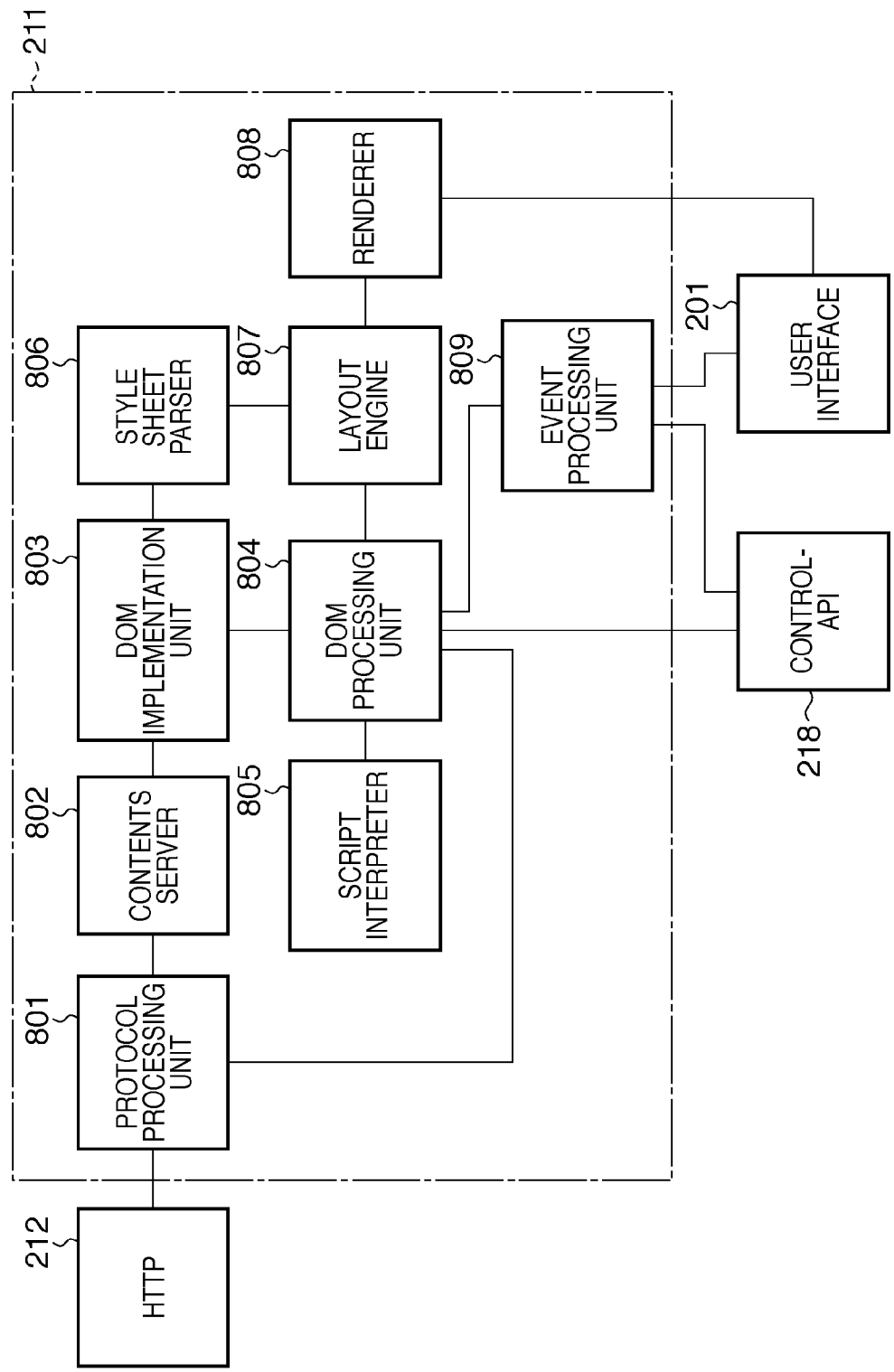
FIG. 8 is a block diagram showing the internal configuration of a Web browser 211 shown in FIG. 2.

FIG. 8 is a block diagram showing the internal configuration of the Web browser 211 shown in FIG. 2.

A protocol processing unit 801 establishes a connection to another network node via the HTTP module 212 and makes a communication with that node. In this communication, the protocol processing unit 801 issues an HTTP request to a resource described by a URL, and acquires its response. In this process, the protocol processing unit 801 encodes or decodes communication data according to various encoding formats.

A contents parser 802 receives contents data, which is expressed in an expression format such as HTML, XML, or XHTML, from the protocol processing unit 801, and executes lexical analysis and parsing to generate a parse tree.

A DOM implementation unit 803 receives the parse tree from the contents parser 802, and implements a Document Object Model (DOM) corresponding to the structure of the contents data. That is, the conventional HTML permits various grammatical abbreviations, and includes a broad array of variations. Furthermore, practically managed contents are often improper. Hence, the DOM implementation unit 803 deduces a correct logical structure of grammatically improper contents data and attempts to implement a proper DOM as in other prevalent Web browsers.

A DOM processing unit 804 holds and manages the DOM implemented by the DOM implementation unit 803 on a memory as a tree structure that expresses a nested relationship of objects. Various kinds of processing of the Web browser are implemented with a focus on this DOM.

A layout engine 807 recursively determines visual presentations of objects in accordance with the tree structure of objects held by the DOM processing unit 804, and consequently obtains a layout of the overall document. The visual presentations of respective objects are often explicitly designated in a style sheet format such as a Cascading Style Sheet (CSS) by a description embedded in a document or by a description in an independent file linked from the document.

A style sheet parser 806 parses a style sheet associated with the document of contents.

The layout engine 807 determines the document layout by reflecting the parsing result of the style sheet.

A renderer 808 generates Graphical User Interface (GUI) data to be displayed on the LCD 501 (FIG. 5) in accordance with the document layout determined by the layout engine 807. The generated GUI data is displayed on the LCD 501 by the UI module 201.

An event processing unit 809 receives an event of an operation made by the user with respect to the touch panel 502 and respective keys on the operation unit 112, and executes processing corresponding to the received event. The event processing unit 809 receives a status transition event of an apparatus, job, or the like from the Control-API 218, and executes processing corresponding to the received event. In the DOM tree structure managed by the DOM processing unit 804, event handlers corresponding to various events are registered for respective object classes and respective object instances. The event processing unit 809 determines, in accordance with the generated event, an object, which is to have a task of processing that event, of those managed by the DOM processing unit 804, and delivers the event to that object. The object which received the delivered event executes various kinds of processing in accordance with an algorithm of an event handler corresponding to that event. The processing of the event handler includes updating of the DOM held by the DOM processing unit 804, a re-rendering instruction to the layout engine 807, an HTTP request issuance instruction to the protocol processing unit 801, and control of the image processing apparatus function called by the Control-API 218.

A script interpreter 805 interprets and executes a script such as JavaScript (ECMA Script). The script is embedded in a document or is described in an independent file linked from a document, and makes, for example, manipulations of the DOM. A contents provider can program dynamic behaviors of a document to be provided using the script.

Figure 9:
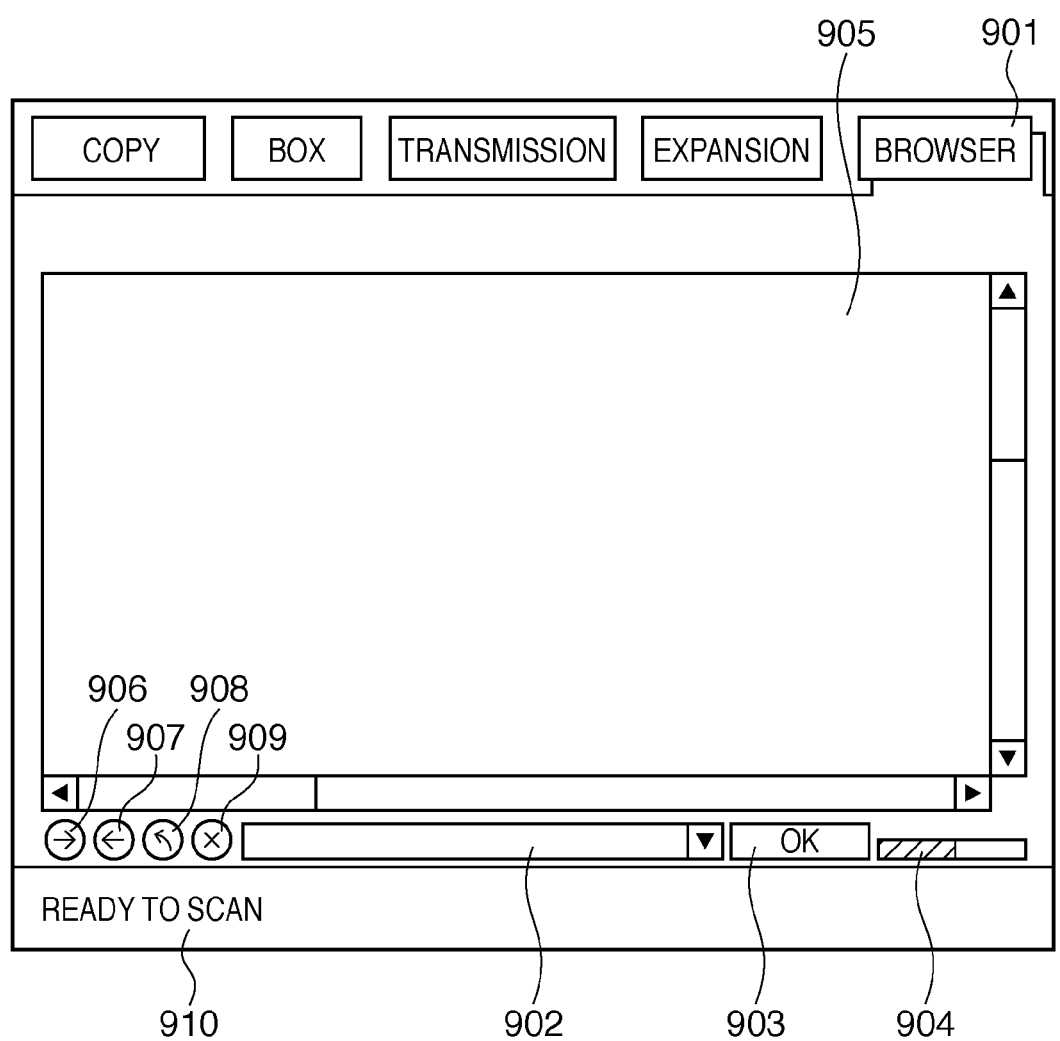
FIG. 9 is a view showing the configuration of a screen displayed when a Web browser function is selected on an LCD display unit 501 shown in FIG. 5.

FIG. 9 is a view showing the configuration of a screen displayed when the Web browser function is selected on the LCD 501 shown in FIG. 5.

A tab 901 is used to select the Web browser function. Upon selecting this tab, the display screen is switched from that of another function (copy, box, transmission, or expansion) to that of the Web browser function.

A URL input field 902 is used when the user inputs a URL of a desired resource. When the user presses this field, a virtual full keyboard (not shown) used to input characters is displayed. The user can input a desired character string using software keys which are arranged on the virtual full keyboard and simulate key tops.

An OK button 903 is a software key used to settle the URL character string input to the URL input field 902. After the URL is settled, the Web browser 211 issues an HTTP request to acquire the designated resource. A progress bar 904 indicates the progress status of content acquisition processing based on an HTTP request response. A content display area 905 displays the acquired resource.

A back button 906 is a software key which is pressed to trace back the content display history and to re-display content displayed before the currently displayed content. A next button 907 is a software key which is pressed to return to a display of content displayed after the currently displayed content upon displaying the content by tracing back the content display history. A reload button 908 is a software key, which is pressed to re-acquire and re-display the currently displayed content. A cancel button 909 is a software key, which is pressed to cancel the content acquisition processing in execution.

A status area 910 (lowermost part 703) displays messages from respective functions of the image processing apparatus 110. The status area 910 displays a message that draws a user's attention from the scanner 113, printer 114, or another function even when the Web browser screen is being displayed. Likewise, the status area 910 also displays a message from the Web browser function. From the Web browser function, a URL character string of a link destination, a title character string of content, a message designated by a script, and the like are sent.

FIG. 10 is a sequence chart showing HTTP requests using the HTTP protocol by a client 1001, and responses from a server 1002.

A client 1001 is software which transmits an HTTP request, and receives an HTTP response. The client 1001 corresponds to the Web browsers incorporated in the image processing apparatuses 110, 120, and 130, general Web browsers which run on a PC, PDA, cell phone, and the like, and various kinds of software which access a Web server by the same method as the Web browser to use or relay services. A server 1002 is software which receives an HTTP request to execute corresponding processing, and also returns an HTTP response. The server 1002 corresponds to various HTTP servers such as software of an application service provider, server software implemented in the Intranet, and Web application software which runs on the desktop computer 101.

The client 1001 transmits an HTTP request 1003 including a GET request of a desired resource to the server 1002. The resource is normally designated in a URI (especially, URL) format.

The server 1002 acquires or generates data corresponding to the resource designated by the GET request, and returns the data using an HTTP response 1004. When the designated resource corresponds to a static file, the server 1002 acquires that data by reading out the corresponding file from its file system. When the designated resource corresponds to processing of a CGI program or servlet, the server 1002 executes the corresponding processing. This processing generates a response to the request, and includes a side effect such as execution of a business logic required to achieve a predetermined service and access to a backend DBMS. The server 1002 then returns data generated as a result of that processing.

When the data obtained as the HTTP response 1004 has a displayable format, the client 1001 displays the contents.

When the obtained data is an HTML document or the like, acquisition and display of new resources are repeated in turn when the user selects only link information embedded as a hypertext in a document displayed on the Web browser.

An HTTP request 1005 is a POST request. An HTML document can include a form used to request the user on the client 1001 side to input data. In the HTML document, a form includes another form, and when "POST" is designated as its method, and the user submits that form, a POST request to the designated resource is transmitted. As the POST request, the client 1001 transmits data toward the server 1002 (data is also returned from the server 1002 to the client 1001 by a response). Information input to the form displayed on the Web browser by the user is encoded, and is transmitted to the server 1002 using the POST request. The designated resource of the server 1002 receives and processes data sent from the client 1001, and generates and returns an HTTP response 1006.

The HTTP response 1006 is the same as the HTTP response 1004. If the obtained data has a displayable format, the client 1001 displays the contents. When the obtained data is an HTML document or the like, acquisition and display of new resources are repeated in turn when the user selects only link information embedded as a hypertext in a document displayed on the Web browser.

Therefore, a user interface used to manipulate various application logics which run on the server 1002 side from the client 1001 side can be described using a markup language such as HTML. That is, content that combines a description which displays the status of an application logic on the server side and that which requests to input to the application logic can be configured to be repetitively acquired in response to a request from the client 1001 side. Then, a distributed application which allows the client 1001 side to manipulate the application logic on the server 1002 side can be provided.

FIG. 11 is a view showing the configuration of a screen displayed when the VNC viewer function is selected on the LCD 501 shown in FIG. 5.

A tab 1101 is used to select the VNC viewer function. Upon selection of this tab, the display screen is switched from that of another function (copy, box, transmission, or browser) to that of the VNC viewer function.

A remote desktop display area 1102 displays operation screen data of a remote apparatus (for example, a desktop screen of the desktop computer 101) acquired by the remote desktop protocol. When the number of display pixels of screen data to be displayed exceeds the number of pixels of this area, a displayable part of the screen data is displayed on this area, and horizontal and vertical scroll bars are also displayed. The user can view a desired part of the screen data by scroll operations using the scroll bars. When the user designates a reduce button 1103 or enlarge button 1104, the screen data can be displayed to have a relationship between the resolution of the desktop screen of the remote apparatus and that of the remote desktop display area 1102 other than 1:1 (i.e., to enlarge or reduce the screen data). When only a part of the desktop of the remote apparatus is displayed on this area at the selected enlargement ratio (or reduction ratio), the scroll bars are displayed to allow the user to selectively display a desired part of the desktop screen by scroll operation.

The reduce button 1103 is a software key which is pressed to give the instruction to add a reduction ratio upon generation of display screen data by applying resolution conversion to the operation screen data of the remote apparatus acquired by the remote desktop protocol. When the user presses the reduce button 1103 several times, the screen displayed on the remote desktop display area 1102 is reduced in size gradually, and a broader range can be consequently displayed. When the operation screen of the remote apparatus is defined by the larger number of pixels than the remote desktop display area 1102, it may be necessary to reduce the operation screen to allow the user to easily recognize the full picture of the screen by obviating the need for the scroll operation.

The enlarge button 1104 is a software key which is pressed to give the instruction to add an enlargement ratio upon generation of display screen data by applying resolution conversion to the operation screen data of the remote apparatus acquired by the remote desktop protocol. When the user presses the enlarge button 1104 several times, the screen displayed on the remote desktop display area 1102 is enlarged gradually. Therefore, the user can view characters which are reduced in size and are hard to view as a result of pressing the reduce button 1103.

A connect button 1105 is a software key pressed to start a remote operation session of the remote apparatus by the remote desktop protocol. When the user selects the connect button 1105, the remote desktop viewer 230 displays a remote apparatus connection dialog window (not shown) on the remote desktop display area 1102. On the remote apparatus connection dialog window, the user can input and select information such as an IP address of the remote apparatus to be remotely operated, a port number when it is different from a default value, and the user name and password for user authentication. Also, this window allows the user to input and select various settings associated with the remote operation session such as detailed parameters (encoding method and the like) upon operation of the remote desktop protocol. Various kinds of setting information associated with the remote operation session including the address of a connection destination may be registered in advance for each apparatus or user, or may be set by calling a previous connection history or by selecting from options. When the user inputs or selects the required information on the remote apparatus connection dialog window and then selects an OK button, the remote desktop viewer 230 establishes a connection to the designated remote apparatus, and starts a remote operation session. A plurality of sessions may be established at the same time, and the user may select a session to be operated from the established sessions.

A macro function may be assigned to each physical button such as the ID key 507 on the operation unit 112 or each software key (not shown) displayed on the LCD 501. In this case, when the user selects the macro function (even during display of another screen for, e.g., the copy function), the function may be switched to the VNC viewer function, and a connection according to the assigned remote operation session setting information may be started.

A terminate button 1106 is a software key pressed to give the instruction to end the connected remote operation session. When the remote operation session is completed, and there is no connected session, the remote desktop viewer 230 displays the remote apparatus connection dialog window on the remote desktop display area 1102.

A print button 1107 is a software key pressed to instruct to print a screen shot of the connected remote operation session. The remote desktop viewer 230 prints a screen shot of the desktop of the remote apparatus whose remote operation is underway using the printer 114.

An expand button 1108 is a software key pressed to call an expansion menu dialog window. The expansion menu dialog window allows the user to edit various environmental settings associated with the remote desktop viewer 230 and to manipulate the expansion function.

A cursor left move button 1109 is a software key pressed to output a left move event of a cursor via the remote desktop protocol. Upon reception of the left move event, the remote desktop server of the remote apparatus side generates an internal event corresponding to a leftward operation by a pointing device such as a mouse serving as operation input means on the OS level. As a result, for example, the mouse cursor moves on the operation screen of the remote apparatus side. The updated operation screen data of the remote apparatus is acquired by the remote desktop protocol as needed, and is displayed on the remote desktop display area 1102. That is, the cursor displayed on the remote desktop display area 1102 also moves leftward.

A cursor down move button 1110 is a software key pressed to output a down move event of the cursor via the remote desktop protocol. Upon reception of the down move event, the remote desktop server of the remote apparatus side generates an internal event corresponding to a downward operation by a pointing device such as a mouse serving as operation input means on the OS level. As a result, for example, the mouse cursor moves on the operation screen of the remote apparatus side. The updated operation screen data of the remote apparatus is acquired by the remote desktop protocol as needed, and is displayed on the remote desktop display area 1102. That is, the cursor displayed on the remote desktop display area 1102 also moves downward.

A cursor up move button 1111 is a software key pressed to output an up move event of the cursor via the remote desktop protocol. Upon reception of the up move event, the remote desktop server of the remote apparatus side generates an internal event corresponding to an upward operation by a pointing device such as a mouse serving as operation input means on the OS level. As a result, for example, the mouse cursor moves on the operation screen of the remote apparatus side. The updated operation screen data of the remote apparatus is acquired by the remote desktop protocol as needed, and is displayed on the remote desktop display area 1102. That is, the cursor displayed on the remote desktop display area 1102 also moves upward.

A cursor right move button 1112 is a software key pressed to output a right move event of the cursor via the remote desktop protocol. Upon reception of the right move event, the remote desktop server of the remote apparatus side generates an internal event corresponding to a rightward operation by a pointing device such as a mouse serving as operation input means on the OS level. As a result, for example, the mouse cursor moves on the operation screen of the remote apparatus side. The updated operation screen data of the remote apparatus is acquired by the remote desktop protocol as needed, and is displayed on the remote desktop display area 1102. That is, the cursor displayed on the remote desktop display area 1102 also moves rightward.

A click button 1113 is a software key pressed to output a mouse click event via the remote desktop protocol. Upon reception of the mouse click event, the remote desktop server of the remote apparatus side generates an internal event corresponding to a click operation by a pointing device such as a mouse serving as operation input means on the OS level.

A double click button 1114 is a software key pressed to successively output a mouse click event twice via the remote desktop protocol. With the software key on the touch panel, it may be difficult for the user to attain successive click operations determined as a double-click operation. However, this double click button allows the user to easily and reliably achieve this operation. Likewise, buttons used to generate events corresponding to a mouse dragging operation (an operation for moving the mouse while holding down a mouse button) and a mouse release operation, and a button used to generate an event corresponding to clicking of a mouse right button may be equipped.

Note that a physical pointing device such as a mouse, tablet, or track ball may be connected to the image processing apparatus to be used in place of the software buttons 1109 to 1114 corresponding to operation inputs by means of a pointing device.

A keyboard button 1115 is a software key pressed to give the instruction to display a screen keyboard dialog window on the LCD 501. On the screen keyboard dialog window (not shown), software keys corresponding to a so-called QWERTY or JIS full keyboard are laid out. When the user selects a key on the keyboard, a key code event corresponding to that key is output by the remote desktop protocol. Upon reception of the key code event, the remote desktop server of the remote apparatus side generates an internal event corresponding to a key input operation by the keyboard serving as operation input means on the OS level. Note that a physical keyboard may be connected to the image processing apparatus to be used in place of the screen keyboard dialog.

FIG. 12 is a block diagram showing the software structure of an apparatus as a remote operation target of the present embodiment. An embodiment of application software programs which run on the desktop computer 101, and their software platform will be explained below.

Application programs 1201 are application software programs which provide various functions to the user of the desktop computer 101. For example, the application programs 1201 include, but are not limited to, various application software programs such as a word processor, spreadsheet, presentation, document management, data management, groupware, file manipulation, and network monitoring. On the desktop computer 101, a plurality of application programs 1201 run at the same time. Each individual application program 1201 is implemented to use various services provided by a software platform including an operating system (OS) and infrastructure software group. The software platform includes modules are described below.

A rendering library 1202 is a module which provides a rendering service that allows the application program 1201 to render a user interface on a display device of the desktop computer 101 and to render an image to be printed on a paper sheet. The library includes an application program interface (API) which renders figures, images, fonts, and the like. For example, infrastructure software such as WIN32 in case of Windows®, Carbon and Cocoa in case of Mac OS X®, or X11/Xlib in case of a UNIX-based OS provides the rendering library.

A display control unit 1203 is a module which controls rendering to be displayed on the screen of the display device of the desktop computer 101 in response to a request from the rendering library 1202. A plurality of rendering requests issued from a plurality of software programs, which simultaneously runs on the desktop computer 101, is integrated by, for example, a window system of the display control unit 1203.

A graphic processor 1204 is a module, which controls the display device, and displays an image on the screen of the display device of the desktop computer 101 under the control of the display control unit 1203.

A print subsystem 1205 is a module which supports a print output from each application program 1201.

A printer driver 1206 is a module which is included in the print subsystem 1205, and generates print job data in response to a rendering request from the rendering library 1202. The printer driver 1206 generates, for example, a printer page description language (PDL) according to the rendering request.

A print protocol communication unit 1207 is a module which is included in the print subsystem 1205, and transmits print job data to a printer via communication with the printer. The print protocol communication unit 1207 can select a printer from a plurality of printers, and can transmit a print job to the selected printer. The print protocol communication unit 1207 can transmit print job data to a printer connected to a local interface (USB or IEEE1394) of the desktop computer 101. Also, the print protocol communication unit 1207 can transmit print job data to the remote image processing apparatuses 110, 120, and 130 connected via the network. The user can explicitly select the printer upon execution of print processing. When the user does not explicitly select any printer, a printer set as a default printer is selected.

An event input 1208 is a module which supplies a user's input event or an event generated in the system to each application program 1201. The user's input event includes an operation input of a pointing device such as a mouse and that of a keyboard. In order to pass an event to some appropriate ones of a plurality of application programs, which run at the same time, the event input 1208 cooperates with a window manager and window system in the display control unit 1203.

A keyboard/mouse driver 1209 is a module which controls an operation input mechanism such as a keyboard and pointing device (mouse, tablet, trackball, etc.) A scanner driver 1210 is a module which provides a service that allows each application program 1201 to read an image from an image input mechanism such as an image scanner or a digital camera. An API that can be used by each application program includes TWAIN, SANE, and ISIS. The scanner driver 1210 can select an image input device from a plurality of image input devices, and can read an image from the selected image input device. That is, the scanner driver 1210 can read an image from an image input device connected to the local interface (USB or IEEE1394) of the desktop computer 101. Also, the scanner driver 1210 can read an image from the remote image processing apparatuses 110, 120, and 130 connected via the network. The user can explicitly select an image input device upon execution of the image input operation in practice. If the user does not explicitly select any image input device, an image input device set as a default image input device is selected.

A network sharing file system 1211 is a module which allows each application program 1201 to provide a service. With this module, the application program can mount a remote file system disclosed by another apparatus using a network file sharing protocol as if it were a local file system. The network file sharing protocol includes NFS and CIFS (or SMB). By transparently combining file acquisition and file transmission by a network file transfer protocol (FTP, HTTP, etc.), file sharing roughly equivalent to the network file sharing protocol can also be implemented. The network sharing file system 1211 can mount a plurality of remote file systems disclosed by a plurality of apparatuses. The user can explicitly mount a remote sharing file system. Also, a default file system may be set, and such file system can be automatically mounted at the time of starting up the desktop computer 101 or at the user login time.

A data transfer protocol library 1212 is a module which provides a service that allows each application program 1201 to transmit data to another apparatus using various data transfer protocols.

An external apparatus cooperative subsystem group 1213 is a subsystem group which provides a service that cooperates with an external apparatus for each application program 1201. The external apparatus cooperative subsystem group 1213 includes the print subsystem 1205, scanner driver 1210, network sharing file system 1211, and data transfer protocol library 1212.

A remote desktop server 1214 is a server module which provides a service that allows a remote apparatus to remotely operate the desktop computer 101 using the remote desktop protocol. The remote desktop server 1214 acquires display data generated by the display control unit 1203 to be displayed by the graphic processor 1204, and supplies the acquired data to a remote desktop client at a remote place. The remote desktop server 1214 supplies an event sent from a remote desktop client at a remote place to the event input 1208 in the same manner as an event generated by, for example, the keyboard/mouse driver 1209. The remote desktop server 1214 can change settings of an external apparatus to be cooperated by interfering with the respective modules included in the external apparatus cooperative subsystem group 1213. Details of interferences with the external apparatus cooperative subsystem group 1213 by the remote desktop server 1214 are described below.

Note that the apparatus as the remote operation target described using FIG. 12 is not limited to the desktop computer 101 but it may be image processing apparatuses 120 and 130. In this case, the embedded applications (included in the UI module 201) that achieve basic functions (copy, box, etc.) of the image processing apparatus correspond to the application programs 1201. Also, the embedded applications such as the Universal-Send module 204, Remote-Copy-Scan module 209, Remote-Copy-Print module 210, Web browser 211, and remote desktop viewer 230 correspond to the application programs 1201. The embedded remote desktop server 232 incorporated in the image processing apparatus corresponds to the remote desktop server 1214, and relays between the operation display and operation input of the UI module 201 and communications based on the remote desktop protocol.

Figure 13B:
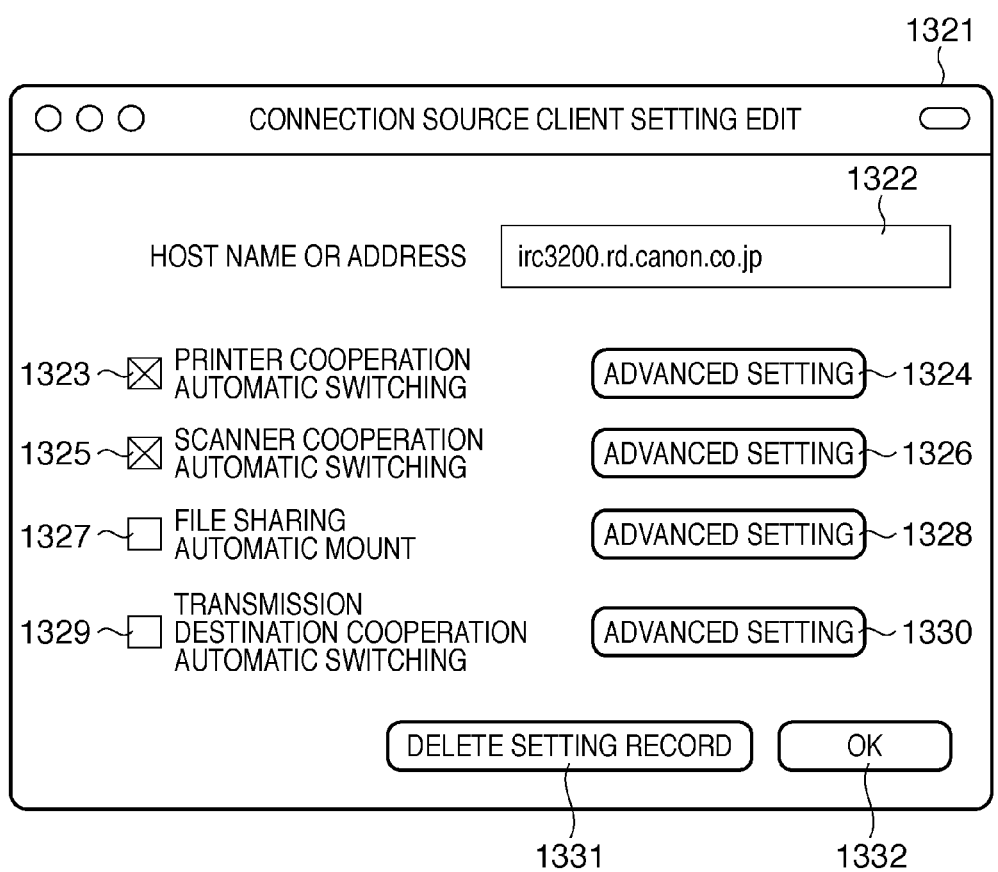
FIG. 13B shows an example of an environment setting user interface of a remote desktop server which runs on the apparatus serving as the remote operation target.

FIGS. 13A and 13B show an example of environmental setting user interfaces of the remote desktop server which runs on the apparatus as the remote operation target. An embodiment of the remote desktop server 1214 which runs on the desktop computer 101 is described below.

A remote desktop server setting dialog window 1301 is a dialog window used to display and edit the environmental settings of the remote desktop server 1214.

A connection source client setting table 1302 shows a table which stores setting records for respective remote desktop clients serving as remote operation sources. The setting records are stored in a nonvolatile storage device such as a hard disk drive of the desktop computer 101.

A "select" column 1303 includes radio buttons used to select one of a plurality of stored setting records.

A "host name or address" column 1304 includes host names or IP addresses of connection source clients associated with the respective setting records. A row including a description "default (a connection source without any specific settings)" indicates a special setting record, and the settings of this record are applied at the time of connection from a remote desktop client of a host whose specific settings are not specified in other rows.

A "printer cooperation" column 1305, "scanner cooperation" column 1306, "file sharing" column 1307, and "transmission destination cooperation" column 1308 include interference settings with respect to the external apparatus cooperative subsystem group 1213 by the remote desktop server 1214.

An edit button 1309 is a software key pressed to edit the contents of a record selected by the corresponding "select" radio button. Upon pressing of this button, a connection source client setting edit dialog window 1321 is opened.

An add new button 1310 is a software key pressed to add a new setting record. Upon pressing of this button, a new row is added to the connection source client setting table 1302, and the connection source client setting edit dialog window 1321 associated with that setting record is opened.

An OK button 1311 is a confirmation button of the remote desktop server setting dialog window 1301. Upon pressing of this button, the remote desktop server setting dialog window 1301 is closed.

The connection source client setting edit dialog window 1321 is a dialog window used to edit the setting record of each remote desktop client as a remote operation source.

A "host name or address" input field 1322 is used to input and edit the address (host name or IP address) of the connection source client associated with that setting record. When the dialog window is opened by selecting the "default (a connection source without any specific settings)" setting record, this field cannot be edited.

A "printer cooperation automatic switching" check box 1323 is used to set whether the remote desktop server 1214 interferes with the print subsystem 1205 at the time of a remote operation from that connection source client. When this check box is checked, the remote desktop server 1214 switches the default printer settings of the print subsystem 1205 during the remote operation from that connection source client. A default printer is a printer to which a print job is sent when the user does not explicitly select any printer, and inputs a print instruction from each application program 1201. In normal settings, the remote desktop server 1214 switches the default printer to the address of that connection source client. As a result, for example, when the user inputs a print instruction from the application program 1201 by operating the image processing apparatus 110, a print output can be made to the near-by image processing apparatus 110.

An advanced settings button 1324 is a software key pressed to call a dialog window used to make advances settings associated with the printer cooperation automatic switching. The advanced settings allows the user to set a printer to be switched as a default printer to be a desired printer in place of the connection source client, and to select a protocol to be used when a plurality of protocols are available to input a print job.

The above description is applicable to scanner cooperation automatic switching, file sharing automatic mount, and transmission destination cooperation automatic switching options.

A setting record delete button 1331 is a software key pressed to delete the selected setting record from the setting record table.

An OK button 1332 is a confirmation button of the connection source client setting edit dialog window 1321. Upon pressing of this button, the connection source client setting edit dialog window 1321 is closed.

Figure 14:
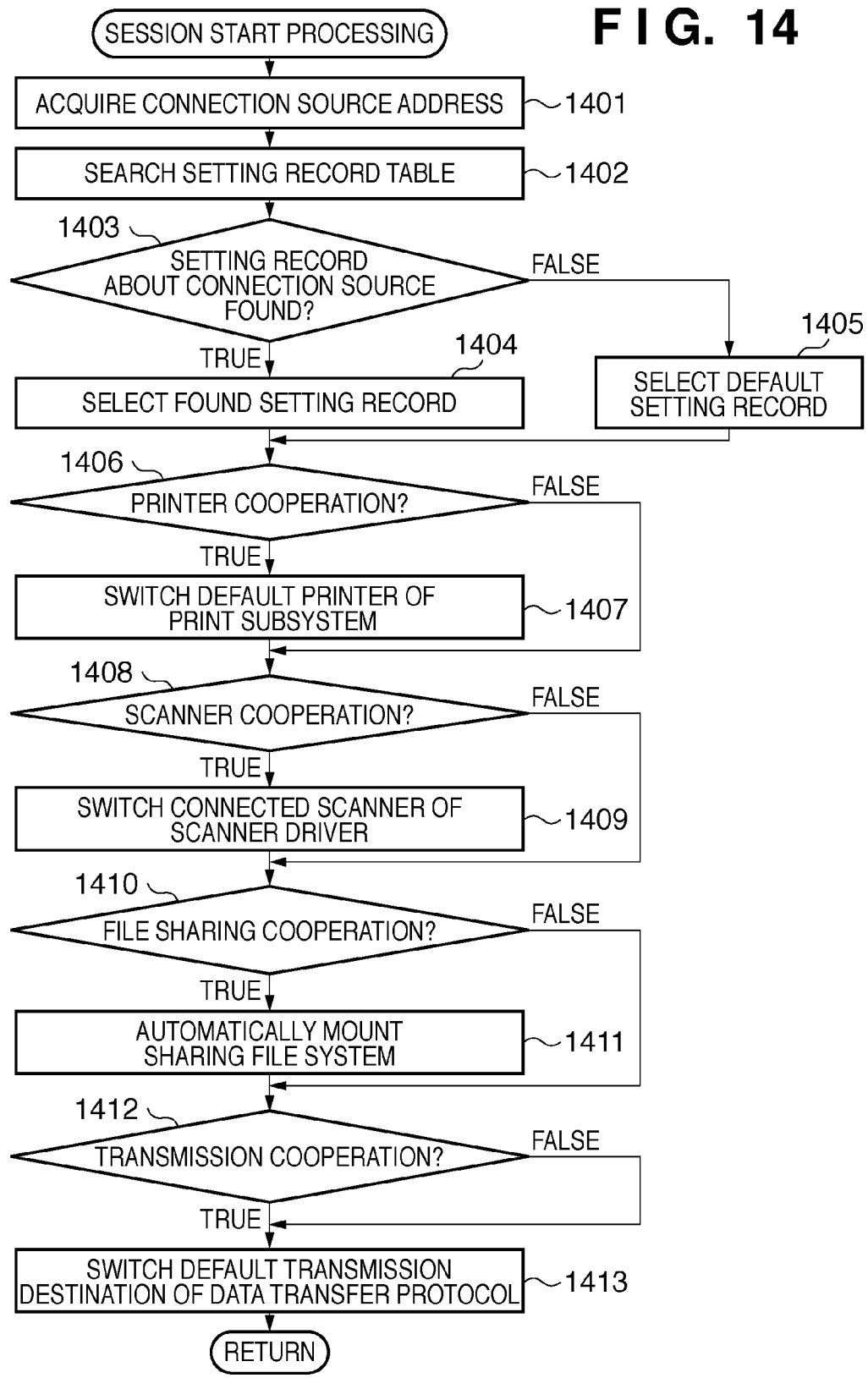
FIG. 14 is a flowchart showing the sequence of session start processing of a remote desktop server 1214 executed on a desktop computer 101.

FIG. 14 is a flowchart showing the sequence of session start processing of the remote desktop server 1214 executed on the desktop computer 101. Upon reception of a connection request of a remote operation session from the remote desktop viewer 230 at a remote place, this processing is called.

In step 1401, the address of a connection request source is acquired.

In step 1402, the storage of setting records corresponding to the connection source client setting table 1302 is searched for the address of the connection request source.

In step 1403, if a setting record corresponding to the connection request source is found, the process advances to step 1404, otherwise, the process advances to step 1405.

In step 1404, the found setting record is selected. The process then advances to step 1406.

In step 1405, a setting record corresponding to the default row of the connection source client setting table 1302 is selected.

It is checked in step 1406, based on the printer cooperation setting in the setting record, if the connection request source is a remote operation client which requires printer cooperation. If the connection request source is a remote operation client that requires printer cooperation, the process advances to step 1407. If the connection request source is a remote operation client that does not require printer cooperation, the process proceeds to step 1408.

In step 1407, the default printer setting of the print subsystem 1205 is switched according to the printer cooperation automatic switching setting in the setting record. In this case, the setting before switching is saved, and the saved setting is restored when this remote operation session ends. The transmission destination setting switched at the time of a communication is restored to the setting before switching after the end of the communication.

It is checked in step 1408, according to the scanner cooperation setting in the setting record, if the connection request source is a remote operation client that requires scanner cooperation. If the connection request source is a remote operation client that requires scanner cooperation, the process advances to step 1409. If the connection request source is a remote operation client that does not require scanner cooperation, the process proceeds to step 1410.

In step 1409, the setting of the scanner driver 1210 is switched in accordance with the scanner cooperation automatic switching setting in the setting record. In this case, the setting before switching is saved, and the saved setting is restored when this remote operation session ends. The transmission destination setting switched at the time of a communication is restored to the setting before switching after the end of the communication.

It is checked in step 1410, in accordance with the file sharing setting in the setting record, if the connection request source is a remote operation client that requires file sharing cooperation. If the connection request source is a remote operation client that requires file sharing cooperation, the process advances to step 1411. If the connection request source is a remote operation client that does not require file sharing cooperation, the process proceeds to step 1412.

In step 1411, the network sharing file system 1211 is instructed to mount a set sharing file system in accordance with the file sharing automatic mount setting in the setting record. The automatically mounted sharing file system is un-mounted at the time of completion of this remote operation session.

It is checked in step 1412, according to the transmission destination cooperation setting in the setting record, if the connection request source is a remote operation client that requires transmission destination cooperation. If the connection request source is a remote operation client that requires transmission destination cooperation, the process advances to step 1413. If the connection request source is a remote operation client that does not require transmission destination cooperation, the series of procedures is completed.

In step 1413, the default transmission destination setting of the data transfer protocol library 1212 is switched according to the transmission destination cooperation automatic switching setting in the setting record. In this case, the setting before switching is saved, and the saved setting is restored when this remote operation session ends later. That is, the transmission destination setting switched at the time communication is restored to the setting before switching after the end of the communication. After that, the series of procedures is completed.

Figure 15:
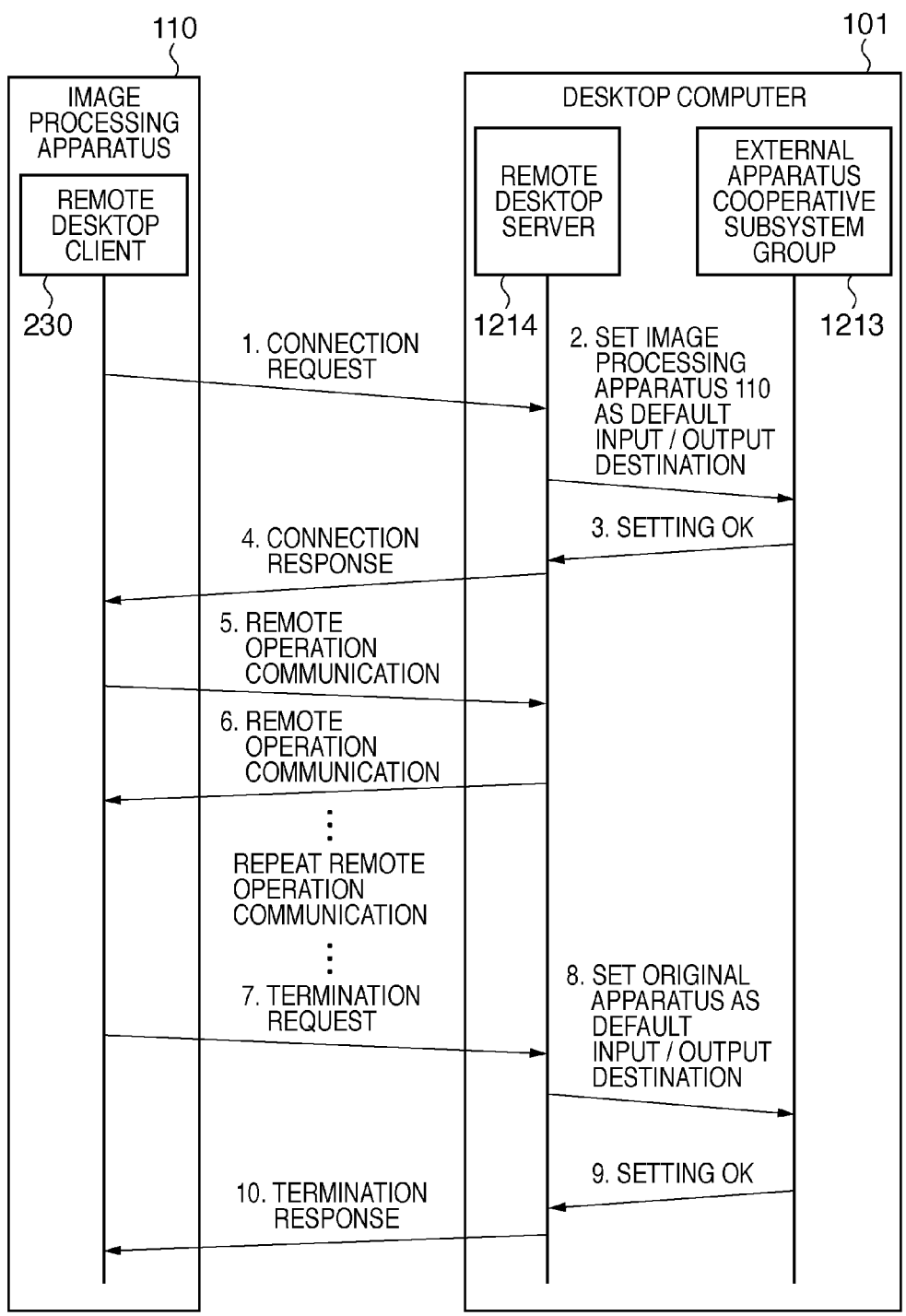
FIG. 15 shows an example of timelines indicating interactions between a remote operation source and a remote operation target.

FIG. 15 shows an example of time lines indicating interactions between the remote operation source and operation target. FIG. 15 shows interactions along with an elapse of time in a system in which the image processing apparatus 110 serves as an operation source, and the desktop computer 101 serves as an operation target. The interactions that achieve remote operations can be implemented by the RFB protocol of the VNC as one of remote desktop systems.

In step 1, the remote desktop client 230 on the image processing apparatus 110 issues a connection request using the RFB protocol to the remote desktop server 1214 on the desktop computer 101.

In step 2, the remote desktop server 1214 on the desktop computer 101 interferes with the external apparatus cooperative subsystem group 1213 on the desktop computer 101 in accordance with the algorithm of the flowchart shown in FIG. 14. The remote desktop server 1214 communicates with the external apparatus cooperative subsystem group 1213 using a unique inter-process communication protocol to request it to switch the default input/output destination settings held by respective subsystems. Upon reception of such request, each subsystem switches a default input/output destination or mounts a sharing file system.

In step 3, the subsystem group of the external apparatus cooperative subsystem group 1213 responds with a notification indicating that switching of the settings is complete to the remote desktop server 1214.

In step 4, the remote desktop server 1214 returns a response to the connection request to the remote desktop client 230.

In steps 5 and 6, the remote desktop client 230 and remote desktop server 1214 exchange a request and response for a remote operation according to the RFB protocol. Before the user of the remote desktop client 230 completes an operation, an idle time reaches a predetermined time-out time, or the remote operation session is closed under a predetermined condition, interactions of the remote operation communications are repeated.

In step 7, the remote desktop client 230 issues a termination request using the RFB protocol to the remote desktop server 1214 so as to close the remote operation session.

In step 8, the remote desktop server 1214 communicates with the external apparatus cooperative subsystem group 1213 using a unique internal communication protocol. Then, the remote desktop server 1214 restores the default input/output destinations of the respective subsystems and the mount state of the file system to those at the start timing of the remote operation session.

In step 9, the external apparatus cooperative subsystem group 1213 responds with a notification indicating that switching of the settings is complete to the remote desktop server 1214.

In step 10, the remote desktop server 1214 returns a response to the termination request to the remote desktop client 230, thus closing the remote operation session.

Figure 16:
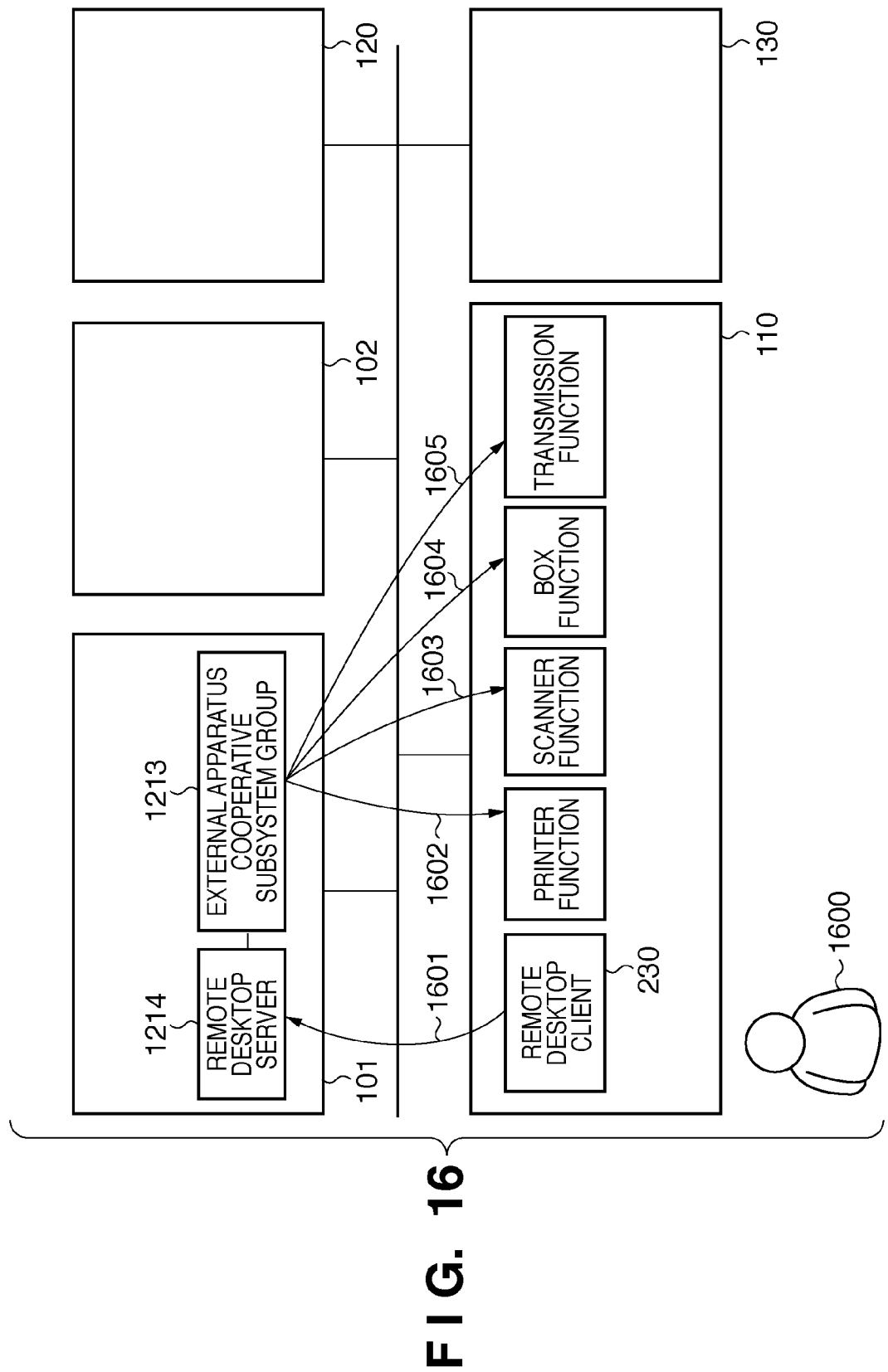
FIG. 16 is a block diagram for explaining interactions of a system according to the first embodiment.

FIG. 16 is a block diagram for explaining the interactions of the system according to the present embodiment.

A user 1600 stands in front of the image processing apparatus 110, and operates the remote desktop client 230 from the operation unit. The user 1600 makes selection of an apparatus to be remotely operated from the apparatuses connected to the network, and selects the desktop computer 101. As a result, a remote desktop connection 1601 is established between the remote desktop client 230 and remote desktop server 1214 using the remote desktop protocol.

The remote desktop server 1214 checks if the connection source is an apparatus having an image processing function. In this example, the remote desktop server 1214 determines that the image processing apparatus 110 includes a print function, a scanner function, an image storing function (box function), and a transmission function. Hence, the remote desktop server 1214 sets the image processing apparatus 110 as a default image processing apparatus in respective subsystems included in the external apparatus cooperative subsystem group 1213 including the OS and device drivers of the desktop computer 101. During a valid period of this setting, when an application program which runs on the desktop computer 101 executes an image processing job, the image processing apparatus 110 is automatically set as a default apparatus.

As a result, if the user does not change the default setting, when the application program issues a print instruction, the print protocol such as LPR inputs a print job to the print function of the image processing apparatus 110 (1602). Likewise, when the application program scans an image, a scanner control protocol such as network TWAIN inputs a scan job (pull scan) to the scanner function of the image processing apparatus 110 (1603). Also, when the application program stores or retrieves an image file, the network file sharing protocol mounts the box function of the image processing apparatus 110 to store or retrieve a data file (1604). Furthermore, when the application program executes FAX or IFAX transmission, a PC FAX transmission protocol inputs a FAX transmission job to the FAX function of the image processing apparatus 110 (1605).

Note that the user may change these default settings to select another image processing apparatus.

After termination of the remote desktop connection 1601, the remote desktop server 1214 restores the default settings set in the external apparatus cooperative subsystem group 1213 to the states before the setting.

Figure 17:
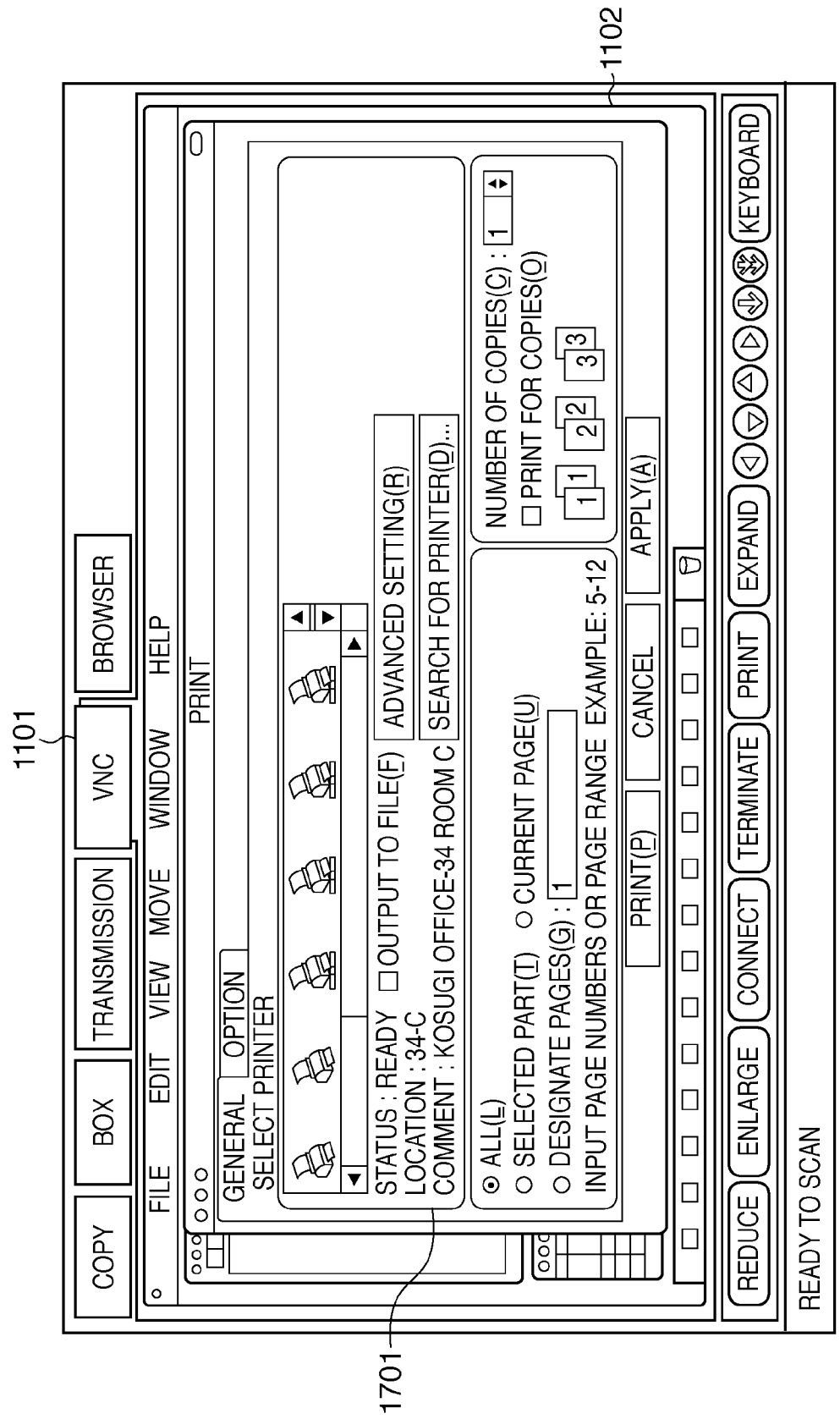
FIG. 17 is a view showing a screen example in a state in which a print processing instruction is issued from a remote desktop client function to an application program on a remote apparatus using an operation panel on the image processing apparatus 110.

FIG. 17 is a view showing a screen example in a state in which the user issues a print processing instruction to an application program on a remote apparatus using the remote desktop client function at the operation panel on the image processing apparatus 110. The same reference numerals in FIG. 17 denote the areas that have already been described using FIG. 11, and a repetitive description thereof is omitted herein.

The remote desktop display area 1102 displays operation screen data of a remote apparatus acquired by the remote desktop protocol. With this operation screen, the user can launch an application program on a remote apparatus, can refer to and edit data, can issue, for example, a print operation instruction, and can quit the application program from the image processing apparatus 110.

A print dialog 1701 is displayed by an application program which runs on the remote apparatus. This print dialog is the same as that which is displayed by the application program on the remote apparatus on the display of the remote apparatus. When the user inputs, for example, a print operation instruction from the image processing apparatus 110 to the application program on the remote apparatus, this dialog window is also displayed on the remote desktop display area 1102.

In general, since the remote apparatus is configured to input, for example, a print job to a specific image processing apparatus selected from a plurality of image processing apparatuses, the print dialog 1701 includes a list of a plurality of selectable image processing apparatuses. The remote desktop server 1214 on the desktop computer 101 (i.e., the remote apparatus) sets the image processing apparatus 110 as the default input/output destination of the external apparatus cooperative subsystem group 1213 according to the sequence shown in FIG. 15. Therefore, a printer corresponding to the image processing apparatus 110 of a plurality of selectable image processing apparatuses listed on the print dialog 1701 is automatically selected.

Note that present embodiment has explained the arrangement in which the image processing apparatus 110 includes the print function, scanner function, box function, and transmission function. However, of image processing functions of the image processing apparatus 110 that can accept an external function cooperation request, the user may select permission/inhibition of cooperation functions which are to accept the request. The cooperation functions of the image processing apparatus 110 which are permitted to accept the cooperation request are expressed in the remote desktop protocol transmitted by the remote desktop client 230 and are informed to the desktop computer 101.

In the present embodiment, in order to operate the external information processing apparatus from the image processing apparatus, the image processing apparatus including the embedded remote desktop client on the operation terminal side is combined with the information processing apparatus including the embedded remote desktop server on the operation target side. However, a Web application technique may be used to configure such system. In this case, the image processing apparatus including the embedded Web browser on the operation terminal side is combined with the information processing side including the embedded Web server on the operation target side.

According to the present embodiment, when the remote desktop client which runs on the image processing apparatus 110 remotely controls a remote apparatus, the remote desktop server 1214 sets the image processing apparatus 110 as the default input/output destination of the remote apparatus. As a result, as an image processing apparatus used by an application program which runs on the remote apparatus to execute print processing, image scan processing, or document filing processing, the image processing apparatus 110 beside the user who is making the remote operation is automatically selected.

In the present embodiment, the remote desktop technique is a cross-platform technique having a high degree of freedom in combinations. Therefore, in many combinations of various image processing apparatuses and information processing apparatuses, services provided by apparatuses that include the remote desktop server can be operated from all of the apparatuses including the remote desktop client.

An image processing system according to a second exemplary embodiment of the present invention is described below. In the second embodiment, a part of the software structure of an information processing apparatus to be remotely operated from an MFP as an image processing apparatus is different from the first embodiment. Since other arrangements and operations are the same as those in the first embodiment, a detailed description thereof is omitted herein.

FIG. 18 is a block diagram showing the software structure of the information processing apparatus as a remote operation target of the present embodiment. The same reference numerals in FIG. 18 denote the same parts as those in FIG. 12, and a repetitive description thereof is omitted herein.

The remote desktop server 1214 sets the image processing apparatus 110 on which the remote desktop client 230 runs as a default cooperation external apparatus in response to a request from the remote desktop client 230.

The remote desktop server 1214 launches a virtual icon program 1801 in response to a connection from the remote desktop client, and allows the user to remotely operate virtual icons via the remote desktop client.

The virtual icon program 1801 is a program which displays virtual icon images to be overlaid on the operation screen of the desktop computer 101 to be remotely operated by the remote desktop protocol.

FIGS. 19A and 19B and FIGS. 20A and 20B show examples of virtual icons. These figures illustrate a printer icon 1901, scanner icon 1902, My Tray icon 2001, and FAX transmission icon 2002.

Figure 19A:
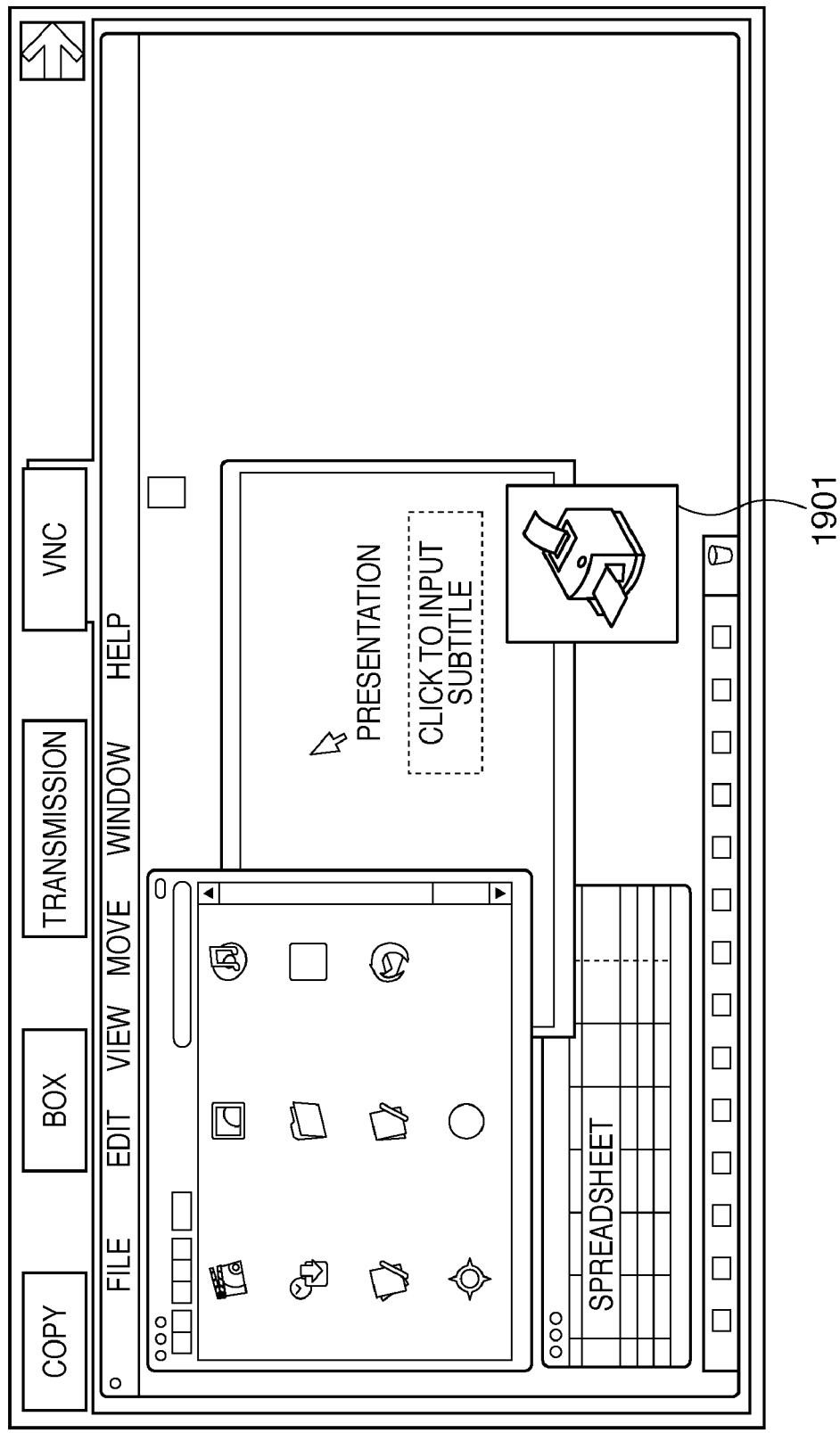
FIG. 19A is a view showing a screen example in which an operation screen of a desktop computer that accepts a virtual icon application including a printer icon is remotely operated using a remote desktop client of the image processing apparatus.

The printer icon 1901 in FIG. 19A is used to facilitate a print output using the print subsystem 1205. When the user drags and drops a file icon on a graphical user interface on the printer icon 1901, the virtual icon program 1801 prints a corresponding file using a default printer. For example, during connection from the remote desktop client 230, print processing is executed by the image processing apparatus 110.

The scanner icon 1902 in FIG. 19B is used to facilitate a scan image input using the scanner driver 1210. When the user opens the scanner icon 1902 by double-clicking it, the virtual icon program 1801 executes image scan processing using a default scanner. Furthermore, the virtual icon program 1801 writes image data acquired by the image scan processing as a file in a predetermined folder (directory), and opens a window corresponding to that folder on the graphical user interface. For example, during connection from the remote desktop client 230, that scan processing is executed by the image processing apparatus 110.

The My Tray icon 2001 in FIG. 20A is used to facilitate file storage and retrieve processes using the network sharing file system 1211. When the user opens the My Tray icon 2001 by double-clicking it, the virtual icon program 1801 mounts a default network sharing file system, and opens a window corresponding to a folder that corresponds to its mount point. When the user retrieves a file icon from this window or moves a file icon onto this window by drag-and-drop operations, the retrieve and storage processes of these files are executed on the hard disk of the image processing apparatus 110.

The FAX transmission icon 2002 in FIG. 20B is used to facilitate data transfer using the data transfer protocol library 1212. When the user drags and drops a file icon on the graphical user interface onto the FAX transmission icon 2002, the virtual icon program 1801 transfers data to a default data transfer destination. This data transfer is made using the PC FAX transmission protocol with respect to the image processing apparatus 110, thus implementing FAX transmission using the image processing apparatus 110 as a FAX transmission server.

According to the present embodiment, in addition to the arrangement of the first embodiment, an application program (virtual icon program) which achieves external apparatus cooperation can be automatically launched during connection from the remote desktop client. An icon which symbolizes external apparatus cooperation is displayed on the user interface screen displayed on the remote desktop client. For this reason, when the user makes a remote operation from the remote desktop client on the image processing apparatus, he or she can quickly and easily use services with image processing.

An image processing system according to a third exemplary embodiment of the present invention will now be described. In the third embodiment, the software structure of an information processing apparatus to be remotely operated from an MFP as an image processing apparatus is different from the first embodiment. Since other arrangements and operations are the same as those in the first embodiment, a detailed description thereof is omitted herein.

Figure 21:
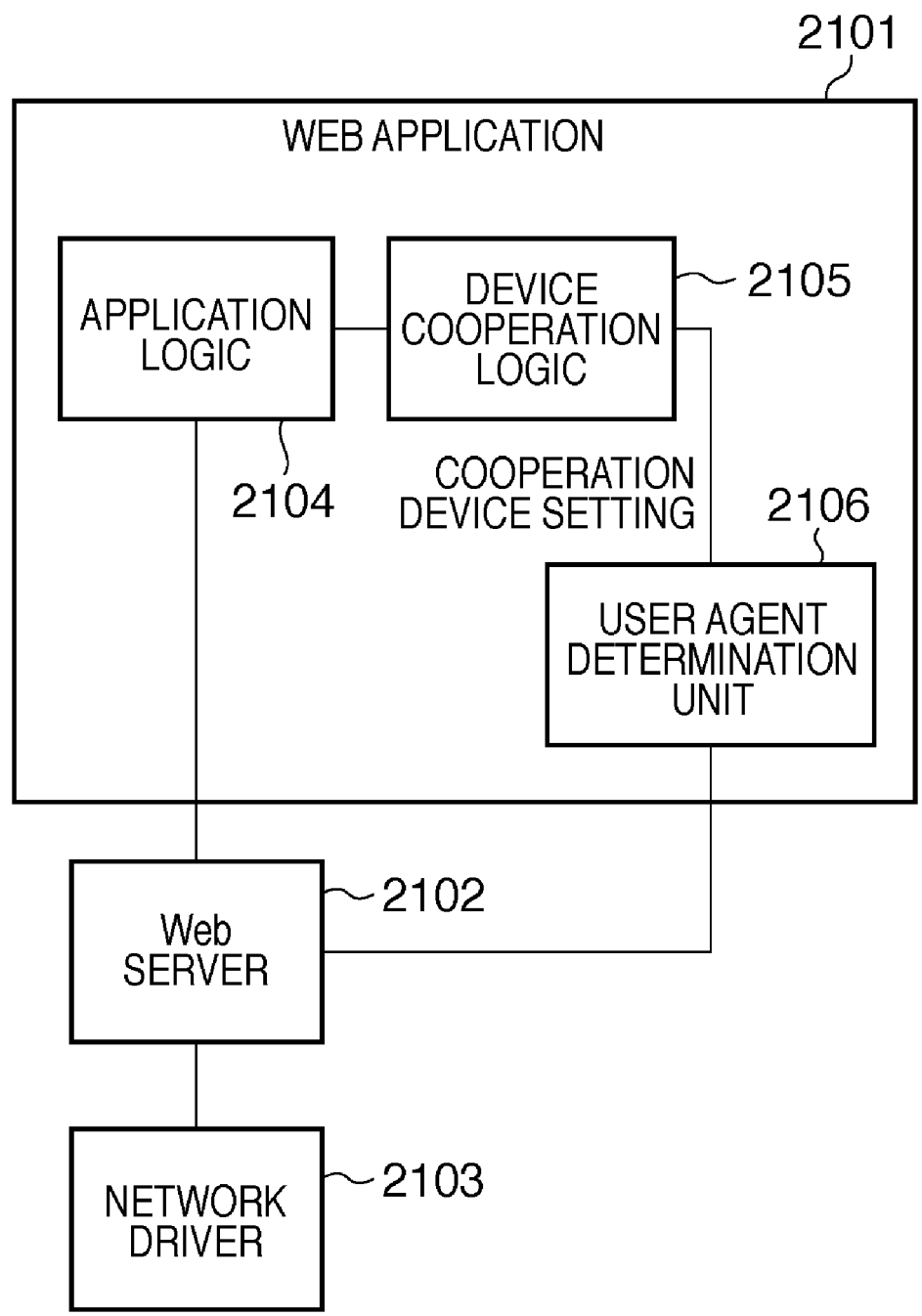
FIG. 21 is a block diagram showing the software structure of an apparatus serving as a remote operation target according to a third embodiment.

FIG. 21 is a block diagram showing the software structure of an information processing apparatus.

A Web application 2101 is a distributed application which runs on a framework provided by a Web server 2102, and is connected and operated from a remote Web browser. The Web application 2101 includes an application logic 2104, device cooperation logic 2105, and user agent determination unit 2106.

The Web server 2102 transfers an HTTP request, which is received from a remote Web browser via a network driver 2103, to the Web application 2101. Then, the Web server 2102 transmits a multimedia file including a markup document such as an HTML document, which is dynamically generated by the Web application 2101, and images, to the remote Web browser as an HTTP response. An interface between the Web server 2102 and Web application 2101 is implemented according to the well-known common gateway interface, Java Servlet specification, and the like. In particular, the Web server 2102 which is configured as a platform on which the Web application runs is generally called an application server or Web application server.

The network driver 2103 is a device driver which controls network connection between the server computer 102 and the LAN 100. The network driver 2103 executes protocol control such as TCP/IP as a protocol stack, and provides an application programming interface such as a socket interface to the Web server 2102.

The application logic 2104 is a core of an algorithm of the Web application which provides services including image processing. The application logic 2104 controls the device cooperation logic 2105 to execute a partial image processing job during a service execution process.

The device cooperation logic 2105 includes a subsystem group which provides services that cooperate with an external apparatus for the application logic 2104. The subsystem group of the device cooperation logic 2105 includes subsystems corresponding to the print subsystem 1205, scanner driver 1210, network sharing file system 1211, and data transfer protocol library 1212. An image processing apparatus to be cooperated with each individual subsystem can be selected from an image processing apparatus group connected to the network in accordance with an instruction from the application logic 2104. Also, the device cooperation logic 2105 holds a default setting of a cooperation apparatus used when an apparatus to be cooperated is not particularly selected. The device cooperation logic 2105 can change the default setting of the cooperation apparatus in accordance with an instruction from the user agent determination unit 2106.

The user agent determination unit 2106 parses an HTTP request which is received by the Web server 2102 from the Web browser to determine whether or not the remote operation source apparatus can provide any of image processing functions used in cooperation. If the remote operation source apparatus provides the image processing functions used in cooperation, the user agent determination unit 2106 sets that operation source apparatus as a default cooperation image processing apparatus held in the corresponding subsystem group of the device cooperation logic 2105.

Figure 22:
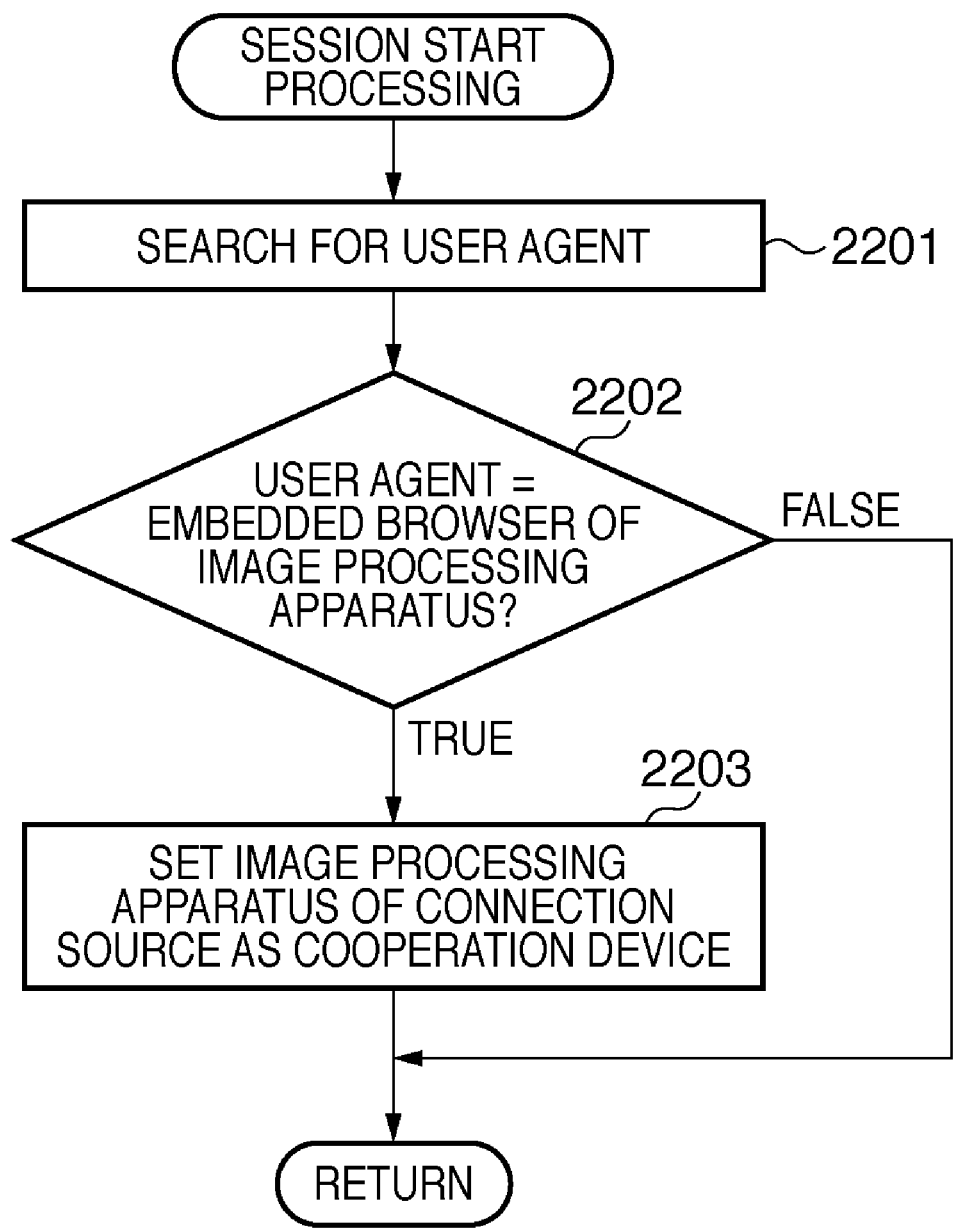
FIG. 22 is a flowchart showing the sequence of session start processing of a Web application 2101 to be executed in a server computer 102.

FIG. 22 is a flowchart showing the sequence of session start processing of the Web application 2101 executed on the server computer 102. Upon receipt of a connection request of a remote operation session from the remote Web browser 211, this processing is called.

In step 2201, the user agent determination unit 2106 inspects information of a user agent (Web browser) as a request source based on an HTTP request received by the Web server 2102.

It is checked in step 2202 if the user agent is the embedded Web browser 211 embedded in the apparatus which provides image processing functions. The checking logic is implemented by pattern matching of an HTTP request header field included in the HTTP request.

Based on information described in a "User-Agent request header field", identification information of the user agent (Web browser 211) and that of execution platform software (the image processing apparatus in case of the Web browser 211) can be detected. Based on these pieces of identification information, whether or not the user agent is the Web browser 211 embedded in the image processing apparatus is determined.

The HTTP request issued by the Web browser 211 may describe information used to identify the types of image processing functions that can be provided by the apparatus on which the user agent runs. Such information can be described in an expansion part of an "Accept request header field" or a user-defined request header field starting from "X-." Based on these pieces of identification information, whether or not the user agent is the Web browser 211 embedded in the apparatus that can provide image processing functions can be determined. If the checking result is true, the process advances to step 2203, otherwise, the series of procedures ends and the control returns to the previous routine. In step 2203, the image processing apparatus as the connection source on which the user agent runs is set as a cooperation apparatus or default apparatus of the device cooperation logic 2105 based on the determination result in the previous step. After that, the series of procedures ends.

Figure 23:
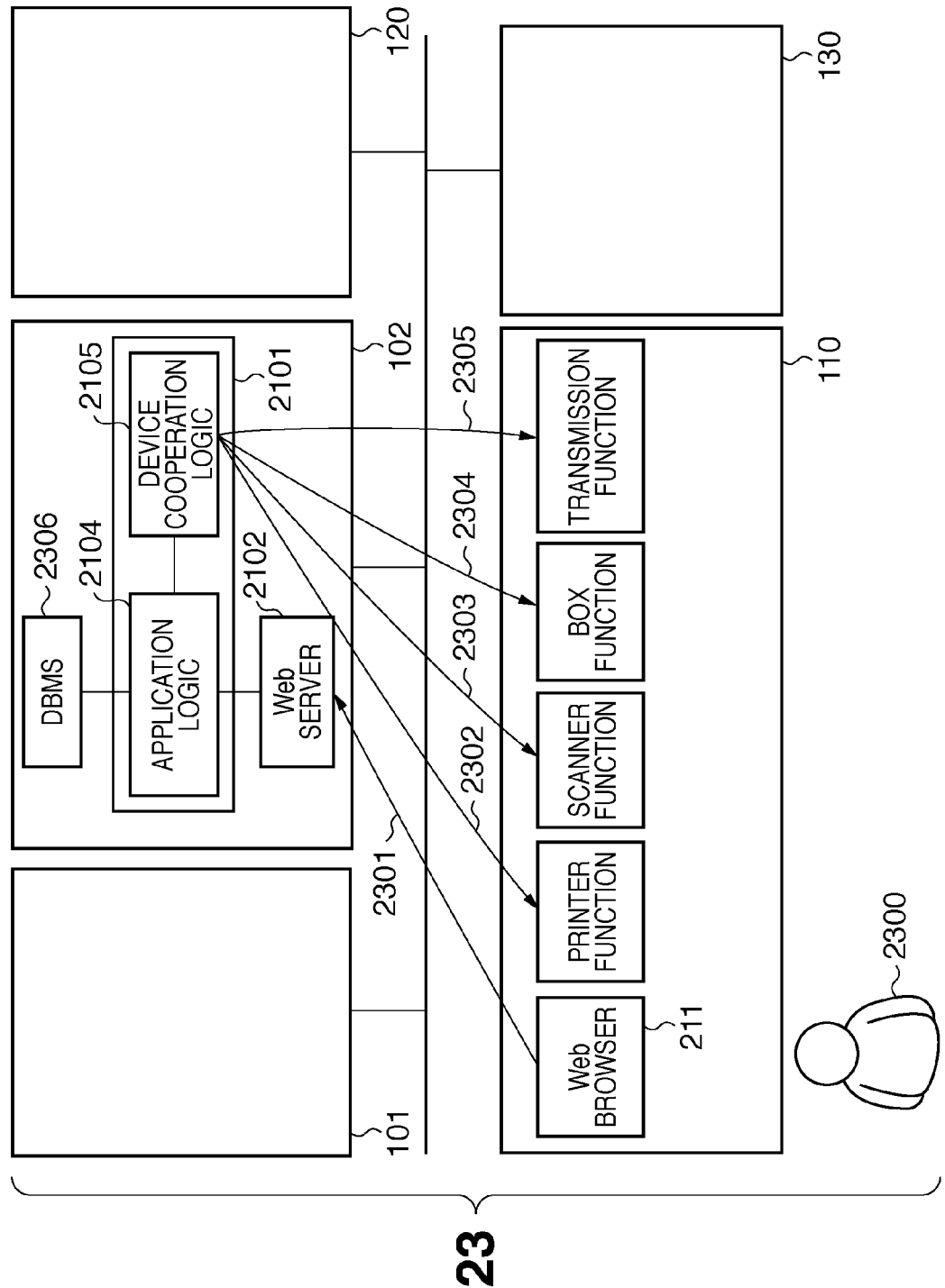
FIG. 23 is a block diagram for explaining interactions of a system according to the third embodiment.

FIG. 23 is a block diagram for explaining interactions of the system according to the present embodiment. A user 2300 stands in front of the image processing apparatus 110, and operates the Web browser 211 from the operation unit. The user 2300 makes selection of an apparatus to be remotely operated from those apparatuses which are connected to the network, and selects the server computer 102. As a result, a connection between the Web browser 211 and Web server 2102 is established to exchange HTTP requests and responses.

The Web server 2102 transfers an HTTP request to the Web application 2101, and transfers a response from the Web application 2101 to the Web browser 211.

The application logic 2104 provides various services that can be remotely operated from the Web browser 211 using plentiful computing resources of the server computer 102 such as a database management system (DBMS) 2306. The services that can be provided by the Web application 2101 include a document management system and a workflow processing system. These services include image processing jobs to be delegated to a cooperation apparatus in a series of processes.

The Web application 2101 checks for each use session from the Web browser if the connection source is an apparatus having image processing functions. In this example, the image processing apparatus 110 is determined as an image processing apparatus having a print function, scanner function, box function, and transmission function. Hence, the Web application 2101 sets the image processing apparatus 110 as an image processing apparatus which cooperates in association with respective image processing functions of the device cooperation logic 2105. During a period in which a use session from each Web browser continues, the image processing apparatus 110 is automatically set as a default cooperation apparatus when the Web application 2101 executes an image processing job. The cooperation apparatus settings of the device cooperation logic 2105 are held for respective use sessions from a plurality of Web browsers, which continue at the same time, during continuation periods of these use sessions.

As a result, if the user does not change the default setting, when the Web application 2101 executes print processing, the print protocol such as LPR inputs a print job to the print function of the image processing apparatus 110 (2302). Likewise, when the Web application 2101 scans an image, a scanner control protocol such as network TWAIN inputs a scan job (pull scan) to the scanner function of the image processing apparatus 110 (2303). Also, when the Web application 2101 stores or retrieves an image file, the network file sharing protocol mounts the box function of the image processing apparatus 110 to store or retrieve a data file (2304). Furthermore, when the Web application 2101 executes FAX or IFAX transmission, the PC FAX transmission protocol inputs a FAX transmission job to the FAX function of the image processing apparatus 110 (2305).

Note that the user may change these default settings to select another image processing apparatus.

Figure 24:
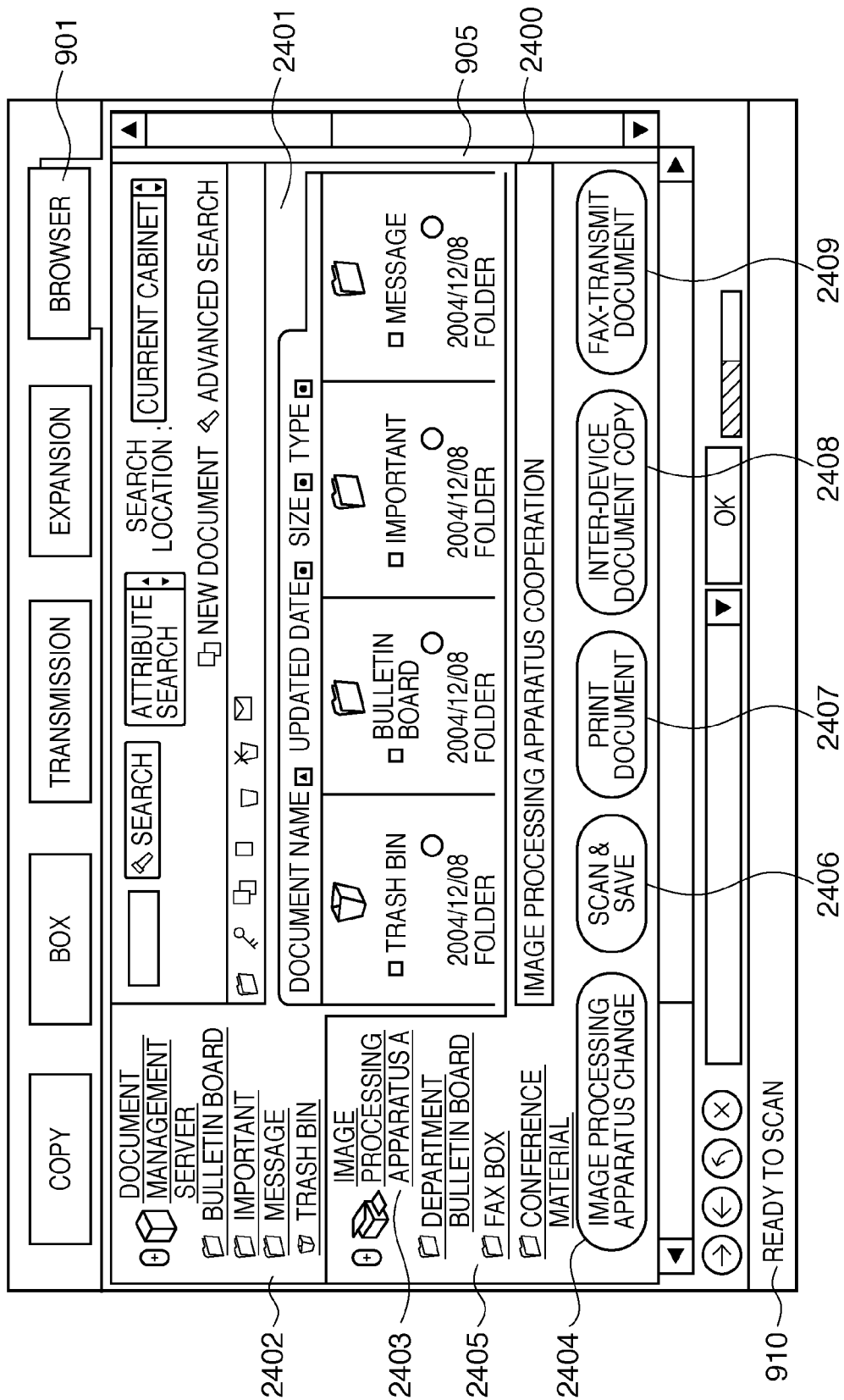
FIG. 24 is a view showing a screen example when the user establishes a connection to a document management system implemented as the Web application 2101 by an embedded Web browser function, and remotely operates the document management system at the operation panel on the image processing apparatus 110.

FIG. 24 is a view showing a screen example when the user establishes a connection to a document management system implemented as the Web application 2101 by the embedded Web browser function, and remotely operates the document management system using the operation panel on the image processing apparatus 110. The same reference numerals in FIG. 24 denote the areas that have already been described using FIG. 9, and a repetitive description thereof is omitted herein.

The content display area 905 displays an operation screen 2400 of a document management system Web application.

A document operation area 2401 is used to operate document files, folders and cabinets that store the document files, which are to be handled by the document management system.

A document management server folder list 2402 displays a document folder group stored in, for example, the DBMS 2306 in the server computer 102. Upon selection of this list, documents and folders included in that folder can be operated on the document operation area 2401.

A cooperation apparatus indication 2403 indicates identification information of an image processing apparatus selected as a cooperation apparatus. In this example, since the user makes an operation from the embedded Web browser 211 on the image processing apparatus 110, the image processing apparatus 110 is automatically set as the cooperation apparatus. If the user makes an operation from a Web browser on an apparatus having no image processing function such as the desktop computer 101, a specific image processing apparatus is not set as a cooperation apparatus, and the user has to explicitly select the cooperation apparatus.

A cooperation apparatus change button 2404 is pressed to change the image processing apparatus selected as a cooperation apparatus. For example, the user can change the cooperation apparatus to the image processing apparatus 130 or the like.

A cooperation apparatus folder list 2405 is a function that cooperates with the image processing apparatus. That is, the cooperation apparatus folder list 2405 is displayed by mounting a storage area of the box function (embedded document management system or embedded image filing system) provided by the selected image processing apparatus 110, and displaying a document folder group stored in that storage area. Upon selection of this list, the user can operate documents and folders included in that folder on the document operation area 2401. These processes are achieved by a job request 2304 from the device cooperation logic 2105 to the box function.

A scan & save button 2406 is pressed to activate a function that cooperates with the image processing apparatus. That is, upon pressing of the scan & save button 2406, image data of an original is read using the scanner function of the selected image processing apparatus 110, and is saved in a selected folder on the document operation area 2401. This processing is achieved by a job request 2303 from the device cooperation logic 2105 to the scanner function.

A print document button 2407 is pressed to activate a function that cooperates with the image processing apparatus. Upon pressing of the print document button 2407, a document selected on the document operation area 2401 is printed using the print function of the selected image processing apparatus 110. This processing is achieved by a job request 2302 from the device cooperation logic 2105 to the print function.

An inter-device document copy button 2408 is pressed to activate a function that cooperates with the image processing apparatus. Upon pressing of this inter-device document copy button 2408, a document file is transferred using the file transfer protocol for the box function (embedded document management system or embedded image filing system) provided by the selected image processing apparatus 110. This processing is achieved by a job request 2304 from the device cooperation logic 2105 to the box function. In case of an upload request, a document stored on the server computer 102 side is copied to the image processing apparatus 110 side. In case of a download request, a document stored on the image processing apparatus 110 side is copied to the server computer 102 side.

A FAX-transmit document button 2409 is pressed to activate a function that cooperates with the image processing apparatus. Upon pressing of this FAX-transmit document button 2409, a document selected on the document operation area 2401 is transmitted using the transmission function provided by the selected image processing apparatus 110. This processing is achieved by a job request 2305 from the device cooperation logic 2105 to the transmission function.

When the user clicks the scan & save button 2406 or FAX-transmit document button 2409 while no cooperation apparatus is selected, the control prompts the user to explicitly set a cooperation apparatus in the same manner as in a case in which he or she clicks the cooperation apparatus change button 2404. When no cooperation apparatus is selected, the scan & save button 2406 or FAX-transmit document button 2409 may not appear on the screen or may be inhibited from being clicked.

Figure 25:
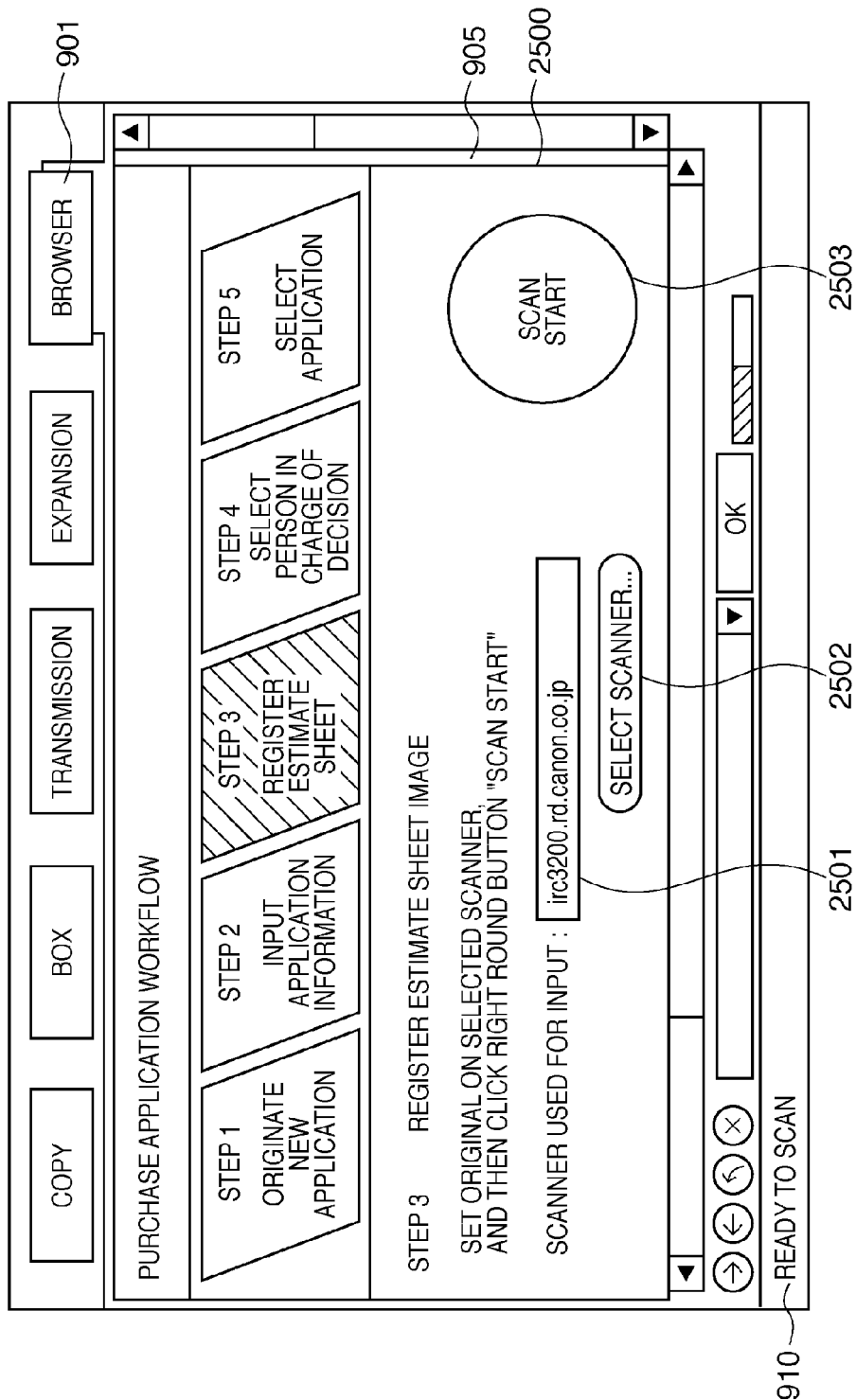
FIG. 25 is a view showing a screen example when the user establishes a connection to a workflow processing system implemented as the Web application 2101 by an embedded Web browser function, and remotely operates the workflow processing system at the operation panel on the image processing apparatus 110.

FIG. 25 is a view showing a screen example when the user establishes a connection to a workflow processing system implemented as the Web application 2101 by the embedded Web browser function, and remotely operates that system using the operation panel on the image processing apparatus 110. The same reference numerals in FIG. 25 denote the areas that have already been described using FIG. 9, and a repetitive description thereof will be avoided.

The content display area 905 displays an operation screen 2500 of the Web application 2101 of the workflow processing system. In this case, the user is about to operate processing for registering image data such as a sealed or signed paper estimate sheet or the like in the workflow processing system as the third step of a purchase application workflow including five steps as a whole.

A cooperation scanner indication 2501 indicates identification information of an image processing apparatus selected as a cooperation apparatus. In this example, since the user makes an operation from the embedded Web browser 211 on the image processing apparatus 110, the image processing apparatus 110 is automatically set as the cooperation apparatus. If the user makes an operation from a Web browser on an apparatus having no image processing functions such as the desktop computer 101, a specific image processing apparatus is not set as the cooperation apparatus, and the user has to explicitly select the cooperation apparatus.

A select scanner button 2502 is pressed to change an image processing apparatus selected as the cooperation apparatus. With this button, the cooperation apparatus can be changed to the image processing apparatus 130 or the like.

A scan start button 2503 is pressed to activate a function that cooperates with the image processing apparatus. Upon pressing of this button, image data of an original is read using the scanner function of the selected image processing apparatus 110, and is saved in a record in the DBMS corresponding to this workflow. This processing is achieved by a job request 2303 from the device cooperation logic 2105 to the scanner function.

After the image data of the original is saved, the Web application 2101 of the workflow processing system returns an HTML response of a page required to operate the next step of the workflow. As a result, the operation screen 2500 is switched to a screen required to operate the fourth step of the purchase application workflow.

When the user clicks the scan start button 2503 while no cooperation apparatus is selected, the control prompts the user to explicitly set the cooperation apparatus in the same manner as in a case in which he or she clicks the select scanner button 2502. When no cooperation apparatus is selected, the scan start button 2503 may not appear on the screen or may be inhibited from being clicked.

Note that the present embodiment has explained the arrangement in which the image processing apparatus 110 includes the print function, scanner function, box function, and transmission function. However, of image processing functions of the image processing apparatus 110 that can accept an external function cooperation request, the user may select permission/inhibition of cooperation functions which are to accept the request. The cooperation functions of the image processing apparatus 110 which are permitted to accept the cooperation request are expressed in a request header of an HTTP request 2301 transmitted by the embedded Web browser 211, and are informed to the server computer 102.

In the present embodiment, when the user remotely operates a remote apparatus from the embedded Web browser which runs on the image processing apparatus 110, the image processing apparatus 110 is set as an input/output destination that cooperates with the Web application 2101. As a result, an image processing apparatus used by the Web application which runs on the remote apparatus to execute print processing, image scan processing, or document filing processing, the image processing apparatus 110 beside the user who is making the remote operation is automatically selected.

In the present embodiment, the Web application technique is a cross-platform technique having a high degree of freedom in combinations. Therefore, in many combinations of various image processing apparatuses and information processing apparatuses, services provided by apparatuses that include the Web application can be operated from all of the apparatuses including the Web browser.

An image processing system according to a fourth exemplary embodiment of the present invention is described below. The present embodiment is different from the first embodiment in a system in which the user remotely operates, from an MFP as an image processing apparatus, another image processing apparatus. Other arrangements and operations are the same as those in the first embodiment, and a detailed description thereof is omitted herein.

Figure 26:
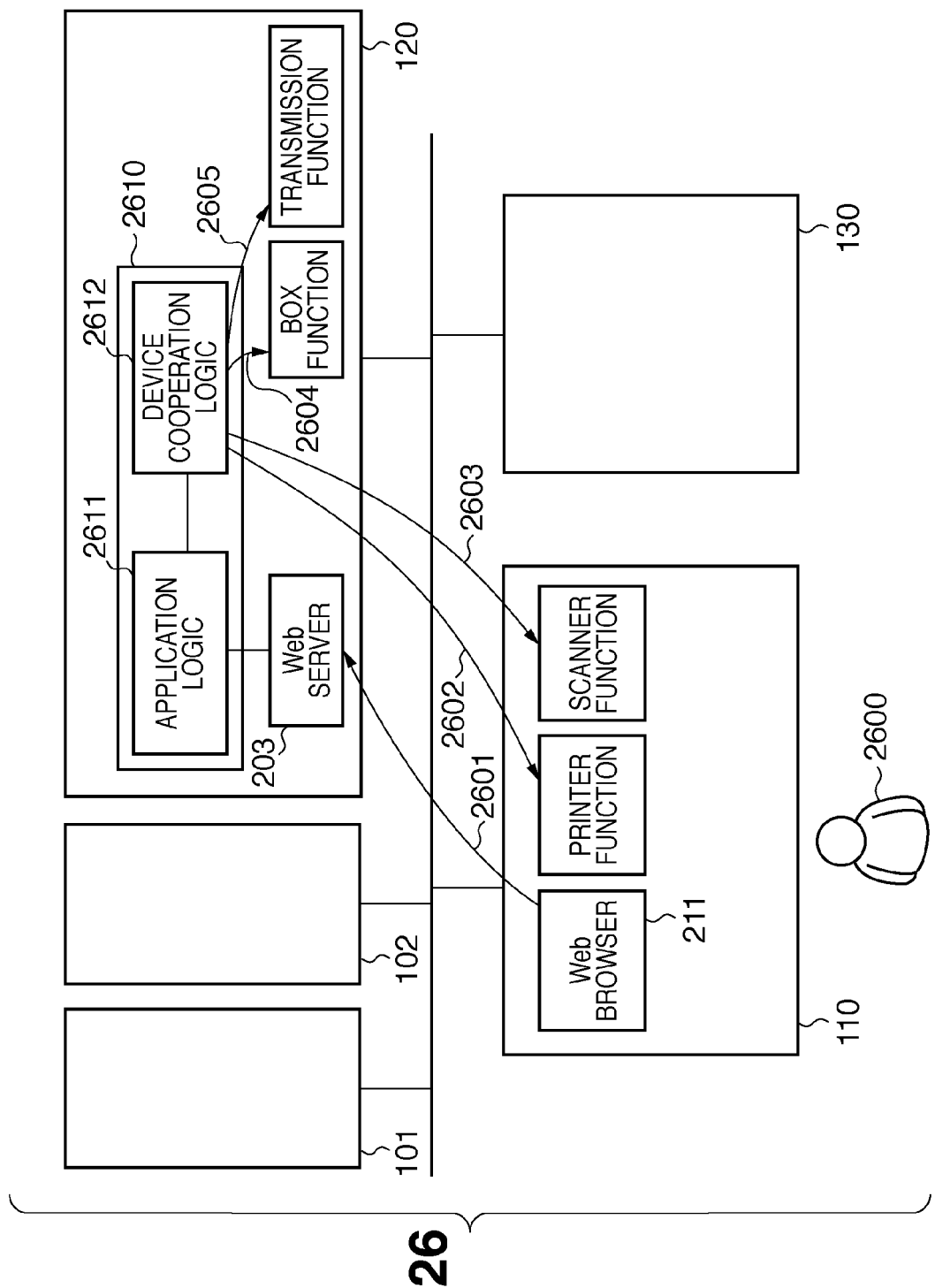
FIG. 26 is a block diagram for explaining interactions of a system according to a fourth embodiment.

FIG. 26 is a block diagram for explaining the interactions of the system according to the present embodiment. In the following description of the present embodiment, the image processing apparatus 120 includes a box function and FAX transmission function, and the image processing apparatus 110 does not include a box function and transmission function or does not use these functions. This arrangement corresponds to a case in which the image processing apparatus 110 does not include any box function and FAX transmission function, or these functions of the image processing apparatus 110 are detached due to failures.

A user 2600 stands in front of the image processing apparatus 110, and operates the Web browser 211 from the operation unit. The user 2600 makes selection of an apparatus to be remotely operated of those which are connected to the network, and selects the external image processing apparatus 120 which is connected to the nearby image processing apparatus 110 via the network. As a result, a connection 2601 is established between the Web browser 211 and the Web server 203 to exchange HTTP requests and responses.

The Web server 203 transfers an HTTP request to a Web application 2610, and transfers a response from the Web application 2610 to the Web browser 211.

An application logic 2611 of the Web application 2610 provides various services that can be remotely operated from the Web browser 211 using plentiful image processing resources of the image processing apparatus 120. The services that can be provided by the Web application 2610 include a cooperative FAX system and cooperative box system. These services include image processing jobs that can be delegated to another cooperation apparatus in a series of processes.

The Web application 2610 checks for each use session from the Web browser if the connection source is an apparatus having image processing functions. In this example, the image processing apparatus 110 is determined as an image processing apparatus having a print function and scanner function. Hence, the Web application 2610 sets the image processing apparatus 110 as an image processing apparatus to be cooperated in association with the print function and scan function of a device cooperation logic 2612. During a period in which a use session from each Web browser continues, the image processing apparatus 110 is automatically set as a default cooperation apparatus when the Web application 2610 executes an image processing job. The cooperation apparatus settings of the device cooperation logic 2612 are held for respective use sessions from a plurality of Web browsers, which continue at the same time, during continuation periods of these use sessions.

As a result, if the user does not change the default setting, when the Web application 2610 executes print processing, the print protocol such as LPR inputs a print job to the print function of the image processing apparatus 110 (2602). The same applies to a case in which the Web application 2610 scans an original image as an object to be FAX-transmitted or that to be saved in a box. That is, a scanner control protocol such as network TWAIN inputs a scan job (pull scan) to the scanner function of the image processing apparatus 110 (2603).

Also, when the Web application 2610 stores or retrieves an image file, the box function of the image processing apparatus 120 is used to store or retrieve a data file (2604). Likewise, when the Web application 2610 executes FAX or IFAX transmission, a FAX transmission job is input using the FAX function of the image processing apparatus 120 (2605).

Note that the user may change these default settings to select another image processing apparatus.

FIG. 27 is a view showing a screen example when the user establishes a connection to a cooperative FAX transmission function implemented as the Web application 2610 on the image processing apparatus 120 by the embedded Web browser function, and remotely operates that function using the operation panel on the image processing apparatus 110. The same reference numerals in FIG. 27 denote the areas that have already been described using FIG. 9, and a repetitive description thereof will be avoided.

The content display area 905 displays an operation screen 2700 of the Web application 2610 of the cooperative FAX transmission function.

A destination input field 2701 is used to input the telephone number or address of a transmission destination such as FAX, IFAX, or e-mail transmission.

A destination table button 2702 is used to select a transmission destination from a plurality of destinations stored in advance in a destination table database.

A reading setting area 2703 is used to display and set control parameters for an original input scanner. Using check boxes and buttons on this area, whether or not to read the two faces of an original, whether or not to stamp "OK" on the read original sheet using a stamp (not shown) equipped in a document feeder, and the like can be set.

An original input scanner indication 2704 indicates identification information of the image processing apparatus selected as the cooperation apparatus which provides the scanner function used to read an image of an original to be transmitted. In this example, since the user makes an operation from the embedded Web browser 211 on the image processing apparatus 110 having a cooperative scanner function, the image processing apparatus 110 is automatically set as the cooperation apparatus. If the user makes an operation from a Web browser on an apparatus having no cooperative scanner function such as the desktop computer 101, a specific image processing apparatus is not set as the cooperation apparatus, and the user has to explicitly select the cooperation apparatus.

A select scanner button 2705 is used to change the image processing apparatus selected as the cooperation apparatus that provides the scanner function for reading an image of an original to be transmitted. For example, the cooperation apparatus can be changed to the image processing apparatus 130 or the like. Also, the cooperation apparatus can be changed to the image processing apparatus 120 on which the Web application runs. When the user selects an apparatus other than the image processing apparatus 110, he or she has to move to the location of the selected apparatus so as to set a physical original sheet on the scanner. In general, it is optimal for the processing of the scanner function that reads a paper sheet to use the scanner of the image processing apparatus 110 beside the user who is operating the Web browser 211. According to the present embodiment, the scanner optimal for cooperation can be automatically selected.

A transmission report printer indication 2706 indicates identification information of the image processing apparatus selected as the cooperation apparatus used to print a transmission result report. In this example, since the user makes an operation from the embedded Web browser 211 on the image processing apparatus 110 having a cooperative print function, the image processing apparatus 110 is automatically set as the cooperation apparatus. If the user makes an operation from a Web browser on an apparatus having no cooperative print function such as the desktop computer 101, a specific image processing apparatus is not set as the cooperation apparatus, and the user has to explicitly select the cooperation apparatus.

A select printer button 2707 is used to change the image processing apparatus selected as a cooperation apparatus for printing a transmission result report. For example, the cooperation apparatus can be changed to the image processing apparatus 130 or the like. Also, the cooperation apparatus can be changed to the image processing apparatus 120 on which the Web application runs. When the user selects an apparatus other than the image processing apparatus 110, the user has to move to the location of the selected apparatus to pick up a physical printout sheet from a discharge tray of a printer. In general, it is optimal for the processing of the print function that outputs a paper sheet to use the printer of the image processing apparatus 110 beside the user who is operating the Web browser 211. According to the present embodiment, the printer optimal for cooperation can be automatically selected.

A start button 2708 is used to start a FAX transmission job. Upon clicking the start button, the Web application 2610 as the cooperative FAX transmission function which runs on the image processing apparatus 120 reads image data of an original using the scanner function of the image processing apparatus 110 selected as a cooperation destination. That is, this processing is delegated by a scan job 2603 from the device cooperation logic 2612 to the scanner function of the image processing apparatus 110. In the scan job 2603, the reading parameters set on the reading setting area 2703 are designated. Then, the Web application 2610 transmits the read image data using the transmission function of the image processing apparatus 120. The Web application 2610 then outputs a communication result report using the print function of the image processing apparatus 110 selected as a cooperation destination. This processing is delegated by a print job 2602 from the device cooperation logic 2612 to the print function of the image processing apparatus 110.

When the user clicks the start button 2708 while no cooperation apparatus is selected, the control prompts the user to explicitly set the cooperation apparatus in the same manner as in a case in which he or she clicks the select scanner button 2705. When no cooperation apparatus is selected, the start button 2708 may not appear on the screen or may be inhibited from being clicked.

FIG. 28 is a view showing a screen example when the user establishes a connection to a cooperative box function implemented as the Web application 2610 on the image processing apparatus 120 by the embedded Web browser function, and remotely operates that box function using the operation panel on the image processing apparatus 110. The same reference numerals in FIG. 28 denote the areas that have already been described using FIG. 9, and a repetitive description thereof is omitted herein.

The content display area 905 displays an operation screen 2800 of the Web application 2610 of the cooperative box function.

A box document list 2801 is a list of document files stored in the box function of the image processing apparatus 120. By checking a check box corresponding to each document in the list, a target document of a document operation can be selected.

A select all button 2802 is used to select all documents in the list as target documents of the document operation.

A document operation button group 2803 is used to make operations for the selected document. Using a detailed information button, detailed information of the selected document can be displayed, and a document name of the selected document can be changed. Using a delete button, the selected document can be deleted. Using a move/copy button, the selected document can be moved or copied to another box. Using an edit button, an image of the selected document can be displayed, a plurality of selected documents can be merged and saved, and document insertion and page deletion can be made.

An original input scanner indication 2804 indicates identification information of the image processing apparatus selected as the cooperation apparatus which provides the scanner function used to read an image of an original to be saved in a box. In this example, since the user makes an operation from the embedded Web browser 211 on the image processing apparatus 110 having a cooperative scanner function, the image processing apparatus 110 is automatically set as the cooperation apparatus. If the user makes an operation from a Web browser on an apparatus having no cooperative scanner function such as the desktop computer 101, a specific image processing apparatus is not set as the cooperation apparatus, and the user has to explicitly select the cooperation apparatus.

A select scanner button 2805 is used to change the image processing apparatus selected as the cooperation apparatus that provides the scanner function for reading an image of an original to be saved in a box. For example, the cooperation apparatus can be changed to the image processing apparatus 130 or the like. Also, the cooperation apparatus can be changed to the image processing apparatus 120 on which the Web application runs. When the user selects an apparatus other than the image processing apparatus 110, the user has to move to the location of the selected apparatus to set a physical original sheet on the scanner. In general, it is optimal for the processing of the scanner function that reads a paper sheet to use the scanner of the image processing apparatus 110 beside the user who is operating the Web browser 211. According to the present embodiment, the scanner optimal for cooperation can be automatically selected.

A document print printer indication 2806 indicates identification information of the image processing apparatus selected as the cooperation apparatus used to print the selected document. In this example, since the user makes an operation from the embedded Web browser 211 on the image processing apparatus 110 having a cooperative print function, the image processing apparatus 110 is automatically set as the cooperation apparatus. If the user makes an operation from a Web browser on an apparatus having no cooperative print function such as the desktop computer 101, a specific image processing apparatus is not set as the cooperation apparatus, and the user has to explicitly select the cooperation apparatus.

A select printer button 2807 is used to change the image processing apparatus selected as a cooperation apparatus for printing the selected document. For example, the cooperation apparatus can be changed to the image processing apparatus 130 or the like. Also, the cooperation apparatus can be changed to the image processing apparatus 120 on which the Web application runs. When the user selects an apparatus other than the image processing apparatus 110, the user has to move to the location of the selected apparatus so as to pick up physical printout sheets from a discharge tray of a printer. In general, it is optimal for the processing of the print function that outputs paper sheets to use the printer of the image processing apparatus 110 beside the user who is operating the Web browser 211. According to the present embodiment, the printer optimal for cooperation can be automatically selected.

A print button 2808 is used to print the selected document. Upon clicking this button, the Web application 2610 as the cooperative box function which runs on the image processing apparatus 120 outputs the selected document using the print function of the image processing apparatus 110 selected as a cooperation destination. This processing is delegated by a print job 2602 transmitted from the device cooperation logic 2612 to the print function of the image processing apparatus 110.

A read original button 2809 is used to scan an image of an original, and to save its image data in a box as a document. Upon clicking this button, Web application 2610 as the cooperative box function which runs on the image processing apparatus 120 reads image data of an original using the scanner function of the image processing apparatus 110 selected as a cooperation destination. This processing is delegated by a scan job 2603 from the device cooperation logic 2612 to the scanner function of the image processing apparatus 110. Then, the Web application 2610 saves the read image data in a box using the box function of the image processing apparatus 120.

A transmission button 2810 is used to transmit the selected document. The Web application 2610 transmits the read image data using the transmission function of the image processing apparatus 120.

When the user clicks the print button 2808 while no cooperation apparatus is selected, the control prompts the user to explicitly set the cooperation apparatus in the same manner as in a case in which the user clicks the select scanner button

2805. When no cooperation apparatus is selected, the print button 2808 may not appear on the screen or may be inhibited from being clicked.

In the present embodiment, the image processing apparatus 110 does not include the transmission function and box function. The function cooperation and remote operation between the image processing apparatuses 110 and 120 are beneficial. For example, a case may be assumed in which these functions of the image processing apparatus 110 are temporarily out of order. Also, a case may be assumed in which the transmission function of the image processing apparatus 120 matches the needs of the user 2600 rather than the image processing apparatus 110, such as a low communication fee, concentrated charging of communication fees on one apparatus, high speed, high quality, advanced functions, assignment of use authority of the transmission function to only the image processing apparatus 120, and so forth. Furthermore, a case may be assumed in which the user wants to save a document not in the box function of the nearby image processing apparatus 110, but in that of the remote image processing apparatus 120. Moreover, a case may be assumed in which the user wants to operate a document already saved in the image processing apparatus 120 from the nearby image processing apparatus 110.

Note that the present embodiment has explained the arrangement in which the image processing apparatus 110 includes the print function and scanner function. However, of image processing functions of the image processing apparatus 110 that can accept an external function cooperation request, the user may select permission/inhibition of cooperation functions which are to accept the request. The cooperation functions of the image processing apparatus 110 which are permitted to accept the cooperation request are expressed in a request header of an HTTP request transmitted by the embedded Web browser 211, and are informed to the image processing apparatus 120.

In the present embodiment, in order to operate, from an image processing apparatus, another image processing apparatus, an image processing apparatus which includes an embedded Web browser on the operation terminal side is combined with that which includes an embedded Web server on the operation target side. However, the remote desktop technique may be used instead to configure such system. In this case, an image processing apparatus including an embedded remote desktop client on the operation terminal side is combined with that including an embedded remote desktop server on the operation target side.

As described above, according to the embodiment, image data scanned and read by an image processing apparatus having no FAX transmission unit or the like can be FAX-transmitted using another image processing apparatus including a FAX transmission unit. A printout such as a transmission result report can be automatically output to the nearby image processing apparatus.

Also, according to the present embodiment, document data scanned and read by an image processing apparatus including no box function can be stored in the box function of another image processing apparatus. Upon printing a document by remotely operating the box function of the other image processing apparatus, the document can be automatically output to the nearby image processing apparatus.

According to the present embodiment, the Web application technique is a cross-platform technique having a high degree of freedom in combinations used. Therefore, in many combinations of various image processing apparatuses and information processing apparatuses, services provided by apparatuses that include the Web application can be operated from all of the apparatuses including the Web browser.

The above-described embodiments of the present invention have been explained in detail. The present invention may be applied to either a system constituted by a plurality of devices, or an apparatus consisting of a single device.

Note that the present invention is also achieved by directly or remotely supplying a program that implements the functions of the aforementioned embodiments to a system or apparatus, and reading out and executing the supplied program code by that system or apparatus. Therefore, the technical scope of the present invention includes the program code itself installed in a computer to implement the functional processes of the present invention using the computer.

In this case, the form of program is not particularly limited, and an object code, a program to be executed by an interpreter, script data to be supplied to an OS, and the like may be used as long as they have the program function.

As a recording medium for supplying the program, for example, a floppy disk, hard disk, optical disk, and magneto-optical disk may be used. Also, MO, CD-ROM, CD-R, CD-RW, magnetic tape, nonvolatile memory card, ROM, DVD (DVD-ROM, DVD-R), and the like may be used.

As another method of use, a connection is established to the Internet site using a browser of a client PC, and the program itself according to the present invention or a file that further includes an automatic installation function may be downloaded to a recording medium such as a hard disk. Also, the program code that forms the program of the present invention may be segmented into a plurality of files, which may be downloaded from different homepages. That is, the scope of the present invention includes a WWW server which makes a plurality of users download a program required to implement the functional processes of the present invention by the computer. Furthermore, a storage medium such as a CD-ROM, which stores the encrypted program of the present invention, may be delivered to the users. The user who has cleared a predetermined condition may be allowed to download key information that decrypts the program from a homepage via the Internet, and may execute the encrypted program using that key information, so as to install the decrypted program on a computer, thus implementing the present invention.

Moreover, the functions of the aforementioned embodiments can be implemented by some or all of actual processes executed by an OS or the like which runs on a computer based on instructions of the program.

The scope of the present invention includes a case in which the program according to the present invention is written in a memory of a function expansion unit of a PC, and a CPU equipped on that function expansion unit executes some or all of actual processes based on the program.

According to the present invention, an information processing apparatus can be easily remotely operated using an image processing apparatus as an operation terminal, so as to guide the execution target of an image processing job to the image processing apparatus as that operation terminal.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-072220 filed on Mar. 19, 2008, which is hereby incorporated by reference herein in its entirety.

What is claimed is:

1. An information processing apparatus communicable with an image processing apparatus, the information processing apparatus comprising:
 a processor configured to:
  receive a remote desktop connection request transmitted from the image processing apparatus;
  automatically set the image processing apparatus as a default image processing apparatus and switch a transmission destination of image processing jobs to the image processing apparatus which transmitted the remote desktop connection request;
  transmit the image processing jobs to the switched transmission destination; and
  revert, after receiving a request to terminate the remote desktop connection from the image processing apparatus, the transmission destination of the image processing jobs to an original image processing apparatus before the transmission destination of the image processing jobs was switched.

2. The information processing apparatus according to claim 1, wherein the processor is further configured to:
 set a setting indicating whether the transmission destination of the image processing jobs is automatically switched to the image processing apparatus during communication with the image processing apparatus; and
 determine, according to the setting, whether the transmission destination of the image processing jobs is automatically switched to the image processing apparatus.

3. The information processing apparatus according to claim 1,
 wherein the image processing apparatus includes a print function, and
 wherein the processor is further configured to set the image processing apparatus as a printer to be used during communication with the image processing apparatus.

4. The information processing apparatus according to claim 1,
 wherein the image processing apparatus includes a scanner function, and
 wherein the processor is further configured to change a setting so as to transmit a scan job to the image processing apparatus and to receive data of a scanned image during communication with the image processing apparatus.

5. The information processing apparatus according to claim 1,
 wherein the information processing apparatus includes a facsimile transmission function and the image processing apparatus includes a scanner function, and
 wherein the processor is further configured to change a setting so as to transmit a scan job to the image processing apparatus, and to receive and transmit data of a scanned image using the facsimile transmission function during communication with the image processing apparatus.

6. The information processing apparatus according to claim 1,
 wherein the information processing apparatus includes an image storing function and the image processing apparatus includes a scanner function, and
 wherein the processor is further configured to change a setting so as to transmit a scan job to the image processing apparatus, and to receive and store data of a scanned image using the image storing function during communication with the image processing apparatus.

7. A control method of an information processing apparatus communicable with an image processing apparatus, the method comprising:
 receiving a remote desktop connection request transmitted from the image processing apparatus;
 automatically setting the image processing apparatus as a default image processing apparatus and switching a transmission destination of image processing jobs to the image processing apparatus which transmitted the remote desktop connection request;
 transmitting the image processing jobs to the switched transmission destination; and
 reverting the transmission destination of the image processing jobs, after receiving a request to terminate the remote desktop connection from the image processing apparatus, to an original image processing apparatus before the transmission destination of the image processing jobs was switched.

8. A non-transitory computer-readable storage medium storing a computer program for causing a computer to perform a method for controlling an information processing apparatus communicable with an image processing apparatus, the method comprising:
 receiving a remote desktop connection request transmitted from the image processing apparatus;
 automatically setting the image processing apparatus as a default image processing apparatus and switching a transmission destination of image processing jobs to the image processing apparatus which transmitted the remote desktop connection request;
 transmitting the image processing jobs to the switched transmission destination; and
 reverting the transmission destination of the image processing jobs, after receiving a request to terminate the remote desktop connection from the image processing apparatus, to an original image processing apparatus before the transmission destination of the image processing jobs was switched.

* * * * *